(12) United States Patent
Nagata et al.

(10) Patent No.: US 7,949,294 B2
(45) Date of Patent: *May 24, 2011

(54) IMAGE FORMING APPARATUS WITH SWITCHBACK TRANSPORT PATH IN THE STAPLING UNIT

(75) Inventors: Jinichi Nagata, Osaka (JP); Naofumi Okada, Nara (JP); Kouzou Yamaguchi, Nara (JP); Susumu Hashimoto, Nara (JP); Toshiki Ohgita, Nara (JP); Yoshitaka Matsumoto, Osaka (JP); Hideo Yoshikawa, Nara (JP); Yasunobu Ohkawa, Nara (JP); Shin Tsugane, Yamanashi (JP); Kazuhito Shimura, Yamanashi (JP)

(73) Assignees: Sharp Kabushiki Kaisha, Osaka (JP); Nisca Corporation, Yamanashi (JP)

( * ) Notice: Subject to any disclaimer, the term of this patent is extended or adjusted under 35 U.S.C. 154(b) by 737 days.

This patent is subject to a terminal disclaimer.

(21) Appl. No.: 11/362,374

(22) Filed: Feb. 27, 2006

(65) Prior Publication Data

US 2006/0203068 A1 Sep. 14, 2006

(30) Foreign Application Priority Data

Feb. 28, 2005 (JP) .................................. 2005-54823

(51) Int. Cl.
 *B65H 37/04* (2006.01)
 *B65H 85/00* (2006.01)
 *G03G 15/00* (2006.01)
(52) U.S. Cl. ...................................... 399/410; 399/407
(58) Field of Classification Search .................. 399/407, 399/410

See application file for complete search history.

(56) References Cited

U.S. PATENT DOCUMENTS

| 6,427,997 | B1 | 8/2002 | Hirota et al. | |
| 6,647,243 | B2 * | 11/2003 | Sato et al. | 399/407 |
| 6,671,491 | B1 | 12/2003 | Yamanaka et al. | |
| 6,714,747 | B2 | 3/2004 | Asai | |
| 7,450,874 | B2 | 11/2008 | Nagata et al. | |
| 2003/0160376 | A1 | 8/2003 | Yamada et al. | |
| 2004/0178554 | A1 * | 9/2004 | Ishida | 270/37 |
| 2004/0247356 | A1 | 12/2004 | Kaneko et al. | |
| 2006/0210337 | A1 | 9/2006 | Nagata et al. | |

FOREIGN PATENT DOCUMENTS

| JP | 02233450 A | 9/1990 |
| JP | 3-238234 A | 10/1991 |
| JP | 8-81070 A | 3/1996 |
| JP | 09255216 A | 9/1997 |
| JP | 098323860 A | 12/1997 |
| JP | 11-38712 A | 2/1999 |

(Continued)

*Primary Examiner* — Daniel J Colilla

(74) *Attorney, Agent, or Firm* — Nixon & Vanderhye P.C.

(57) ABSTRACT

An image forming apparatus in which an original reading portion is disposed in an upper portion of the apparatus main body, a feed portion is disposed in a lower portion of the apparatus main body, and a printing portion is disposed between the original reading portion and the feed portion as an image forming system, is configured as follows. A paper post-processing portion that can perform a plurality of types of paper post-processing for recording paper transported from the apparatus main body after printing by the printing portion is finished, and a discharge portion to which recording paper is discharged after paper post-processing by the paper post-processing portion is finished, are disposed in a space of the apparatus main body formed by the original reading portion, the printing portion, and the feed portion.

9 Claims, 28 Drawing Sheets

FOREIGN PATENT DOCUMENTS

| | | | |
|---|---|---|---|
| JP | 2001-072311 | | 3/2001 |
| JP | 2001-130817 | | 5/2001 |
| JP | 2001-134033 A | | 5/2001 |
| JP | 2001-335222 | | 12/2001 |
| JP | 2001-354352 | | 12/2001 |
| JP | 2001348160 A | * | 12/2001 |
| JP | 2002-068567 | | 3/2002 |
| JP | 2002108139 A | * | 4/2002 |
| JP | 2002-128364 A | | 5/2002 |
| JP | 2002-128385 A | | 5/2002 |
| JP | 2002-179331 A | | 6/2002 |
| JP | 2002-241041 A | | 8/2002 |
| JP | 2002-278195 A | | 9/2002 |
| JP | 2002-308520 A | | 10/2002 |
| JP | 2002-321861 | | 11/2002 |
| JP | 2002-333750 A | | 11/2002 |
| JP | 2003-76085 A | | 3/2003 |
| JP | 2003-81520 A | | 3/2003 |
| JP | 2003-145491 A | | 5/2003 |
| JP | 2003-335449 | | 11/2003 |
| JP | 2004-99200 A | | 4/2004 |
| JP | 2004-155566 A | | 6/2004 |
| JP | 2004-244225 | | 9/2004 |
| JP | 2004271578 A | * | 9/2004 |
| JP | 2004-307184 A | | 11/2004 |

* cited by examiner (a)

(b)

(c)

Processing A: duplex printing, with staple processing, punch processing, and shifter processing all performed Processing B: duplex printing, with punch processing and shifter processing, no staple processing Processing C: duplex printing, with staple processing and shifter processing, no punch processing Processing D: duplex printing, with shifter processing, no punch processing or staple processing Processing E: duplex printing, with staple processing and punch processing, no shifter processing Processing F: duplex printing, with punch processing, no staple processing or shifter processing Processing G: duplex printing, with staple processing, no punch processing or shifter processing Processing H: duplex printing with no post-processing Processing I: simplex printing with staple processing, punch processing, and shifter processing all performed Processing J: simplex printing, with punch processing and shifter processing, no staple processing Processing K: simplex printing, with staple processing and shifter processing, no punch processing Processing L: simplex printing, with shifter processing, no punch processing or staple processing Processing M: simplex printing, with staple processing and punch processing, no shifter processing Processing N: simplex printing, with punch processing, no staple processing or shifter processing Processing O: simplex printing, with staple processing, no punch processing or shifter processing Processing P: simplex printing with no post-processing

IMAGE FORMING APPARATUS WITH SWITCHBACK TRANSPORT PATH IN THE STAPLING UNIT

BACKGROUND

This application claims priority under 35 U.S.C. §119(a) on Patent Application No. 2005-54823 filed in Japan on Feb. 28, 2005, the entire contents of which are hereby incorporated by reference.

The technology presented herein relates to image forming apparatuses that are provided with a paper post-processing apparatus.

In recent years, along with the conversion of image forming apparatuses to multifunctionality, the development of paper post-processing apparatuses that post-process paper on which something has been printed has been advancing. Functions of this sort of paper post-processing apparatus include, for example, functions such as stapling, hole-punching, and binding functions. However, the processing mechanism in a paper post-processing apparatus having any function is enlarged, and when providing the paper post-processing apparatus in a compact image forming apparatus, it is necessary for the paper post-processing apparatus to be disposed outside of the image forming apparatus.

As stated above, disposing the paper post-processing apparatus outside of the image forming apparatus has the problems of leading not only to an increase in the area occupied by the entire apparatus, but also to increase in the power consumption of the entire apparatus. For example, there is a possibility of exceeding the rated power with the ordinary electrical wiring specifications in Japan (where outlet wiring is 100V, 15A), and in this case, there is the troublesome necessity of separately wiring the image forming apparatus and the paper post-processing apparatus.

Accordingly, technology has been proposed in which the paper post-processing apparatus itself is configured compactly, and the paper post-processing apparatus is disposed not outside of the image forming apparatus, but in a space formed within the image forming apparatus (for example, see JP 2003-335449A). Specifically, this technology seeks to eliminate the sorts of problems described above by providing the paper post-processing apparatus using a space formed by an original reading portion and a printing portion and a paper feed portion.

However, in conventional image forming apparatuses provided with a paper post-processing apparatus, there are the following sort of problems.

In the image forming apparatus disclosed in above JP 2003-335449A, the paper post-processing apparatus has only a stapling function, and does not have a plurality of functions. Thus, there is the possibility that the scope of its users is limited to only users who need only a stapling function.

Also, because the paper post-processing apparatus itself is compact, even if an attempt is made to provide a mechanism other than the staple processing function, it cannot be provided in the paper post-processing apparatus. For example, when providing a shifter processing mechanism, a switchback transport path for duplex printing, and the like, it is necessary to provide them in the main body of the image forming apparatus, not in the paper post-processing apparatus. Thus, even if the paper post-processing apparatus is compact, this leads to an enlargement of the main body of the image forming apparatus.

The technology presented herein was made in light of the problems in the conventional technology mentioned above, and it is a feature thereof to provide an image forming apparatus such that it is possible to establish a paper post-processing portion in a limited space inside the apparatus, and to perform a plurality of types of paper post-processing for recording paper. It is also a feature of the present technology to provide an image forming apparatus such that the occupied area of the image forming apparatus provided with the paper post-processing portion is suppressed, so that space conservation can be achieved.

SUMMARY

In an example embodiment presented herein, a means for addressing the problems stated above is configured as follows. That is, in an image forming apparatus in which an original reading portion is disposed in an upper portion of the apparatus main body, a feed portion is disposed in a lower portion of the apparatus main body, and a printing portion is disposed between the original reading portion and the feed portion, a paper post-processing portion that can perform a plurality of types of paper post-processing for recording paper transported from the apparatus main body after printing by the printing portion is finished and a discharge portion to which recording paper is discharged after paper post-processing by the paper post-processing portion is finished are disposed in a space of the apparatus main body formed by the original reading portion, the printing portion, and the feed portion. Here, the apparatus main body means portions of the image forming apparatus other than the paper post-processing portion and the discharge portion.

With an image forming apparatus having this sort of configuration, the paper post-processing portion and the discharge portion are provided not outside of the apparatus main body, but using a space formed by the original reading portion, the printing portion, and the feed portion. Thus, it is possible to provide the paper post-processing portion and the discharge portion in a limited space inside the apparatus main body, and a plurality of types of paper post-processing can be performed for the recording paper. The occupied area of the compound machine provided with the paper post-processing portion is suppressed, so that space conservation can be achieved. Also, because a plurality of types of paper post-processing are possible for the paper post-processing portion, in comparison to an image forming apparatus provided with a paper post-processing portion that can only perform a single type of paper post-processing, this image forming apparatus is excellent with respect to functionality, more kinds of paper post-processing are selectable by the user, and convenience is improved.

Also, in the image forming apparatus of the example embodiment, the paper post-processing portion may be provided with a hole-punching function and a stapling function.

In this case, because a plurality of post-processing functions, a hole-punching function and a staple function, are provided in the paper post-processing portion, in comparison to providing a paper post-processing portion that can only perform a single type of paper post-processing, more kinds of paper post-processing are selectable by the user, and convenience is improved.

Also, in the image forming apparatus of the example embodiment, in the paper post-processing portion, a punching unit provided with the hole-punching function and a stapling unit provided with the stapling function may by provided. In this way, the hole-punching function and the stapling function provided by the paper post-processing portion are respectively realized by the punching unit and the stapling unit.

Also, in the image forming apparatus of the example embodiment, in the paper post-processing portion, the punching unit may be disposed on the upstream side in the paper transport direction, and the stapling unit on the downstream side in the paper transport direction. The reason for disposing the punching unit on the upstream side and the stapling unit on the downstream side is that hole-punch processing is performed with the punching unit for each page of recording paper, while on the other hand, staple processing is performed with the stapling unit for a plurality of pages of recording paper together.

Here, a dummy unit may be provided in place of the punching unit or the stapling unit. A "dummy unit" means a unit provided with only a recording paper transport function, and not provided with a paper post-processing function such as a hole-punching function or a stapling function.

Also, in the image forming apparatus of the example embodiment, a hole-punching mechanism portion that opens punch-holes in the recording paper may be provided in the upper portion of the punching unit, and a punch chip storage portion that recovers punch chips may be provided in the lower portion of the punching unit.

In this way, by adopting a configuration in which the punching unit is vertically divided, it is possible to easily perform work such as recovering punch chips stored in the punch ship storage portion.

Also, in the image forming apparatus of the example embodiment, a switchback transport path used when printing to both faces of the recording paper may be formed in the stapling unit.

With an image forming apparatus having this sort of configuration, because recording paper switchback is performed with the switchback transport path in the stapling unit, the recording paper transport distance shortens in comparison to performing switchback with discharge rollers that discharge the recording paper to the discharge portion. Accordingly, it is possible to improve the printing efficiency when performing duplex printing, to the extent that the transport distance of the recording paper is shortened.

Also, in the image forming apparatus of the example embodiment, a branching gate that switches the direction in which the recording paper is guided may be provided in the stapling unit, and may be provided such that it can rotate between a first position that guides the recording paper to the stapling stage where staple processing is performed and a second position that guides the recording paper to the switchback transport path.

With an image forming apparatus having this sort of configuration, due to rotational operation of the branching gate, when performing duplex printing, it is possible to switch the branching gate to the second position after print processing for the front face of the recording paper is finished, guide the recording paper to the switchback transport path after front face printing is finished, switch the branching gate to the first position after print processing for the back face of the recording paper is finished, and guide the recording paper to the stapling stage where staple processing is performed after printing is finished. On the other hand, when performing simplex printing, it is possible to switch the branching gate to the first position and guide the recording paper to the stapling stage where staple processing is performed after printing is finished.

Also, in the image forming apparatus of the example embodiment, the paper post-processing portion may be further provided with a shifter function.

With an image forming apparatus having this sort of configuration, because the paper post-processing portion is provided with a shifter function in addition to a hole-punching function and a stapling function, more kinds of paper post-processing are selectable by the user, and convenience is improved.

Also, in the image forming apparatus of the example embodiment, discharge rollers that discharge the recording paper to the discharge portion after paper post-processing may be provided with the shifter function. In this case, the discharge rollers may be used also as shifter rollers. Thus, it is possible to reduce the number of components and achieve a reduction in cost.

Also in the image forming apparatus of the example embodiment, the discharge rollers may be provided as a pair of upper and lower rollers on the furthest downstream side in the paper transport direction of the stapling stage where staple processing is performed, such that they can be brought into pressure-contact with or separated from each other.

In this manner, by providing the upper and lower discharge rollers such that they can be put into pressure-contact with or separated from each other, when performing staple processing, the upper and lower discharge rollers are put in a separated state, and the leading edge portion of the recording paper fed to the stapling stage is caused to protrude from between the upper and lower discharge rollers. Thus, it is possible to shorten the length of stapling stage in the paper transport direction, and the stapling stage can be made compact. After staple processing, the upper and lower discharge rollers are put in a state of pressure-contact, and after staple processing, recording paper batches are discharged to the discharge portion. Thus, it is not necessary to separately provide a mechanism that discharges batches of recording paper to the discharge portion after staple processing, such as a mechanism that pushes out batches of recording paper.

Also, in the conventional technology, when using discharge rollers also as shifter rollers, shifter processing is not performed when staple processing has been performed. That is, because it is not possible for the discharge rollers to be separated from or put in pressure-contact with each other, the shifter function provided by the discharge rollers is only compatible with one page of recording paper for which staple processing has not been performed, and is not compatible with a recording paper batch for which staple processing has been performed.

On the other hand, with the example embodiment, as described above, by providing the upper and lower discharge rollers such that they can be put into pressure-contact with or separated from each other, after staple processing, by putting the upper and lower discharge rollers in a state of pressure-contact, it is possibly to reliably chuck a recording paper batch after staple processing, and in this state shifter processing can be performed. Thus shifter processing can be likewise performed for either one page of recording paper for which staple processing has not been performed or a recording paper batch for which staple processing has been performed.

Also, in the image forming apparatus of the example embodiment, the pair of upper and lower discharge rollers may both be drive rollers.

When discharging a paper batch with the discharge rollers after staple processing, if only one discharge roller is made a drive roller and the other is made an idler roller, the rotation of the drive roller becomes difficult to transmit to the idler roller as the number of pages in the recording batch increases. As a result, the recording paper may be torn at a position where it is bound with a staple. On the other hand, as described above, by making the upper and lower discharge rollers both drive rollers, the recording paper is not damaged, and it can be smoothly discharged to the discharge portion.

Also, in the image forming apparatus of the example embodiment, the recording paper may be transported from the feed portion with a so-called center reference. Here, transporting with a center reference means transporting with the center position of the recording paper in the widthwise direction as a reference.

The positions of punch holes are ordinarily in two places in the center in the widthwise direction of the recording paper. High precision is needed for the positions of the punch holes in the widthwise direction of the recording paper. Accordingly, high precision is also needed for the movement of the hole-punching means of the punching unit. Therefore, in the present invention, as described above, by transporting the recording paper with a center reference, displacement relative to the reference position in the center in the widthwise direction of the transported recording paper is detected, and the hole-punching means is moved in response to that displacement. Thus, it is possible to have high precision for the positions of the punch holes opened in the recording paper. Also, this sort of positioning can be performed likewise for all sizes of transported recording paper.

DESCRIPTION OF THE PREFERRED EMBODIMENTS

Hereinafter, an embodiment will be described with reference to the accompanying drawings, as an aid to understanding the example embodiment. The following embodiment is a specific example, and does not limit the technological scope of the example embodiment.

Schematic Configuration of Compound Machine 1

Figure 1:
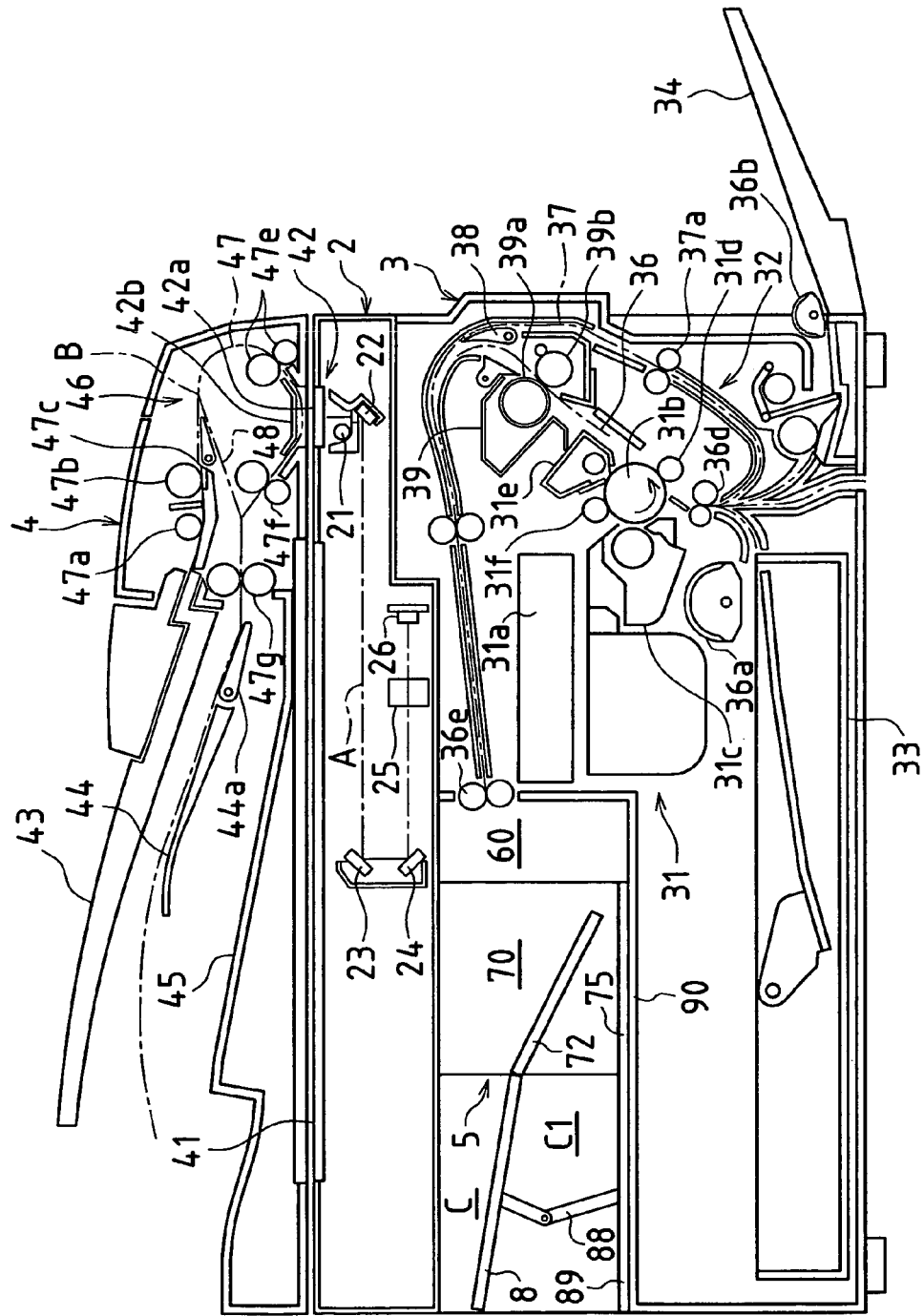
FIG. 1 shows the schematic configuration of a compound machine in which the example embodiment presented herein is applied.

In the present embodiment, a case is explained in which an image forming apparatus provided with the paper post-processing apparatus of the present invention is applied in a compound machine. FIG. 1 shows an overview of the internal configuration of such a compound machine.

As shown in FIG. 1, a compound machine 1 includes a scanner portion 2 as an original reading means, an image forming portion 3, an original automatic feed portion 4, and a paper post-processing portion 5 as the paper post-processing means. Also, for the sake of convenience, the portions in the compound machine 1 other than the paper post-processing portion 5 and a discharge tray 8 are referred to as the "apparatus main body".

This compound machine 1 has a copier mode, printer mode, and fax mode as image forming modes in which an image is formed on recording paper (including recording media of overhead projectors and the like), and the modes are selected by a user. Following is a description of each portion of the compound machine 1.

First is a description of the scanner portion 2. The scanner portion 2 reads an image of an original that has been placed on an original stage 41 made from transparent glass or the like, or an image of originals fed page by page from the original automatic feed portion 4, and creates original image data. This scanner portion 2 includes an exposing light source 21, a plurality of reflecting mirrors 22, 23, and 24, an imaging lens 25, and a photoelectric transducer (CCD: Charge Coupled Device) 26.

The exposing light source 21 irradiates light to an original that has been placed on the original stage 41 of the original automatic feed portion 4 or transported through the original automatic feed portion 4. As indicated by the optical path shown with the dashed line A in FIG. 1, the reflecting mirrors 22, 23, and 24 reflect reflected light from the original in the leftward direction in FIG. 1, then reflect that light downward, then reflect that light in the rightward direction in FIG. 1 towards the imaging lens 25.

There are the following two image reading operations of an original. When reading an original has been placed on the original stage 41 (when used as a "sheet fixing system"), the exposing light source 21 and the reflecting mirrors 22, 23, and 24 scan in the horizontal direction along the original stage 41, and capture an image of the entire original. On the other hand, when reading an original that is transported through the original automatic feed portion 4 (when used as a "sheet moving system"), the exposing light source 21 and the reflecting mirrors 22, 23, and 24 are fixed in the position shown in FIG. 1, and when the original passes an original reading portion 42 of the original automatic feed portion 4 described below, an image of that original is read.

Light that has been reflected by the reflecting mirrors 22, 23, and 24 and has passed the imaging lens 25 is guided to the photoelectric transducer 26, and in this photoelectric transducer 26 the reflected light is converted to an electrical signal (original image data).

Next is a description of the image forming portion 3. The image forming portion 3 includes an image forming system 31 as a printing means, and a paper transport system 32.

The image forming system 31 includes a laser scanning unit 31a and a photosensitive drum 31b as a drum-type image carrier. The laser scanning unit 31a irradiates the surface of the photosensitive drum 31b with laser light based on the original image data that has been converted in the photoelectric transducer 26, or image data that has been input from an external terminal apparatus or the like. The photosensitive drum 31b rotates in the direction indicated by the arrow in FIG. 1, and by laser light from the laser scanning unit 31a being irradiated, an electrostatic latent image is formed on the surface of the photosensitive drum 31b.

Other than the laser scanning unit 31a, a development unit (development mechanism) 31c, a transfer unit (transfer mechanism) having a transfer roller 31d, a cleaning unit (cleaning mechanism) 31e, an unshown de-electrifier, and a charging unit (charging mechanism) having a charging roller 31f are disposed in order in the circumferential direction around the outer circumference of the photosensitive drum 31b.

The development unit 31c develops the electrostatic latent image that has been formed on the surface of the photosensitive drum 31b into a visible image with toner (development agent). The transfer roller 31d transfers the toner image that has been formed on the surface of the photosensitive drum 31b to recording paper as a recording medium. The cleaning unit 31e removes toner remaining on the surface of the photosensitive drum 31b after toner transfer. The de-electrifier removes an electrical charge remaining on the surface of the photosensitive drum 31b. The charging roller 31f charges the surface of the photosensitive drum 31b to a predetermined potential before an electrostatic latent image is formed.

When forming an image on recording paper, the surface of the photosensitive drum 31b is charged to a predetermined potential by the charging roller 31f, and the laser scanning unit 31a irradiates laser light based on the original image data to the surface of the photosensitive drum 31b. Afterwards, the development unit 31c develops a visible image on the surface of the photosensitive drum 31b with toner, and a toner image is transferred to the recording paper by the transfer roller 31d. Further, afterwards, the toner remaining on the surface of the photosensitive drum 31b is removed by the cleaning unit 31e, and the electrical charge remaining on the surface of the photosensitive drum 31b is removed by the de-electrifier. Thus, one cycle of the operation that forms an image on the recording paper (print operation) is concluded. By repeating this cycle, it is possible to successively form images on a plurality of pages of recording paper.

On the other hand, the paper transport system 32 allows image formation by the image forming system 31 to be performed by transporting recording paper housed in the paper cassette 33 as a feed means or recording paper placed in the manual tray 34 page by page, and discharges recording paper for which image formation has been performed to the discharge tray 8 as a paper discharge portion, via the paper post-processing portion 5, described below. The discharge tray 8 is provided above the paper cassette 33 and below the scanner portion 2. The discharge tray 8 is described in detail below.

Figure 2:
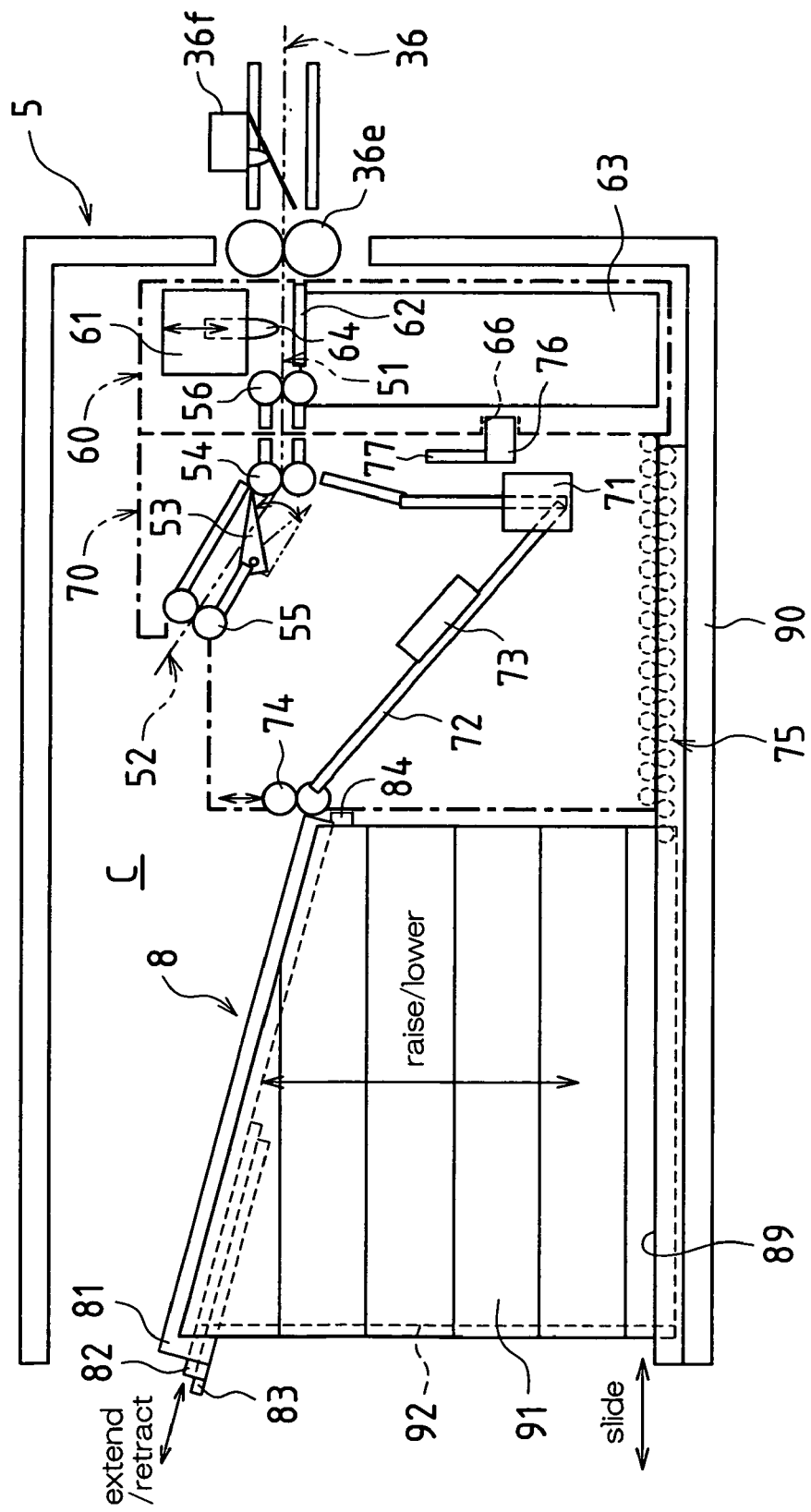
FIG. 2 is an explanatory diagram that shows the schematic configuration of a paper post-processing portion and a discharge tray.

The paper transport system 32 is provided with a main transport path 36 and a reverse transport path 37 inside the apparatus main body, and in the paper post-processing portion 5 shown in FIG. 2, a main transport path 51 and a switchback transport path 52. A main transport path 36 of the apparatus main body and a main transport path 51 of the paper post-processing portion 5 are connected to each other with discharge rollers 36e of the apparatus main body as a border. The main transport path 51 and the switchback transport path 52 of the paper post-processing portion 5 are described below. In the compound machine 1, the recording paper is transported through the paper transport system 32 with a so-called center reference. That is, the recording paper is transported with the center position of the recording paper in the widthwise direction (the direction perpendicular to the transport direction of the recording paper) used as a reference.

One end of the main transport path 36 of the apparatus main body is branched into two, with one branch end facing the discharge side of the paper cassette 33 and the other branch end facing the discharge side of the manual tray 34. The other end of the main transport path 36 faces a punching unit 60 of the paper post-processing portion 5. One end of a reverse transport path 37 is connected to the main transport path 36 on the side upstream (the lower side in FIG. 1) from the position where the transfer roller 31d is disposed, and the other end is connected to the main transport path 36 on the side downstream (the upper side in FIG. 1) from the position where the transfer roller 31*d* is disposed.

A pickup roller 36*a* with a semicircular-shaped cross section is disposed at one branch end (the portion facing the discharge end of the paper cassette 33) of the main transport path 36. Due to rotation of this pickup roller 36*a*, it is possible to intermittently feed the recording paper housed in the paper cassette 33 page by page to the main transport path 36. Likewise, a pickup roller 36*b* with a semicircular-shaped cross section is disposed at the other branch end (the portion facing the discharge end of the manual tray 34) of the main transport path 36. Due to rotation of this pickup roller 36*b*, it is possible to intermittently feed the recording paper placed in the manual tray 34 page by page to the main transport path 36.

Registration rollers 36*d* are disposed on the side upstream from the position where the transfer roller 31*d* is disposed in this main transport path 36. The registration rollers 36*d* transport the recording paper while matching the positions of the recording paper and the toner image on the surface of the photosensitive drum 31*b*.

On the downstream side of the position at which the transfer roller 31*d* is disposed in the main transport path 36, a fixing unit 39 is disposed that is provided with a pair of rollers including a hot roller 39*a* and a pressure roller 39*b* for fixing the toner image transferred to the recording paper with heat. Further, at the downstream end of the main transport path 36, discharge rollers 36*e* for discharging the recording paper to the paper post-processing portion 5 are disposed at the border of the paper post-processing portion 5 and the main transport path 51.

A branching gate 38 is disposed at the position connecting the upstream end of the reverse transport path 37 to the main transport path 36. This branching gate 38 is rotatable around a horizontal axis between a first position in FIG. 1 (the position shown by a solid line in FIG. 1) and a second position that opens the reverse transport path 37 by rotating from the first position in the counterclockwise direction in FIG. 1. When this branching gate 38 is in the first position, the recording paper is transported toward the main transport path 51 of the paper post-processing portion 5, and when in the second position, the recording paper can be fed to the reverse transport path 37.

Transport rollers 37*a* are disposed in the reverse transport path 37, and when recording paper that is switched back in the switchback path 52 in the paper post-processing portion 5 has been fed to the reverse transport path 37, the recording paper is transported by these transport rollers 37*a*, introduced to the main transport path 36 on the upstream side of the registration rollers 36*d*, and again transported through the main transport path 36 toward the transfer roller 31*d*. That is, it is possible to form an image on the rear face of the recording paper.

Following is a description of the original automatic feed portion 4. The original automatic feed portion 4 is configured as a so-called automatic duplex original transport apparatus. This original automatic feed portion 4 includes an original tray 43 as an original placement portion that can be used as a sheet moving system, a middle tray 44, an original discharge tray 45 as an original discharge portion, and an original transport system 46 that transports an original between the trays 43, 44, and 45.

The original transport system 46 is provided with a main transport path 47 for transporting an original that has been placed on the original tray 43 to the middle tray 44 or the original discharge tray 45 via an original reading portion 42, and a sub transport path 48 for feeding an original on the middle tray 44 to the main transport path 47.

An original pickup roller 47*a* and a stacking roller 47*b* are disposed at the upstream end (the portion facing the discharge side of the original tray 43) of the main transport path 47. A stacking plate 47*c* is disposed on the bottom side of the stacking roller 47*b*. With rotation of the original pickup roller 47*a*, one page of the originals on the original tray 43 is fed to the main transport path 47 by passing between the stacking roller 47*b* and the stacking plate 47*c*. PS rollers 47*e* are disposed on the downstream side of a linking portion (portion B in FIG. 1) of the main transport path 47 and the sub transport path 48. These PS rollers 47*e* adjust the leading edge of the original and the image read timing of the scanner portion 2 and feed the original to the original reading portion 42. That is, these PS rollers 47*e* temporarily stop transport of the original with the original in a fed state, adjust the above timing, and feed the original to the original reading portion 42.

The original reading portion 42 is provided with a glass platen 42*a* and an original pressing plate 42*b*, and when the original fed from the PS rollers 47*e* passes between the glass platen 42*a* and the original pressing plate 42*b*, light from the exposing light source 21 passes through the glass platen 42*a* and is irradiated onto the original. At this time, the acquisition of original image data by the scanner portion 2 is performed. Biasing force is applied to the rear face (top face) of the original pressing plate 42*b* by a coil spring not shown in the figure. Thus, the original pressing plate 42*b* is in pressure-contact with the glass platen 42*a* with a predetermined pressure, and when the original passes the original reading portion 42, the original is prevented from rising up from the glass platen 42*a*.

Transport rollers 47*f* and original discharge rollers 47*g* are provided on the downstream side of the glass platen 42*a*. An original that has passed above the glass platen 42*a* is discharged to the middle tray 44 or the original discharge tray 45 via the transport rollers 47*f* and the original discharge rollers 47*g*.

A middle tray swinging plate 44*a* is disposed between the original discharge rollers 47*g* and the middle tray 44. This middle tray swinging plate 44*a* swings centered on the edge portion of the side of the middle tray 44, and can swing between a position 1 shown in FIG. 1 and a position 2 flipped upward from position 1. When the middle tray swinging plate 44*a* is in position 2, an original that has been discharged from the original discharge rollers 47*g* is recovered to the original discharge tray 45. On the other hand, when the middle tray swinging plate 44*a* is in position 1, an original that has been discharged from the original discharge rollers 47*g* is discharged to the middle tray 44. When discharging to this middle tray 44, the marginal edge of the original is in a state sandwiched between the original discharge rollers 47*g*, the original is fed to the sub transport path 48 by the reverse rotation of the original discharge rollers 47*g* from this state, and the original is again fed out to the main transport path 47 via this sub transport path 48. This reverse rotation operation of the original discharge rollers 47*g* is performed after adjusting the timing for feeding out the original to the main transport path 47 and the image reading. Thus, an image of the rear face of the original is read by the original reading portion 42.

Overview of Paper Post-Processing Portion 5 and Discharge Tray 8

Following is a description of the paper post-processing portion 5 and the discharge tray 8.

The paper post-processing portion 5 makes it possible to perform a plurality of types of paper post-processing such as punch processing and staple processing for recording paper discharged from the apparatus main body after print processing is finished. This sort of paper post-processing in the paper post-processing portion 5 is, as described below, performed when there has been a request for paper post-processing as a print condition when a print request has been made.

In this example, the paper post-processing portion 5 and the discharge tray 8 are provided not outside of the apparatus main body of the compound machine 1, but using a space C formed by the apparatus main body. Specifically, in the apparatus main body of the compound machine 1, the paper cassette 33, the image forming portion 3 (the image forming system 31), and the scanner portion 2 are disposed in approximately the shape of a sideways U, and the paper post-processing portion 5 and the discharge tray 8 are provided in the space C inside this U shape formed by the apparatus main body. Thus, the paper post-processing portion 5 and the discharge tray 8 can be established in a limited space inside the compound machine 1, and a plurality of types of paper post-processing can be performed for the recording paper. The occupied area of the compound machine provided with the paper post-processing portion 5 is suppressed, so that space conservation can be achieved. Also, because the paper post-processing portion 5 is provided with a plurality of functions so that a plurality of types of paper post-processing are possible, in comparison to an image forming apparatus provided with a paper post-processing portion that can only perform a single type of paper post-processing, this image forming apparatus is excellent with respect to functionality, more kinds of paper post-processing are selectable by the user, convenience is improved, and the range of users is expanded. Below, the paper post-processing portion 5 and the discharge 8 are described in detail using FIGS. 2 through 9. The transport direction of the recording paper (the direction shown in FIG. 3) is referred to as the "paper transport direction", and the widthwise direction of the recording paper (the direction shown in FIG. 3), perpendicular to the paper transport direction, is referred to as the "paper widthwise direction".

As shown in FIG. 2, the paper post-processing portion 5 is disposed on the downstream side of the discharge rollers 36e of the apparatus main body. As paper post-processing units, a punching unit 60 that provides a hole-punching function and a stapling unit 70 that provides a stapling function are provided in the paper post-processing portion 5. The front face (the face of the near side) of the paper post-processing portion 5 is covered by a cover 50 that can open and close. In the paper post-processing portion 5, the punching unit 60 is disposed on the upstream side and the stapling unit 70 is provided on the downstream side. The discharge tray 8 is provided on the downstream side of the paper post-processing portion 5. The recording paper discharged from the discharge rollers 36e is discharged to the discharge tray 8 via the punching unit 60 and the stapling unit 70.

Figure 2A:
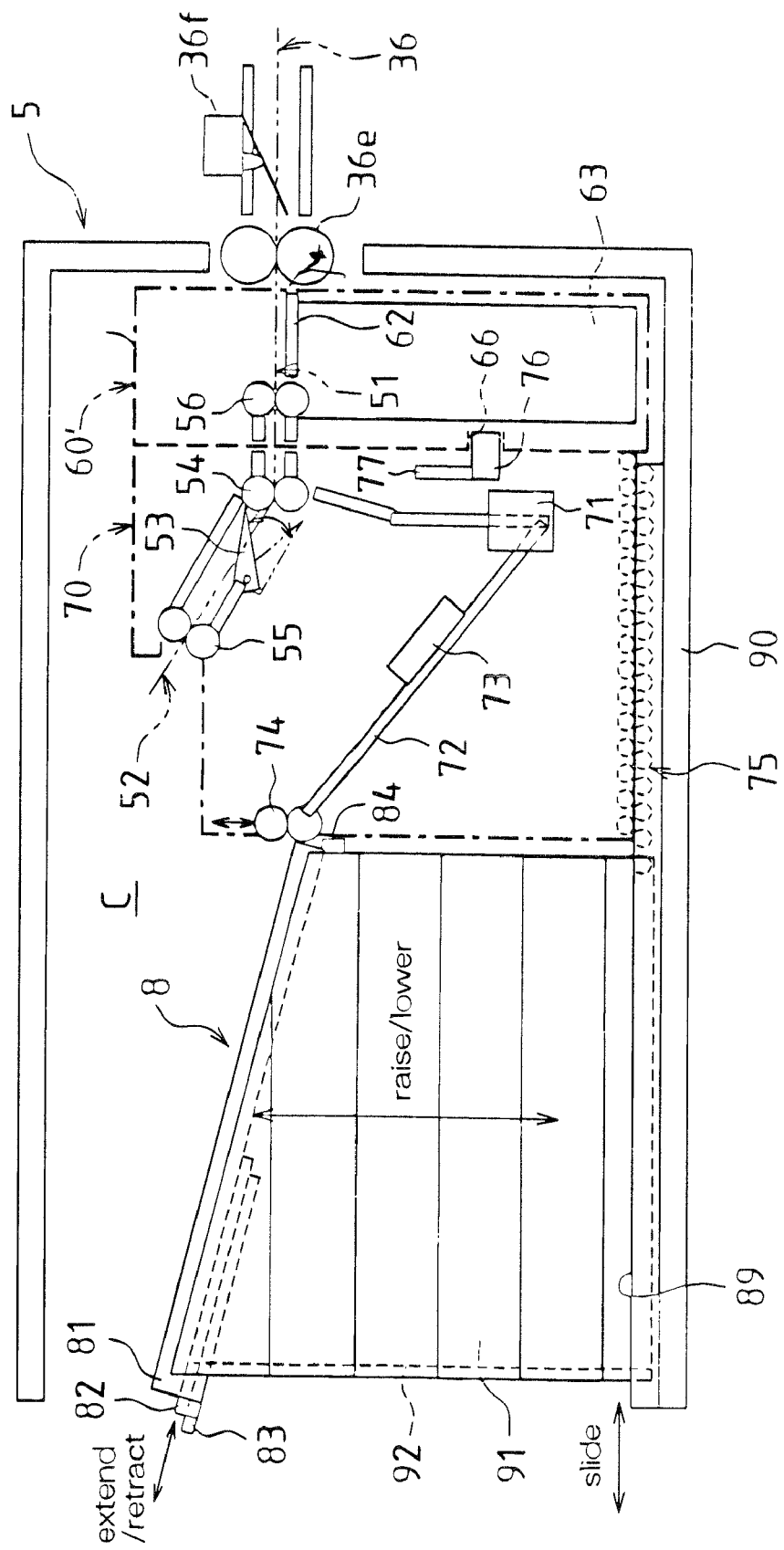
FIGS. 2A and 2B show the schematic configuration of a paper post-processing portion that includes a dummy unit and a discharge tray.
Figure 2B:
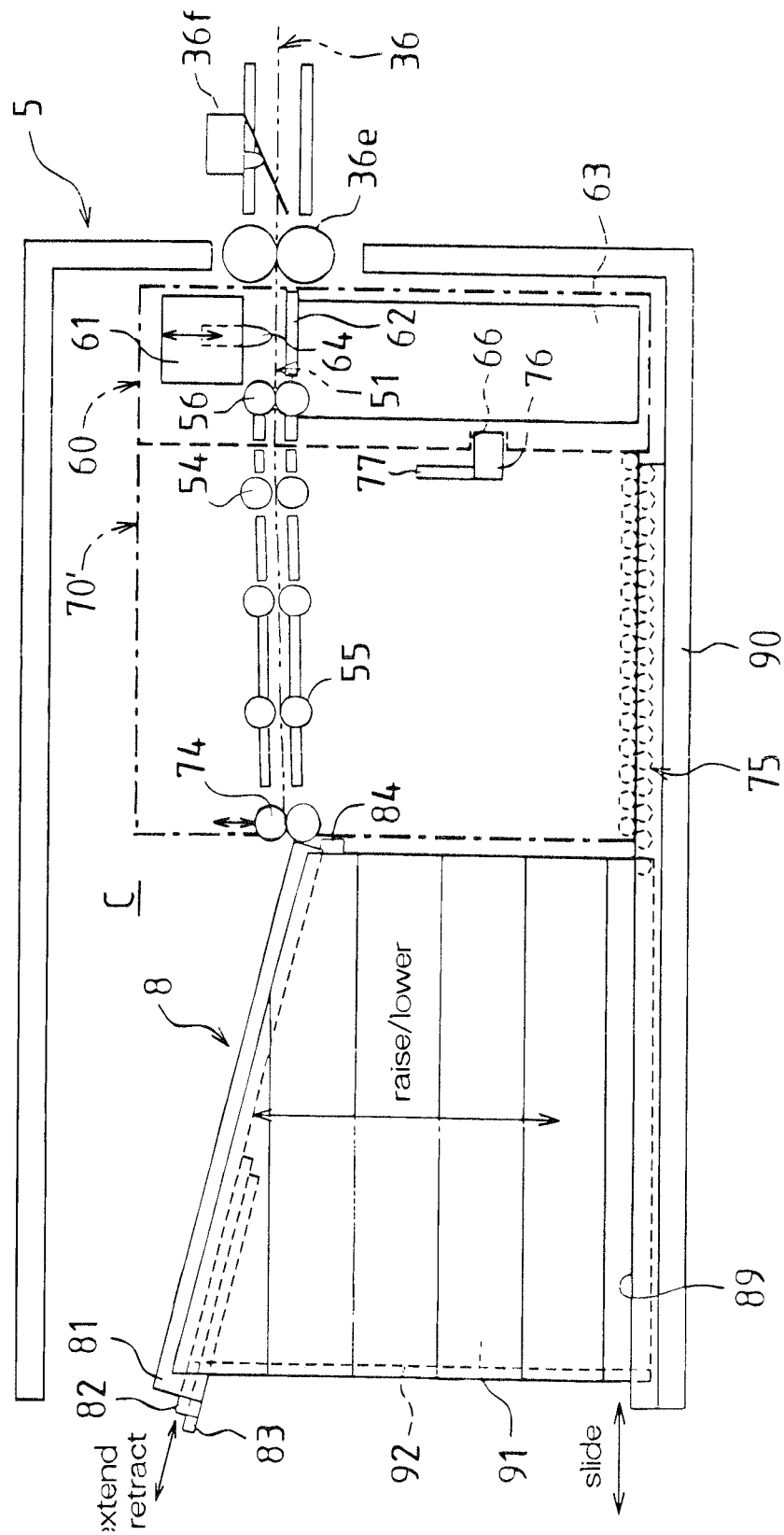

The reason for disposing the punching unit 60 on the upstream side and the stapling unit 70 on the downstream side in the paper post-processing portion 5 in this manner is that hole-punch processing is performed for one page of recording paper at a time with the punching unit 60, whereas staple processing is performed with the stapling unit 70 for a plurality of pages of recording paper together. A dummy unit that has only a recording paper transport function may be provided instead of the punching unit 60 or the stapling unit 70, see FIGS. 2A and 2B, respectively. However, a configuration may also be adopted in which the dummy unit is not provided in place of the staple unit 70, and the discharge tray 8 is provided with a reduced space on the upstream side. In this case, recording paper switch back described below is performed by rollers disposed on the furthest downstream side of the punching unit 60 (rollers disposed at a position facing the discharge tray 8).

Punching Unit 60

The punching unit 60 performs hole-punch processing (punch processing) for recording paper discharged from the discharge rollers 36e. The punching unit 60 includes a hole-punching mechanism portion 61, a guide plate 62, and a punch chip storage box 63. Also, the main transport path 51 is formed as the paper transport system 32 mentioned above. In the punching unit 60, transport rollers 56 are provided within the main transport path 51. The punching unit 60 is fixed to the apparatus main body, unlike the stapling unit 70 described below.

With the punching unit 60, when there has been a request for punch processing as a print condition when a print request has been made, the recording paper that has been transported to the punching unit 60 is stopped on the guide plate 62, and holes are punched by the hole-punching mechanism portion 61 one page at a time. At this time, holes are punched at positions determined based on the printing paper size.

The hole-punching mechanism portion 61 is disposed in the upper portion of the punching unit 60, and in the hole-punching mechanism portion 61, cores 64 with the same diameter as the punch holes are provided at two places in the paper widthwise direction with a predetermined spacing. The cores 64 are provided such that they can be raised or lowered vertically, and the cores 64 open punch holes in the recording paper when they descend. Also, the cores 64 are provided such that they can move back and forth in the paper transport direction and the paper widthwise direction respectively, and such that positioning is possible when punch processing is performed, as described below.

The guide plate 62 is disposed below the hole-punching mechanism portion 61, and in the guide plate 62, an opening portion is formed that corresponds to the predetermined position where punch holes are opened. The punch chip storage box 63 is disposed in the lower portion of the punching unit 60, and recovers punch chips produced by the hole-punch processing. The punch chip storage box 63 is provided such that it can slide in the paper widthwise direction, and such that it can be removed to the front side when the cover 50 is opened, as described below. Thus, punch chips that are stored in the punch chip storage box 63 can be removed.

When performing punch processing with the punching unit 60, the cores 64 of the hole-punching mechanism portion 61 are moved to positions that correspond to the positions that have been determined based on the printing paper size mentioned above.

In addition, fine-tuning movement of the cores 64 of the hole-punching mechanism portion 61 of the punching unit 60 is performed such that punch holes can be accurately opened at the position that have been determined based on the printing paper size mentioned above. In this fine-tuning movement, the cores 64 of the hole-punching mechanism portion 61 are moved front/back and left/right only a slight distance, and this fine-tuning movement is performed so that it corresponds to the passage position of the recording paper that is transported to the punching unit 60. Specifically, a sensor 36f that detects the leading edge and the trailing edge of the recording paper that has passed the fixing unit 39 is provided on the upstream side of the discharge rollers 36e. The position in the paper transport direction of the recording paper that is transported to the punching unit 60 is detected by this sensor 36f, and the cores 64 are moved only a slight distance in the paper transport direction. Also, sensor (not shown) that detects the side edge of the recording paper is provided on the upstream side of the discharge rollers 36e. The position in the paper widthwise direction of the recording paper that is transported to the punching unit 60 is detected by this sensor, and the cores 64 are moved only a slight distance left/right in the paper widthwise direction.

As described above, in the compound machine 1, because the recording paper is transported with a center reference, positioning of the cores 64 of the hole-punching mechanism portion 61 described above can be performed easily. Stated in detail, the positions of the punch holes are ordinarily in two places symmetrical relative to the center in the widthwise direction of the recording paper. High precision is needed for the positions of the punch holes in the widthwise direction of the recording paper. Accordingly, high precision is also needed for the movement of the cores 64 of the hole-punching mechanism portion 61. Accordingly, in this example, by transporting the recording paper with a center reference, displacement relative to the reference position in the center of the widthwise direction of the transported recording paper is detected, and the cores 64 of the hole-punching mechanism 61 are moved in response to that displacement. Thus, it is possible to have high precision for the position of the punch holes opened in the recording paper. Also, this sort of positioning can be performed likewise for all sizes of transported recording paper.

Stapling Unit 70

The stapling unit 70 performs staple processing for the recording paper transported from the punching unit 60 on the upstream side. The stapling unit 70 is provided such that it can slide in the paper transport direction when the cover 50 is opened, as described below. Also, the stapling unit 70 is provided such that it can be engaged to and disengaged from the punching unit 60 disposed on the upstream side of the stapling unit 70, as described below.

The stapling unit 70 is provided with a stapling mechanism portion 71, a stapling stage 72, adjusting plates 73, and discharge rollers 74. Also, the main transport path 51 and the switchback transport path 52 are formed as the paper transport system 32 mentioned above. Provided at the position where the downstream side of the main transport path 51 and the upstream side of the switchback transport path 52 connect are a branching gate 53 that switches the direction in which to guide recording paper, and discharge rollers 54 that discharge the recording paper to the stapling stage 72. Also, switchback rollers 55 are provided on the downstream side of the switchback transport path 52.

With the stapling unit 70, when there has been a request for staple processing as a print condition when a print request has been made, staple processing is performed by the stapling mechanism portion 71 for a predetermined number of pages of recording paper stacked on the stapling stage 72. At this time, staple processing is performed at a position determined based on the printing paper size and the desired staple position. The desired staple position is, for example, the position at which the user desires staple processing to be performed, such as one location in the upper left corner portion of the recording paper, or at two locations in the left edge portion of the recording paper.

The stapling mechanism portion 71 is disposed below the discharge rollers 54, and binds the trailing edge portion of the recording paper stacked on the stapling stage 72 with staples. The stapling mechanism portion 71 is configured to be able to move back and forth in the paper widthwise direction, and can perform the above staple processing at a position determined based on the printing paper size and the desired staple position. When staple processing is performed with the stapling unit 70, the stapling mechanism portion 71 moves to a position corresponding to the position determined based on the printing size and the desired staple position.

Recording paper discharged from the discharge rollers 54 is stacked on the stapling stage 72, which is a processing stage for the staple processing that is performed by the stapling mechanism portion 71. The stapling stage 72 is disposed tilted upward on the downstream side of the paper transport direction. When staple processing is performed, the recording paper discharged from the discharge rollers 54 slides down along the incline of the stapling stage 72 to the upstream side of the paper transport direction due to its own weight. On the other hand, when staple processing is not performed, the recording paper is discharged from the discharge rollers 74 to the discharge tray 8, as described below.

The adjusting plates 73 are disposed facing each other on both sides of the top face of the stapling stage 72 (the face on which the recording paper is discharged) in the paper widthwise direction. A pair of adjusting plates 73 are disposed such that they can move back and forth in the paper widthwise direction. When staple processing is performed with the stapling unit 70, by moving the adjusting plates 73 in the paper widthwise direction, adjustment in the widthwise direction is performed for each page of paper discharged onto the stapling stage 72. At this time, the adjusting plates 73 are moved according to a movable width determined based on the printing paper size, that is, based on the size of the transported recording paper.

The back and forth movement of the pair of adjusting plates is, for example, possible with a rack and pinion mechanism. Specifically, a rack member linked to one of the adjusting plates 73 and another rack member linked to the other adjusting plate 73 are disposed facing each other at a predetermined interval. A pinion gear is disposed between the two rack members and engages both respective rack members. Here, the rack members are disposed such that they can move back and forth in the paper widthwise direction, while the pinion gear is disposed such that it cannot move. By rotating the pinion gear by transmitting power from a drive source, the pair of adjusting plates 73 are moved symmetrically in the paper widthwise direction. Thus, adjustment in the paper widthwise direction of recording paper discharged onto the staple processing stage 72 is possible.

Discharge Rollers 74

The discharge rollers 74 are disposed on the furthest downstream side of the paper transport direction of the stapling stage 72, as a pair of upper and lower rollers facing the discharge tray 8, and discharge the recording paper on the stapling stage 72 to the discharge tray 8. As described below, the discharge rollers 74 are also used as shifter rollers that sort and discharge the recording paper to the discharge tray 8. The upper and lower discharge rollers 74 are provided also as drive rollers. That is, the upper and lower discharge rollers 74 are also linked to the drive source.

Also, the upper and lower discharge rollers 74 are provided so that they can be put in pressure-contact with or separated from each other, and so that one of the discharge rollers 74 (in this case, the upper roller) can move in the vertical direction relative to the other roller (in this case, the lower roller). When discharging the recording paper to the discharge tray 8, the upper and lower discharge rollers 74 are in a state pressing against each other, and on the other hand, when staple processing is performed for the recording paper, the upper and lower discharge rollers 74 are in a state separated from each other. The home position of the upper and lower discharge rollers 74 is their position when they are pressing against each other.

By providing the upper and lower discharge rollers 74 so that they can be put in pressure-contact with or separated from each other, there are merits as follows. When staple processing is performed, the upper and lower discharge rollers 74 are put in a separated state, and the leading edge portion of the recording paper fed to the stapling stage 72 is caused to protrude from between the upper and lower discharge rollers 74. Thus, it is possible to shorten the length of the distance in the paper transport direction of the stapling stage 72, and the stapling unit 70 can be made compact. After staple processing, the upper and lower discharge rollers 74 are put in a state pressing against each other, and after staple processing a batch of recording paper is discharged to the discharge tray 8. Thus, it is not necessary to separately provide a mechanism that discharges batches of recording paper to the discharge portion, such as a mechanism that pushes out batches of recording paper.

Following is a description of shifter processing by the discharge rollers 74. In this example, by performing shifter processing on the recording paper with the discharge rollers 74, recording paper is discharged to the discharge tray 8 after having been sorted.

The shifter processing sorts recording paper by shifting the discharge position of the recording paper on the discharge tray 8 in the paper widthwise direction, by discharging the recording paper from a plurality of positions in the paper widthwise direction. This kind of shifter processing becomes possible by, for example, providing the upper and lower discharge rollers 74 such that they can move back and forth in the shaft direction (in the paper widthwise direction of the paper). Specifically, in a state in which the recording paper is chucked by the upper and lower discharge rollers 74, the upper and lower discharge rollers 74 are moved in the shaft direction. Thus, the recording paper chucked by the upper and lower discharge rollers 74 moves in the paper widthwise direction. When the recording paper is discharged to the discharge tray 8 in that position, it is possible to shift the discharge position of the recording paper on the discharge tray 8 in paper widthwise direction. In this manner, for example, it is possible to sort the recording paper into sets of copies, and to have the last page of a first set of copies and the first page of a second set of copies discharged at different positions. And, by also using the roller pair in the discharge roller portion 74 as shifter rollers, it is possible to reduce cost, reduce the number of components, realize a more compact apparatus, and the like. Also, after the recording paper is discharged, the upper and lower discharge rollers 74 return to their original positions.

As described above, because the upper and lower discharge rollers 74 are provided such that they can be put in pressure-contact or separated, there are the following merits. Conventionally, when the discharge rollers are also used as shifter rollers, shifter processing is not performed when staple processing has been performed. That is, because it is not possible for the rollers to be put in pressure-contact or separated, the shifter function of the discharge rollers is only compatible with one page of recording paper for which staple processing has not been performed, and the shifter function is not compatible with a recording paper batch for which staple processing has been performed. On the other hand, in this example, by putting the discharge rollers 74 in a pressure-contact state after staple processing, the recording paper batch can be reliably chucked after staple processing, and in this state shifter processing can be performed. Thus, shifter processing can be likewise performed for either one page of recording paper for which staple processing has not been performed or for a batch of recording paper for which staple processing has been performed.

Sliding of the Stapling Unit 70

Following is a description of the movement of the stapling unit 70 in the paper transport direction. In this example, the stapling unit 70 is configured so that it moves back and forth in the paper transport direction with the discharge tray 8 and a bottom portion 89 below the discharge tray 8, described below. The direction in which the stapling unit 70 is made to slide may be in the direction of the paper transport direction.

A slide rail 75 is provided between the bottom of the stapling unit 70 and an exterior 90 of the apparatus main body. For example, the slide rail 75 can be a slide rail using ball bearings such as Accuride (registered trademark). Specifically, the slide rail 75 is configured to lie between a rail installed to the lower portion of the stapling unit 70 and a rail installed to the exterior 90 of the apparatus main body, in a holding member that holds the ball bearings. Due to the rail on the side of the stapling unit 70 sliding relative to the rail on the side of the exterior 90 of the apparatus main body via the ball bearings, smooth sliding relative to the apparatus main body of the stapling unit 70 is possible.

Figure 7:
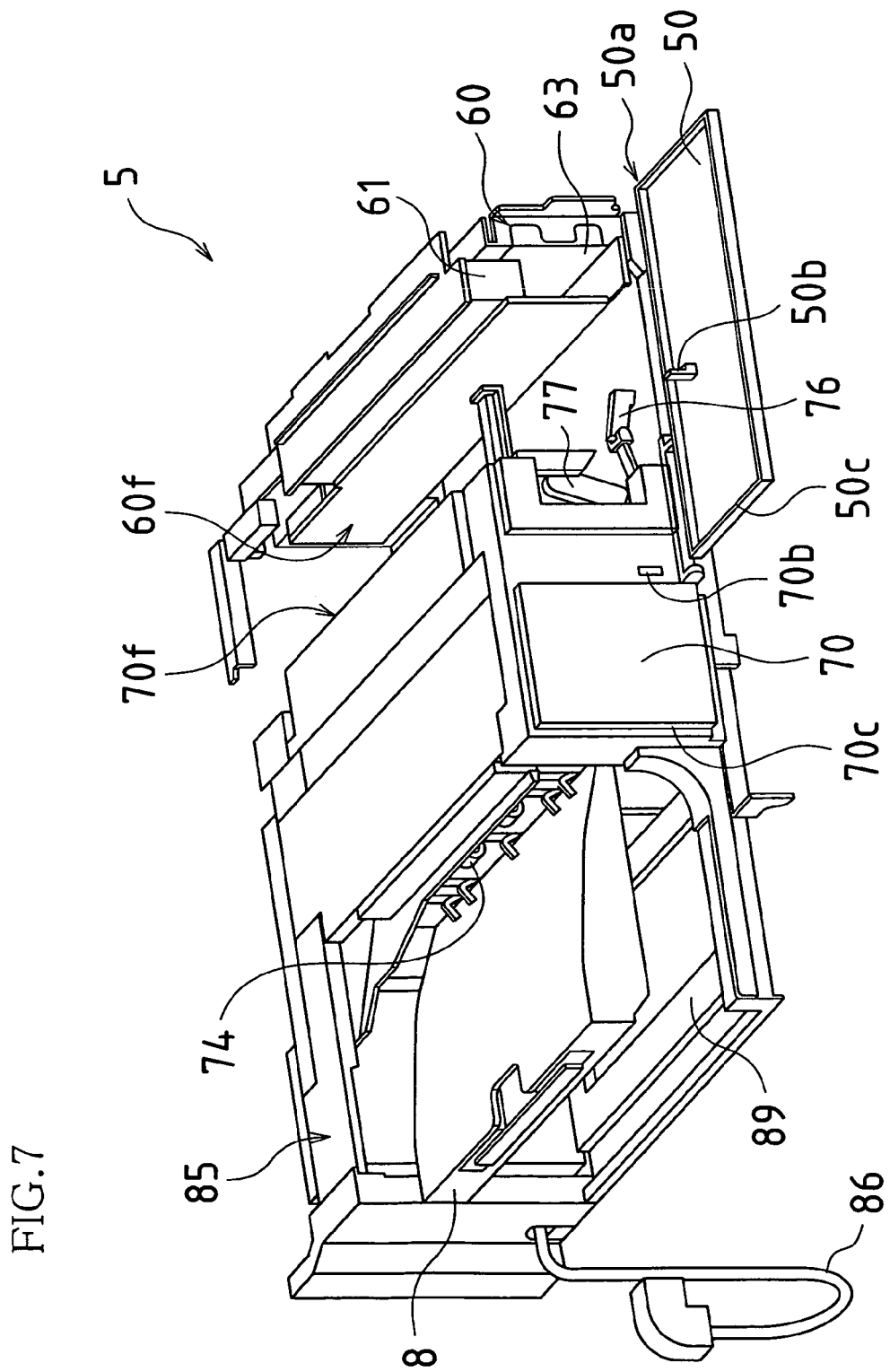
FIG. 7 is a perspective view that shows a state in which a discharge tray and a stapling unit are slid.
Figure 8:
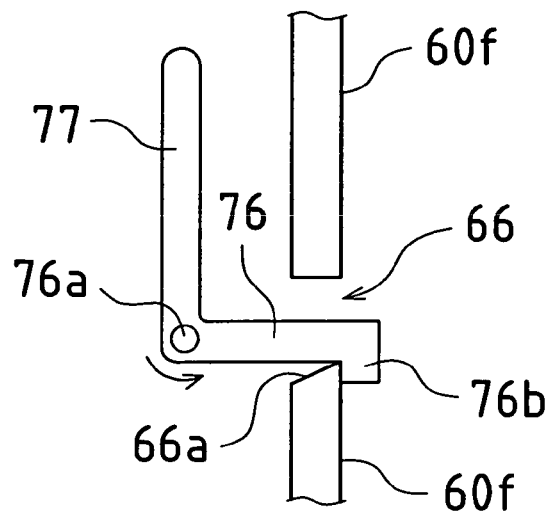
FIG. 8 is an explanatory diagram that shows the engagement of a stapling unit hook and a punching unit engaging groove.
Figure 8:
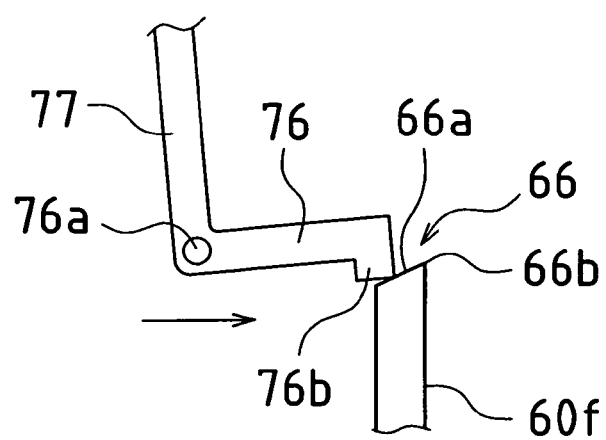
Figure 8:
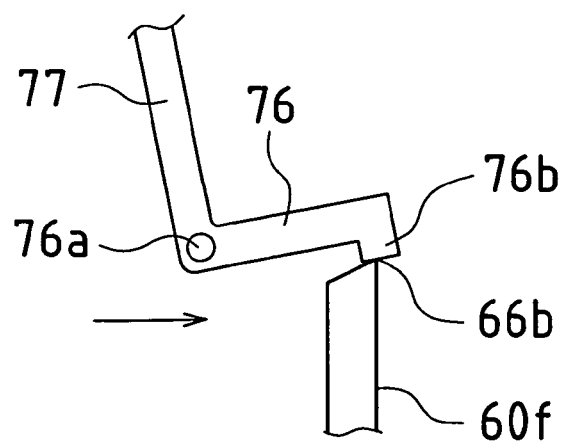

Ordinarily, the stapling unit 70 is disposed such that it is in contact with the punching unit 60 fixed to the apparatus main body. On the other hand, when a jam has occurred in the main transport path 51 or the switchback transport path 52, the stapling unit 70 is slid to the downstream side in the paper transport direction when exchanging and replenishing staples and the like. As shown in FIG. 7, due to this sliding a space is formed between the stapling unit 70 and the punching unit 60. Thus, visibility improves, and it is possible to perform work by inserting a hand in this space. As a result, it is possible to easily remove recording paper that is jammed in the main transport path 51 or the switchback transport path 52, and jam handling work can be easily performed. In addition, work to exchange and replenish staples can also be easily performed.

At this time, the sidable distance of the stapling unit 70 to the downstream side in the paper transport direction is, at most, a distance at which an edge portion the stapling unit 70 on the downstream side in the paper transport direction does not protrude from the side face of the compound machine 1. That is, the stapling unit 70 is sidable in a range that the edge portion on the downstream side in the paper transport direction does not protrude from the apparatus main body. In this manner, a limit is provided on the range in which the stapling unit 70 can slide, so that the slide rail 75 does not change shape or the like.

As described above, the stapling unit 70 is disposed such that it ordinarily makes contact with the punching unit 60 fixed to the apparatus main body. At this time, as shown in FIG. 8(a), the stapling unit 70 is fixed to the punching unit 60, due to a hook 76 provided in the stapling unit 70 engaging with an engaging groove 66 provided in the punching unit 60. The hook 76 is provided such that it can rotate around a rotational fulcrum 76a. Also, the hook 76 is biased in the direction that rotates clockwise around the rotational fulcrum 76a. A leading edge portion 76b of the hook 76 is formed in approximately an L shape, such that it engages with the engaging groove 66. The other edge of the hook 76 is linked to a hook lever 77.

The stapling unit 70 is caused to slide to downstream side in the paper transport direction in the following manner. By operating the hook lever 77 so that the hook 76 rotates around the rotational fulcrum 76a in the counterclockwise direction, against the biasing force, engagement of the hook 76 and the engaging groove 66 is released. Thus, it is possible to move the stapling unit 70 to the downstream side in the paper transport direction. By moving the stapling unit 70 to the downstream side in the paper transport direction, jam handling work and the like can be easily performed, as stated above.

Conversely, with jam handling work and the like completed, the stapling unit 70 is fixed to the punching unit 60 by doing as follows. As shown in FIG. 8(b), when the stapling unit 70 is slid to the upstream side in the paper transport direction and nears the punching unit 60, the leading edge portion 76b of the hook 76 makes contact with an inclined face 66a of the engaging groove 66. Further, as shown in FIG. 8(c), by sliding the stapling unit 70 to the upstream side in the paper transport direction from this state, the hook 76 rotates around the rotational fulcrum 76a in the counterclockwise direction, against the biasing force. Further, by sliding the stapling unit 70 to the upstream side in the paper transport direction, the hook 76 climbs over an apex 66b of the engaging groove 66, and the hook 76 engages the engaging groove 66, as shown in FIG. 8(a). Thus, the stapling unit 70 is fixed to the punching unit 60, and it becomes impossible for the stapling unit 70 to move to the downstream side in the paper transport direction. Also, the stapling unit 70 may be provided with an engaging groove, and the punching unit 60 provided with a hook.

Cover 50

Figure 3:
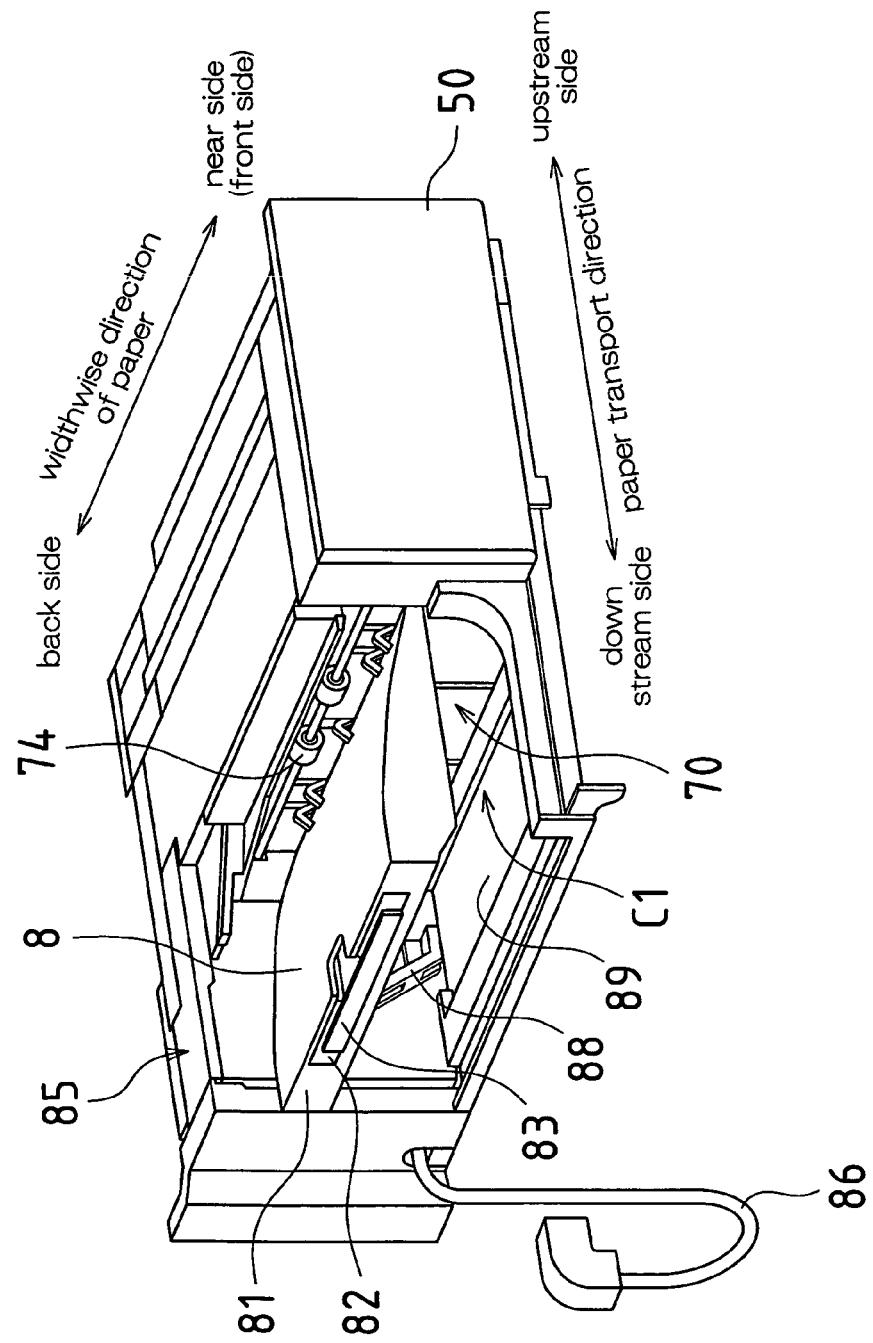
FIG. 3 is a perspective view that shows a paper post-processing portion and a discharge tray, and shows a state in which a discharge tray is retracted and raised, and in which a cover is closed.
Figure 4:
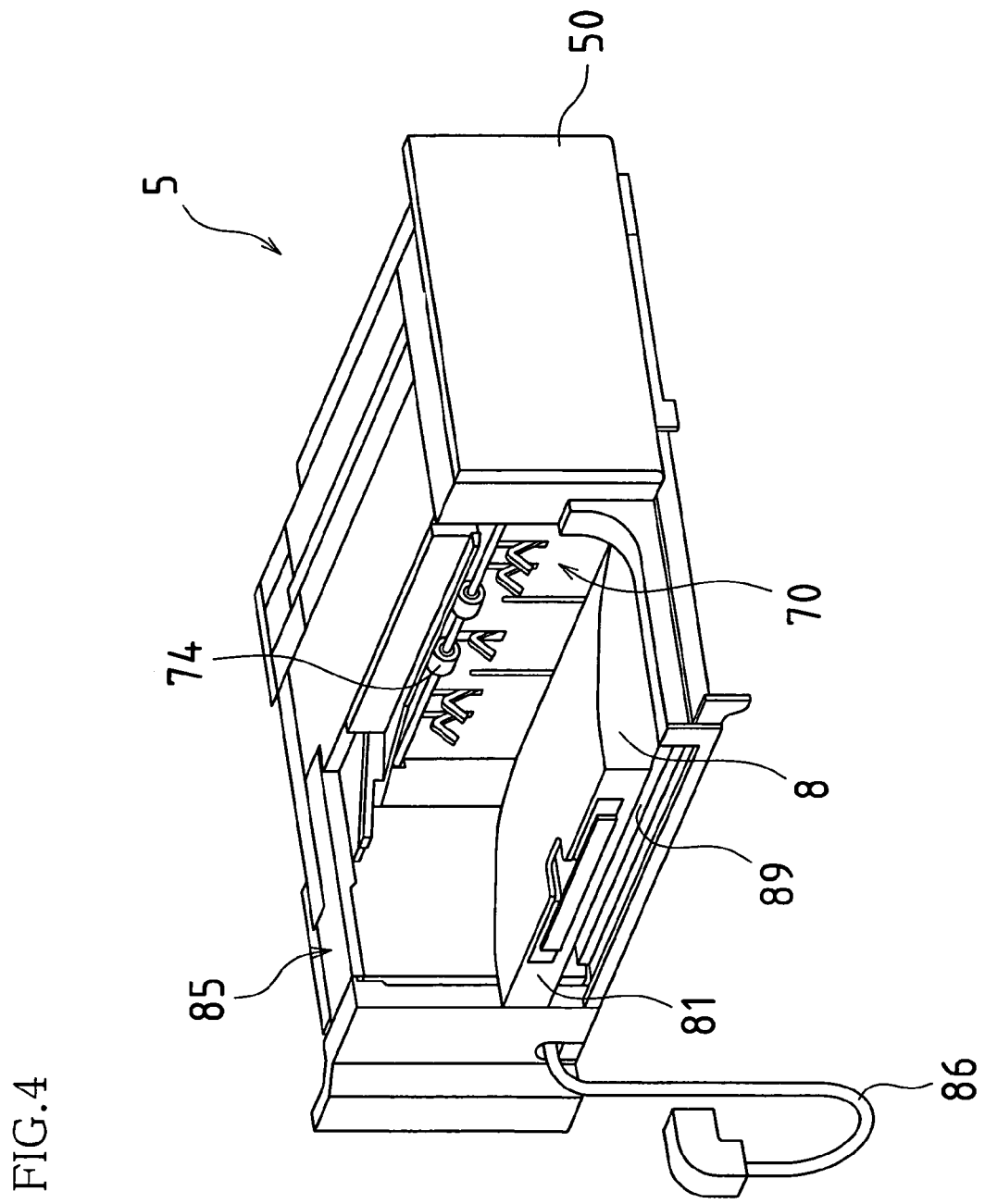
FIG. 4 is a perspective view that shows a state in which a discharge tray is lowered.
Figure 5:
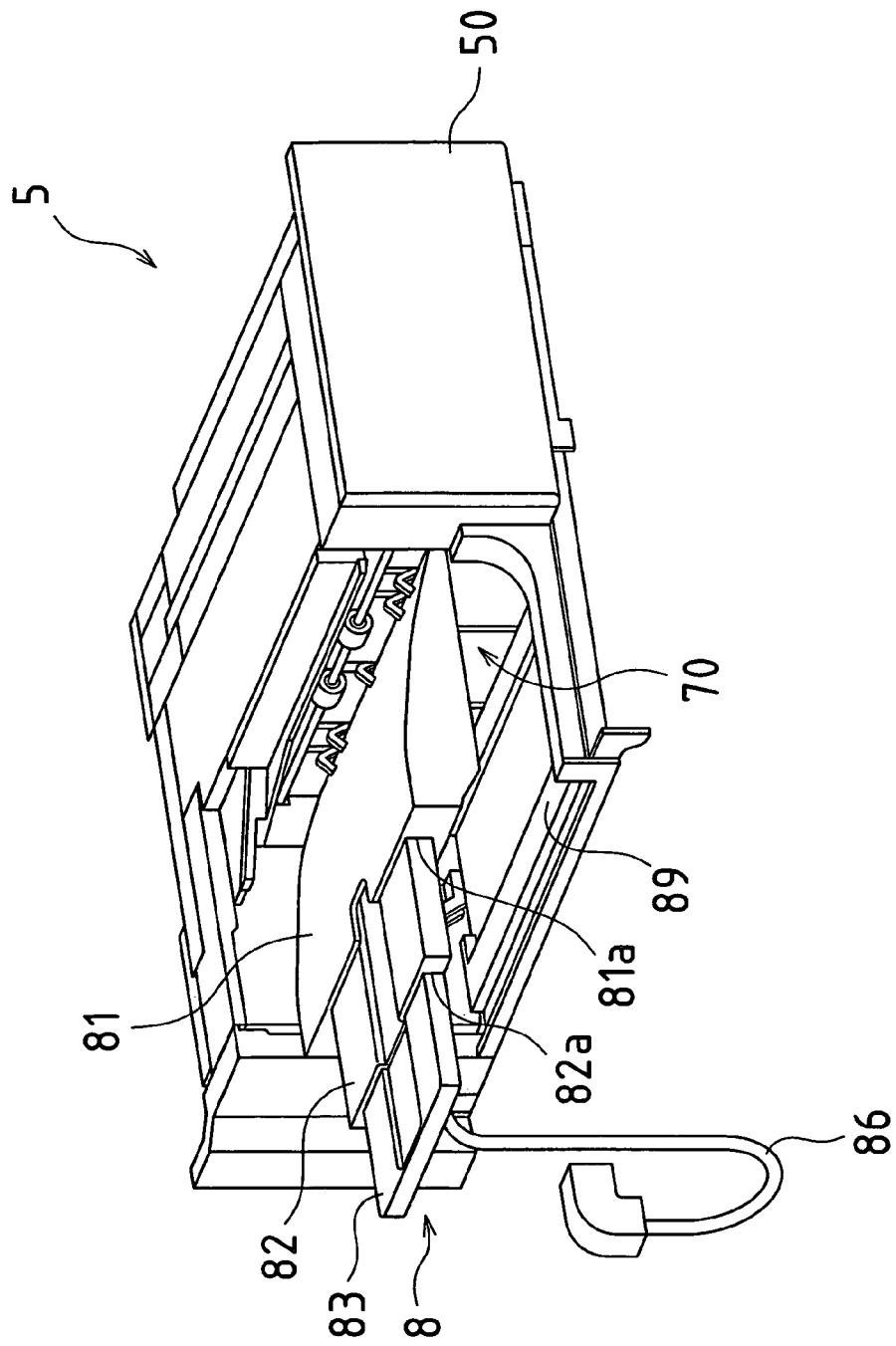
FIG. 5 is a perspective view that shows a state in which a discharge tray is extended.
Figure 6:
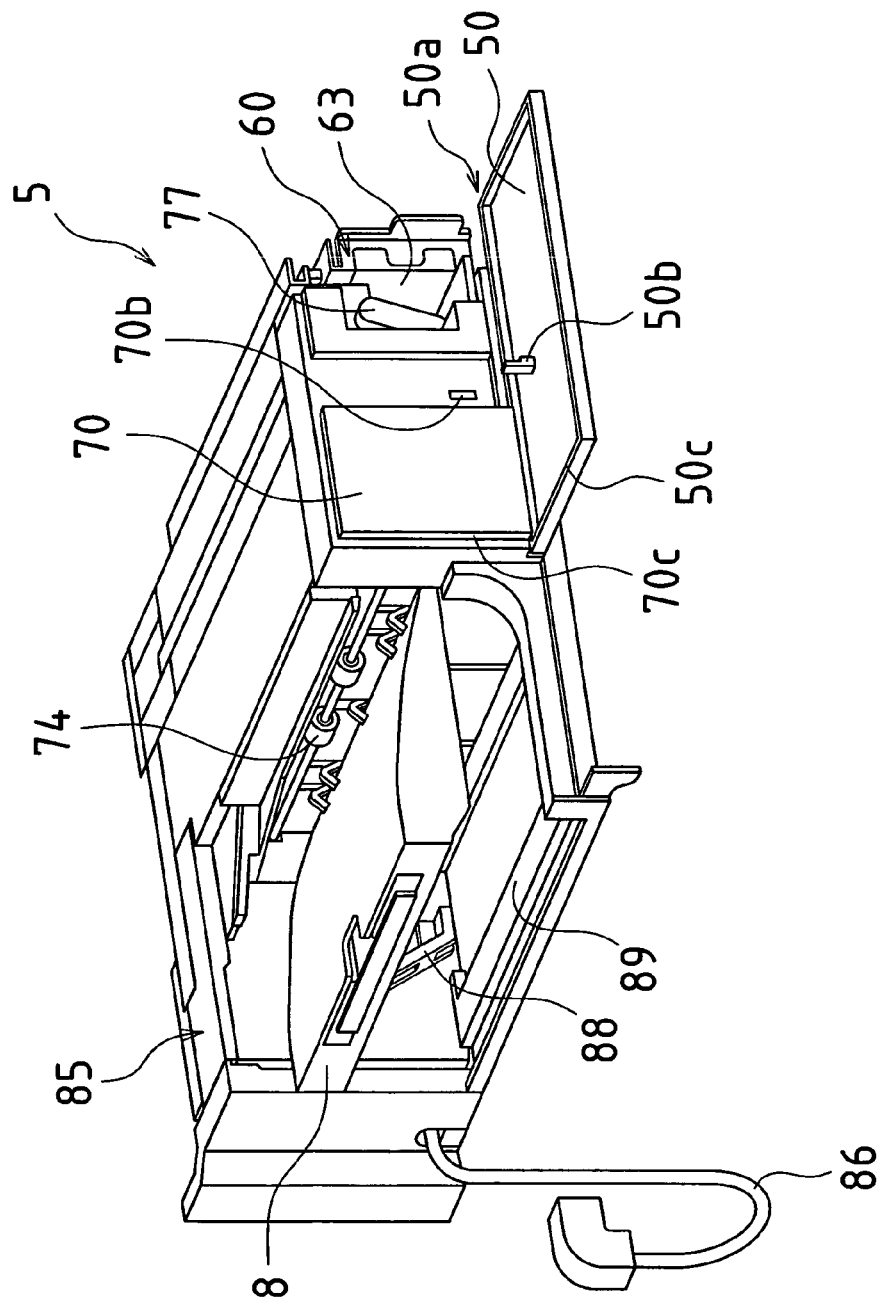
FIG. 6 is a perspective view that shows a state in which a cover is opened.

The cover 50, as described above, is provided such that it is possible to open and close the face of the near side of the paper post-processing portion 5. The cover 50 is rotatable around a rotating shaft 50a provided in the lower portion of the cover 50. As shown in FIGS. 3 to 5, in a closed state the cover 50 covers the face of the near side of the paper post-processing portion 5. Conversely, as shown in FIGS. 6 and 7, in an open state the cover 50 is disposed approximately horizontally and opens the near side of the paper post-processing portion 5. In this manner, when the cover 50 is opened, it is possible to remove the punch chip storage box 63 to the near side and dispose of punch chips in the punch chip storage box 63.

The cover 50 is formed in a rectangular shape when viewed from the front, with a size that can cover the entire near-side face of the punching unit 60 and the stapling unit 70. In the cover 50, a protrusion 50b is formed that protrudes towards the back side (the internal side of the paper post-processing portion 5), and when the cover 50 is closed, the cover 50 is fixed to the paper post-processing portion 5 due to this protrusion 50b engaging an engaging hole portion 70b formed in the stapling unit 70. A protrusion that protrudes towards the back side is also formed on the exterior of the cover 50, and when the cover 50 is closed, the protrusion of the cover 50 makes contact with the edge portions of the face of the near side of the punching unit 60 and stapling unit 70. Of these, a protrusion 50c formed in the edge portion of the side of the stapling unit 70 is provided as a regulatory protrusion for regulating the position of the stapling unit 70.

Figure 9:
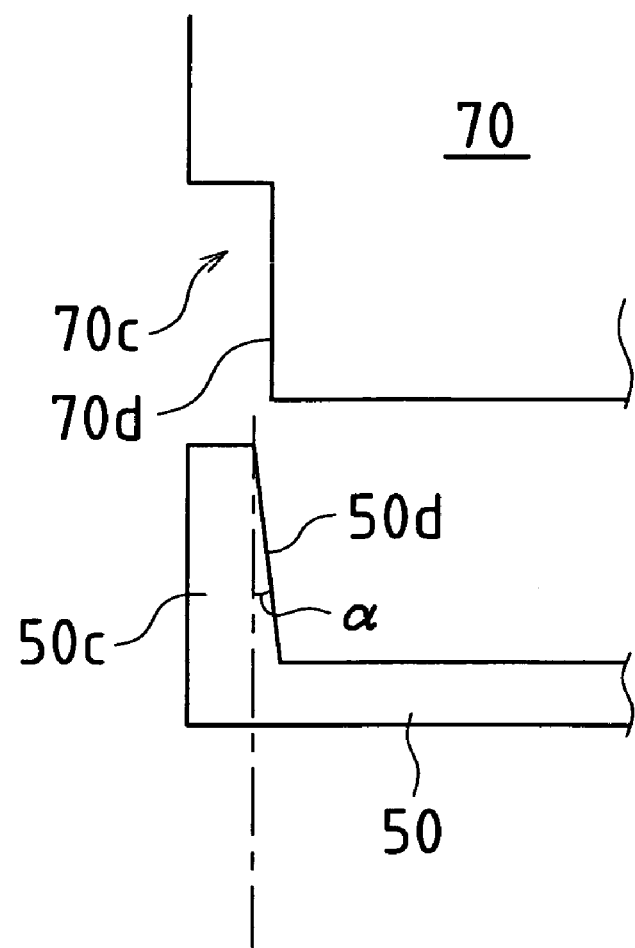
FIG. 9 is an explanatory diagram that shows the abutment of a cover regulatory protrusion and a stapling unit regulatory groove portion.

The regulatory protrusion 50c makes contact with a regulatory groove portion 70c formed in the edge portion on the upstream side in the paper transport direction of the face of the near side of the stapling unit 70. As shown in FIG. 9, in a plan view, a contact face 50d of the regulatory protrusion 50c with the regulatory groove portion 70c is not formed parallel to the paper transport direction (shown by the dashed line in FIG. 9), the contact face 50d is formed inclined an angle a relative to the paper transport direction. In this way, it is formed so that the width of the regulatory protrusion 50c in the paper transport direction becomes gradually smaller towards the leading edge side (smaller towards the internal side of the paper post-processing portion 5). On the other hand, a contact face 70d with the side of the regulatory groove portion 70c of the stapling unit 70 is formed parallel to the paper transport direction in a plan view.

Providing the regulatory protrusion 50c as described above in the cover 50 has the following sorts of merits. As described above, the stapling unit 70 is provided such that it can be engaged to or removed from the punching unit 60. Also, the stapling unit 70 is fixed to the punching unit 60 by the hook 76 of the stapling unit 70 engaging the engaging groove 66 of the punching unit 60. At this time, their respective boundary faces 60f and 70f face each other. However, because the hook 76 is engaged to the engaging groove 66 by the leading edge portion 76b of the hook 76 climbing over the apex 66b of the engaging groove 66, a gap is generated between the respective boundary faces 60f and 70f.

In this example, after fixing the stapling unit 70 by sliding the stapling unit 70 to the upstream side in paper transport direction and engaging the hook 76 to the engaging groove 66, the cover 50 is closed. In this case, when the cover 50 is rotated and closed, the regulatory protrusion 50c of the cover 50 makes contact with the regulatory groove portion 70c of the stapling unit 70. Further, when the cover 50 is closed, the contact position of the regulatory protrusion 50c and the regulatory groove portion 70c gradually moves towards the near side along the incline of the contact face 50d of the regulatory protrusion 50c. Thus, the stapling unit 70 is pushed against the side of the punching unit 60. When the cover 50 is completely closed by engaging the above protrusion 50b with the engaging hole portion 70b, the boundary face 70f of the stapling unit 70 approaches the boundary face 60f of the punching unit 60 to a position where there is approximately no gap, and in this state the stapling unit 70 is fixed.

In this way, the regulatory protrusion 50c, which makes contact with the stapling unit 70 when the cover 50 is closed, is provided, and it is possible to make the gap generated between the stapling unit 70 and the punching unit 60 when the cover 50 is closed as small as possible. Thus, the fixing position of the stapling unit 70 can be regulated, and it is possible to prevent vibration of the stapling unit 70.

Also, the cover 50 is provided such that it performs the role of a switch that switches the operation of the compound machine 1 on/off. The operation of the compound machine 1 is the operation of each portion of the compound machine 1 such as when performing print processing, paper post-processing, and the like, and when the cover 50 is closed, operation of the compound machine 1 is on and various processing such as paper post-processing when performing print processing is permitted and possible. Conversely, when the cover 50 is open, operation of the compound machine 1 is on and various processing such as print processing and paper post-processing are prohibited and not possible. In this way, operation of the compound machine 1 is switched on/off in accordance with opening and closing the cover 50. Also, when a print request has been made, if the cover 50 is open, the user is prompted to close the cover 50.

By providing this sort of cover 50 that performs the role of an on/off switch in the paper post-processing portion 5, print processing, paper post-processing, and the like are not performed with the cover 50 in an open state, such as when performing jam handling work, work to exchange or replenish staples, and the like. Thus it is possible to ensure the safety of the compound machine 1 provided with the paper post-processing portion 5.

Other than the cover 50, an opening and closing door is provided in the compound machine 1. Accordingly, operation of the compound machine 1 including the cover 50 may be turned on when all of the doors of the compound machine 1 including the cover 1 are closed, and turned off when any door of the compound machine 1 including the cover 1 is opened.

Transport of Recording Paper in Paper Post-Processing Portion 5

Following is a description of transport of the recording paper in the paper post-processing portion 5. As stated above, the main transport path 51 and the switchback transport path 52 are formed in the paper post-processing portion 5.

The main transport path 51 is formed from the discharge rollers 36e of the apparatus main body through the punching unit 60 to the discharge rollers 54 disposed in a midway portion of the stapling unit 70. After completion of print processing, recording paper discharged from the discharge rollers 36e of the apparatus main body is transported along this main transport path 51 to the stapling stage 72 or the switchback transport path 52 of the stapling unit 70. When there has been a request for punch processing as a print condition when a print request has been made, after the completion of duplex print processing or simplex print processing, the recording paper that has been transported in the main transport path 51 is stopped on the guide plate 62. Then, the cores 64 of the hole-punching mechanism portion 61 are lowered, opening punch holes at predetermined positions of the trailing edge portion of the recording paper.

The switchback transport path 52 is formed in the upper portion of the stapling unit 70, from the discharge rollers 54 (i.e. the discharge stage) to the switchback rollers 55. In the switchback transport path 52, when the recording paper is transported from the discharge rollers 54 to the switchback rollers 55, in a state with the trailing edge portion of the recording paper chucked by the switchback rollers 55, the switchback rollers 55 are rotated in reverse. Thus, the recording paper is reversed, and this time, the recording paper is transported from the switchback rollers 55 towards the discharge rollers 54.

The switchback transport path 52 is used when print processing is performed for both sides of the recording paper. That is, when duplex printing is performed in the compound machine 1, the recording paper for which print processing for the front face is complete is guided from the main transport path 36 of the apparatus main body to the switchback transport path 52 via the main transport path 51, and is reversed in this switchback transport path 52. Then, the reversed recording paper is this time transported from the switchback transport path 52 through the main transport path 51 to the main transport path 36 of the apparatus main body, and further, guided to the reverse transport path 37, making it possible to perform print processing for the back face of the recording paper. The recording paper for which print processing for the back face is complete is discharged from the discharge rollers 36e of the apparatus main body through the main transport path 51 to the stapling stage 72 of the stapling unit 70.

On the other hand, when print processing is not performed for both sides of the recording paper, i.e., when print processing is performed only for one side of the recording paper, the recording paper for which print processing is complete is discharged as-is from the discharge rollers 54 to the stapling stage 72, without being transported from the main transport path 51 to the switchback transport path 52.

By providing the switchback transport path 52 in the stapling unit 70 and performing recording paper switchback with the switchback transport path in this manner, the transport distance of the recording paper shortens in comparison to a case in which switchback is performed with the rollers that discharge the recording paper to the discharge tray 8. Accordingly, it is possible to improve the printing efficiency of the compound machine 1 when performing duplex printing.

Also, in this example, a transport path such as the main transport path 51 and the switchback transport path 52 is not formed in the interval from the discharge roller 54 to the stapling stage 72, and the recording paper is discharged from the discharge rollers 54 in a slackened state. Thus, when switchback is performed with the recording paper in a state chucked by the discharge rollers 54, there is a possibility of wrinkles or the like occurring in the recording paper. Accordingly, in this example, recording paper switchback is not performed with the discharge rollers 54, and the occurrence of wrinkles or the like in the recording paper is prevented by providing the switchback transport path 52. The reason for not forming the switchback transport path 52 in the punching unit 60 disposed on the side further upstream than the stapling unit 70 is that, as described above, the hole-punching mechanism portion 61 is disposed in the upper portion of the punching unit 60.

The recording paper transport as described above is made possible by the rotational operation of the branching gate 53 disposed at the joint position of the downstream side of the main transport path 51 and the upstream side of the switchback transport path 52 (the branch position of the main transport path 51 and the switchback transport path 52). The branching gate 53 is provided such that it can rotate around a horizontal shaft between a first position in FIG. 2 (the position shown by the solid line) and a second position in FIG. 2 (the position shown by the double-dashed line) where the switchback transport path 52 is opened by rotating in the clockwise direction. When the branching gate 53 is in the first position, the recording paper can be discharged towards the stapling stage 72, and when in the second position, the recording paper can be discharged to the switchback transport path 52. The first position is the home position of the branching gate 53.

When there has been a request for simplex print processing as a print condition when a print request has been made, the branching gate 53 is in the first position, and after front face printing is completed the recording paper is guided to the stapling stage 72. On the other hand, when there has been a request for duplex print processing as a print condition when a print request has been made, after the leading edge of the recording paper passes the fixing unit 39 following completion of print processing for the front face, the branching gate 53 switches from the first position to the second position. Thus, after the completion of front face printing the recording paper is guided to the switchback transport path 52. Also, after the leading edge portion of the recording paper passes the fixing unit 39 following completion of print processing for the back face, the branching gate 53 switches from the second position to the first position. Thus, after completion of back face printing the recording paper is guided to the stapling stage 72.

Further, when there has been a request for staple processing as a print condition when a print request has been made, when discharging the recording paper towards the stapling stage 72, the branching gate 53, which is in the first position, is swung after the trailing edge portion of the recording paper has separated from the discharge rollers 54. By repeating this sort of swinging of the branching gate 53 several times, the trailing edge portion of the recording paper, which has separated from the discharge rollers 54 and dropped to the stapling stage 72, is hit towards the downward direction. Thus, the recording paper quickly reaches the stapling stage 72.

As described above, when staple processing is performed, the recording paper that has been discharged to the stapling stage 72 slides down along the incline of the stapling stage 72 to the upstream side in the paper transport direction due to its own weight. At this time, while the recording paper is sliding down, the next page of recording paper is discharged, and when two pages of recording paper are stacked, it can become more difficult for the bottom page of recording paper to slide down. Accordingly, the next page of recording paper is discharged to the stapling stage 72 after waiting for the recording paper to slide down to the edge portion of the stapling stage 72. Thus, the printing efficiency of the compound machine 1 worsens to the extent that time is needed until the recording paper slides down to the edge portion of the stapling stage 72. Accordingly, in this example, by swinging the branching gate 53 and hitting the trailing edge portion of the recording paper, the time until the recording paper slides down to the edge portion of the stapling stage 72 is made as short as possible, improving the printing efficiency of the compound machine 1.

The recording paper discharged from the discharge rollers 54 towards the stapling stage 72 gradually makes contact with the stapling stage 72, beginning with the leading edge of that recording paper. While the recording paper is being discharged from the discharge rollers 54, the leading edge portion of the recording paper reaches the discharge rollers 74 on the furthest downstream side of the stapling stage 72. Subsequent recording paper transport varies according to whether or not staple processing is performed by the stapling unit 70.

When staple processing is not performed, because the upper and lower discharge rollers are in a state of pressure-contact, the recording paper is fed by the discharge rollers 74 and discharged to the discharge tray 8. At this time, when there has been a request for shifter processing as a print condition when a print request has been made, the recording paper is discharged to the discharge tray 8 after shifter processing by the discharge rollers 74 described above.

On the other hand, when staple processing is performed, the upper and lower discharge rollers 74 are in a separated state. Thus, the recording paper is not fed by the upper and lower discharge rollers 74 even if the leading edge portion of the recording paper is fed between the discharge rollers 74 by the discharge rollers 54. Accordingly, when the trailing edge of the recording paper is separated from the discharge rollers 54 and the transport force to the downstream side in the paper transport direction is lost, the recording paper now slides down along the incline of the stapling stage 72 to the upstream side in the paper transport direction due to its own weight. As a result, adjustment of the paper transport direction relative to the recording paper is performed.

Then, after a predetermined number of pages of the recording paper are discharged from the discharge rollers 54, adjusted in the stapling stage 72 and stacked, staple processing is performed in the trailing edge portion of the recording paper by the stapling mechanism portion 71. At the time of this staple processing, the midway portion of the recording paper is between the upper and lower discharge rollers 74, which are in a separated state. After staple processing is finished, the upper and lower discharge rollers 74 are put in pressure-contact, and a batch of recording paper is discharged to the discharge tray 8 by driving the discharge rollers 74. At this time, when there has been a request for shifter processing as a print condition when a print request has been made, the recording paper is discharged to the discharge tray 8 after shifter processing by the above discharge rollers 74.

Here, as stated above, because the upper and lower discharge rollers 74 are provided also as drive rollers, there are merits such as follows. In this example, a batch of recording paper is discharged by the discharge rollers 74 after staple processing, but in this case, when only one of the discharge rollers 74 is a drive roller, and the other is an idler roller, the rotation of the drive roller becomes difficult to transmit to the idler roller as the number of pages in the recording batch increases. As a result, the recording paper can be torn at a position where it is bound with a staple. On the other hand, by making the upper and lower discharge rollers 74 both drive rollers, the recording paper is not damaged, and it can be smoothly discharged to the discharge tray 8.

Discharge Tray 8

Following is a description of the discharge tray 8.

The discharge tray 8 is provided along with the above paper post-processing portion 5 in an interior space C in the shape of a sideways U formed by the apparatus main body of the compound machine 1. Recording paper on which paper post-processing such as punch processing and staple processing has been performed in the paper post-processing portion 5 is discharged to the discharge tray 8. The discharge tray 8 is provided such that it can be extended and retracted in the paper transport direction (the discharge direction of the recording paper). Also, the discharge tray 8 is provided such that it can be raised and lowered vertically. Further, the discharge tray 8 is provided such that it can slide relative to the apparatus main body.

As shown in FIGS. 3 and 5, the discharge tray 8 is provided as a tray that can be extended and retracted to steps 1 to 3 in the paper transport direction. In this example, the discharge tray 8 is configured such that it can be extended and retracted manually by the user in the paper transport direction according to the printing paper size.

The discharge tray 8 is provided with a first discharge tray 81, a second discharge tray 82, and a third discharge tray 83. The first discharge tray 81 is the tray with the largest size, and is disposed nearest to the paper post-processing portion 5. The first discharge tray 81 is formed with a length such that it does not protrude from the side face (the side wall) of the compound machine 1. This first discharge tray 81 is provided such that it cannot move in the paper transport direction.

The second discharge tray 82 is the tray with intermediate size, and is stored in a storage portion 81a formed in the first discharge tray 81. This second discharge tray 82 is provided such that advancing or retreating movement in the paper transport direction is possible. The third discharge tray 83 is the tray with the smallest size, and is stored in a storage portion 82a formed in the second discharge tray 82. This third discharge tray 83 is provided such that advancing or retreating movement in the paper transport direction is possible.

As shown in FIG. 3, in a state with the discharge tray 8 retracted to only step 1, the length of the discharge tray 8 in the paper transport direction is shortest, the third discharge tray 83 is completely stored in the second discharge tray 82, and the second discharge tray 82 is completely stored in the first discharge tray 81. At this time, the length of the discharge tray 8 in the paper transport direction is the same as the length of the first discharge tray 81 in the paper transport direction, and is a length that does not protrude from the side face of the compound machine 1. In this way, by making the discharge tray 8 not protrude from the apparatus main body in the most retracted state, it is made possible to store the discharge tray 8 in the space of the apparatus main body.

On the other hand, as shown in FIG. 5, in a state with the discharge tray 8 extended to step 3, the length of the discharge tray 8 in the paper transport direction is longest, the second discharge tray 82 protrudes the maximum from the first discharge tray 81, and the third discharge tray 83 protrudes the maximum from the second discharge tray 82. At this time, the length of the discharge tray 8 in the paper transport direction is longer than the length in the paper transport direction of the largest size of recording paper that can be printed with the compound machine 1. Thus, when the discharge tray 8 is extended to its maximum length, even recording paper with the maximum printable size can by stably stacked. As described below, the discharge tray 8 is slidable along with the stapling unit 70, but even if the discharge tray 8 is slid in a state with recording paper stacked, the recording paper will not fall from the discharge tray 8.

As stated above, the discharge tray 8 is provided such that it can extend and retract in the paper transport direction, and so it is possible to use the discharge tray 8 adjusted to an optimum length according to the printing paper size.

Also, as shown in FIGS. 3 and 4, the discharge tray 8 is formed as a tray that can be raised and lowered in the vertical direction. In this example, the discharge tray 8 is configured such that it is raised and lowered according to the quantity (number of pages) of recording paper that is stacked.

The quantity of recording paper discharged to the discharge tray 8 is detected by an upper limit sensor 84 formed in the vicinity of the bottom side discharge rollers 74. This upper limit sensor 84 is provided as a contact sensor. When the topmost face of the recording paper stacked on the discharge tray 8 reaches a predetermined height, the upper limit sensor 84 turns on. Thus, a full discharge tray 8 is detected. Then, due to detecting that the discharge tray 8 is full, the discharge tray 8 is lowered only a predetermined distance. With this lowering of the discharge tray 8, the upper limit sensor turns off. By switching the upper limit sensor 84 on/off in this way, the quantity of recording paper stacked on the discharge tray 8 is detected. In this example, the home position of the discharge tray 8 is the position with the discharge tray 8 raised highest (the position shown in FIG. 3), and the edge portion on the upstream side of the discharge tray 8 is disposed directly below the discharge rollers 74. The discharge tray 8 is gradually lowered as the quantity of stacked recording paper increases. The upper limit sensor 84 may also be provided as an optical sensor.

As described above, the discharge tray 8 is provided such that it can extend and retract, and it is configured such that when the discharge tray 8 raises and lowers, due to the first discharge tray 81 raising and lowering, the second discharge tray 82 and the third discharge tray 83 raise and lower with this first discharge tray 81.

Raising and lowering of the first discharge tray 81 is performed, for example, in the following manner. A drive portion 85 for raising and lowering the first discharge tray 8 is provided on the back side of the first discharge tray 81. A drive belt (not shown) is stored in this drive portion 85, and the drive belt can be driven by a power source not shown in the figures that is connected by a wire 86. A support member that supports the leading edge portion of the first discharge tray 81 is linked to the drive portion 85. The support portion is provided such that it can move back and forth vertically by driving the drive belt. Via this sort of support portion, the power of the drive belt of the drive portion 85 is transmitted to the first discharge tray 81, and thus, the first discharge tray 81 raises and lowers. Also, an arm 88 that supports the first discharge tray 81 is provided in the bottom portion of the first discharge tray 81 The arm 88 is disposed between the first discharge tray 81 and a bottom portion 89. The arm 88 is disposed bent in an L shape, and the angle of that bend is variable. The bend angle of this arm 88 changes according to the rising and falling position of the first discharge tray 81. Also, a protrusion is provided in the edge portion near the paper post-processing portion 5 of the first discharge tray 81. This protrusion engages with a long vertically extending groove portion provided in the paper post-processing portion 5, and can slide in the groove portion.

As described above, making it possible to raise and lower the discharge tray 8, and making the home position of the discharge tray 8 the position with the discharge tray 8 raised highest, has the merits as follows. When the distance of the vertical interval of the discharge tray 8 and the discharge rollers 74 (the discharge position of the recording paper to the tray) is lengthened, stackability worsens because the recording paper is discharged to the discharge tray 8 such that it falls. However, in this example, because the discharge tray 8 is lowered from the highest position according to the quantity of recording paper stacked, the distance of the vertical interval of the discharge tray 8 and the discharge rollers 74 is made as short as possible, the stackability of the recording paper discharged to the discharge tray 8 is well maintained. By lowering the discharge tray 8, a certain stacking quantity of recording paper can be ensured, and the space of the apparatus main body can be effectively used.

Also, when the home position of the discharge tray 8 is made a position lower than the highest raised position, each time the compound machine 1 is started up, from the viewpoint of stackability stated above, it is necessary to elevate the discharge tray 8 to the highest raised position so that the first copy is delayed and printing efficiency may decrease. However, in this example, because the home position of the discharge tray 8 is the highest raised position, such elevation is not necessary, the first copy is not delayed, and it is possible to prevent a decrease in print efficiency.

As described above, the discharge tray 8 can be raised and lowered, and a space C1 is formed in the space formed with the bottom portion 89 below the discharge tray 8. As shown in FIG. 3, for example, although the back side of this space C1 is covered by the above-mentioned drive portion 85 and the like, the near side and the flanking side of the space C1 are open. Thus, for example, items such as recording paper removed from the discharge tray 8 after printing is finished, recording paper planned to next replenish the paper cassette 33, or a toner box planned to be exchanged next can be placed in this space C1. However, when the discharge tray 8 is lowered in a state with such objects placed in the space C1, it is possible that the discharge tray 8 or the drive portion 85 therein will be damaged, or that items placed in the space C1 will be smashed. Accordingly, in this example, the near side and the flanking side of the space C1 below the discharge tray 8 are covered by shield members 91 and 92, respectively. The shield members 91 and 92 are omitted from FIG. 1 and FIGS. 3 to 7.

The upper edge of the shield member 91 provided on the near side of the space C1 is fixed to a portion of the near side of the first discharge tray 81, and the bottom edge of the shield member 91 is fixed to the bottom portion 89. Also, the upper edge of the shield member 92 provided on the flanking side of the space C1 is fixed to a portion of the leading edge side of the first discharge tray 81, and the lower edge is fixed to the bottom portion 89.

In this example, because the discharge tray 8 is provided such that it can raise and lower, the shield members 91 and 92 are respectively provided such that they can extend and retract according to the raising and lowering of the discharge tray 8. As the extendable and retractable shield members 91 and 92, accordion-type members or shutter-type members are used, for example.

In this way, the space below the shield members 91 and 92 is covered, so that the space C1 formed below the discharge tray 8 is not opened. Thus, it is possible to prevent items from being placed in this space C1, and accordingly, when the discharge tray 8 is lowered, the discharge tray 8 is not damaged and items placed in the space C1 are not smashed.

As shown in FIG. 7, the discharge tray 8 can slide relative to the apparatus main body. In this example, the discharge tray 8 is configured so that it moves back and forth in the paper transport direction with the bottom portion 89 and the stapling unit 70. The direction in which the discharge tray 8 is slid may also be the paper widthwise direction.

The bottom portion 89 below the discharge tray 8 is linked to the stapling unit 70 without being fixed to the apparatus main body. As described above, because the stapling unit 70 is provided such that it can slide relative to the apparatus main body, the bottom portion 89 can slide with this stapling unit 70. The bottom portion 89 is linked to the discharge tray 8 via the arm 88, the shield members 92 and 92, and the like, and by the bottom portion 89 sliding, the discharge tray 8 also slides together. A slide rail may also be provided between the bottom portion 89 and the exterior 90 of the apparatus main body.

Control of Paper Post-Processing Portion 5

Following is a description of the procedure of paper post-processing in the compound machine 1, using FIGS. 10 to 26.

Figure 10:
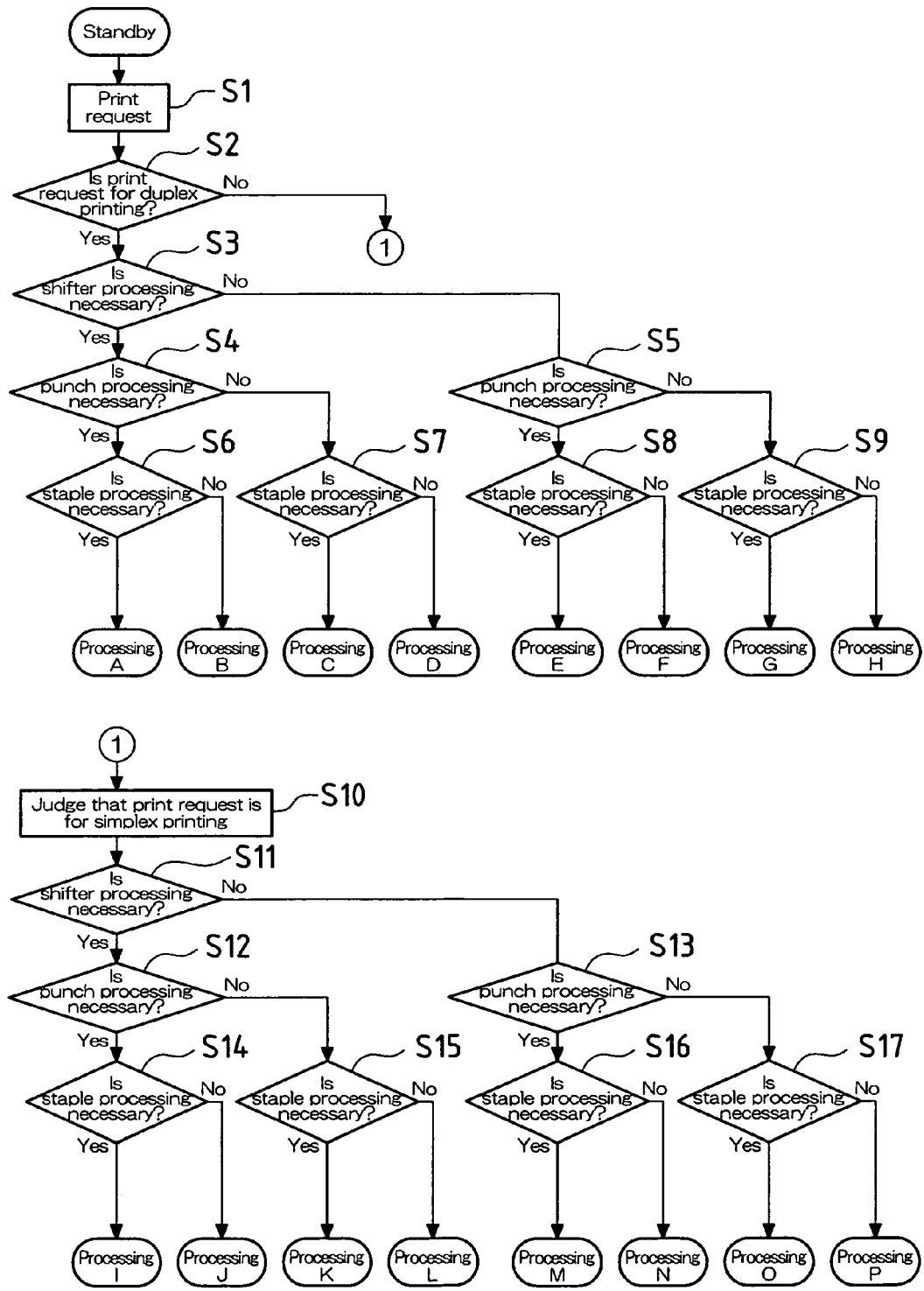
FIG. 10 is a flowchart that shows the procedure of paper post-processing in a compound machine 1.

The control entity of the paper post-processing in the compound machine 1 described below is primarily the control portion (not shown) of the compound machine 1. That is, as shown in FIG. 10, the control portion of the compound machine 1 performs some of the processing of processing A to processing P that corresponds to print conditions selected when a print request has been made (Step S1). The selectable print conditions when a print request has been made include selection of whether duplex print processing or simplex print processing is performed by the compound machine 1, selection of whether or not shifter processing is performed by the discharge rollers 74, selection of whether or not punch processing is performed by the punching unit 60, and selection of whether or not staple processing is performed by the stapling unit 70.

Judgment of the print condition of duplex print processing or simplex print processing is performed in Step S2. Then, when duplex printing has been selected, some processing of the processing A to processing H is performed. On the other hand, when simplex printing has been selected, some processing of the processing I to processing P is performed. The print condition of duplex print processing or simplex print processing is not directly paper post-processing, but in this example, because the switchback transport path 52 used when performing duplex print processing is formed in the stapling unit 70 of the paper post-processing portion 5, the print condition of duplex print processing or simplex print processing is also described together with paper post-processing.

Judgment of the print condition of whether or not to perform shifter processing is performed in Steps S3 and S11. When performance of shifter processing has been selected, some processing of the processing A to D and I to L is performed. On the other hand, when nonperformance of shifter processing has been selected, some processing of the processing E to H and M to P is performed.

Judgment of the print condition of whether or not to perform punch processing is performed in Steps S4, S5, S12, and S13. When performance of punch processing has been selected, some processing of the processing A, B, E, F, I, J, M, and N is performed. On the other hand, when nonperformance of punch processing has been selected, some processing of the processing C, D, G, H, K, L, O, and P is performed.

Judgment of the print condition of whether or not to perform staple processing is performed in Steps S6 to S9 and S14 to S17. When performance of staple processing has been selected, some processing of the processing A, C, E, G, I, K, M, and O is performed. On the other hand, when nonperformance of staple processing has been selected, some processing of the processing B, D, F, H, J, L, N, and P is performed.

In this manner, the 16 types of processing in processing A to P are performed by the compound machine 1 according to the print conditions selected.

Processing A

Figure 11:
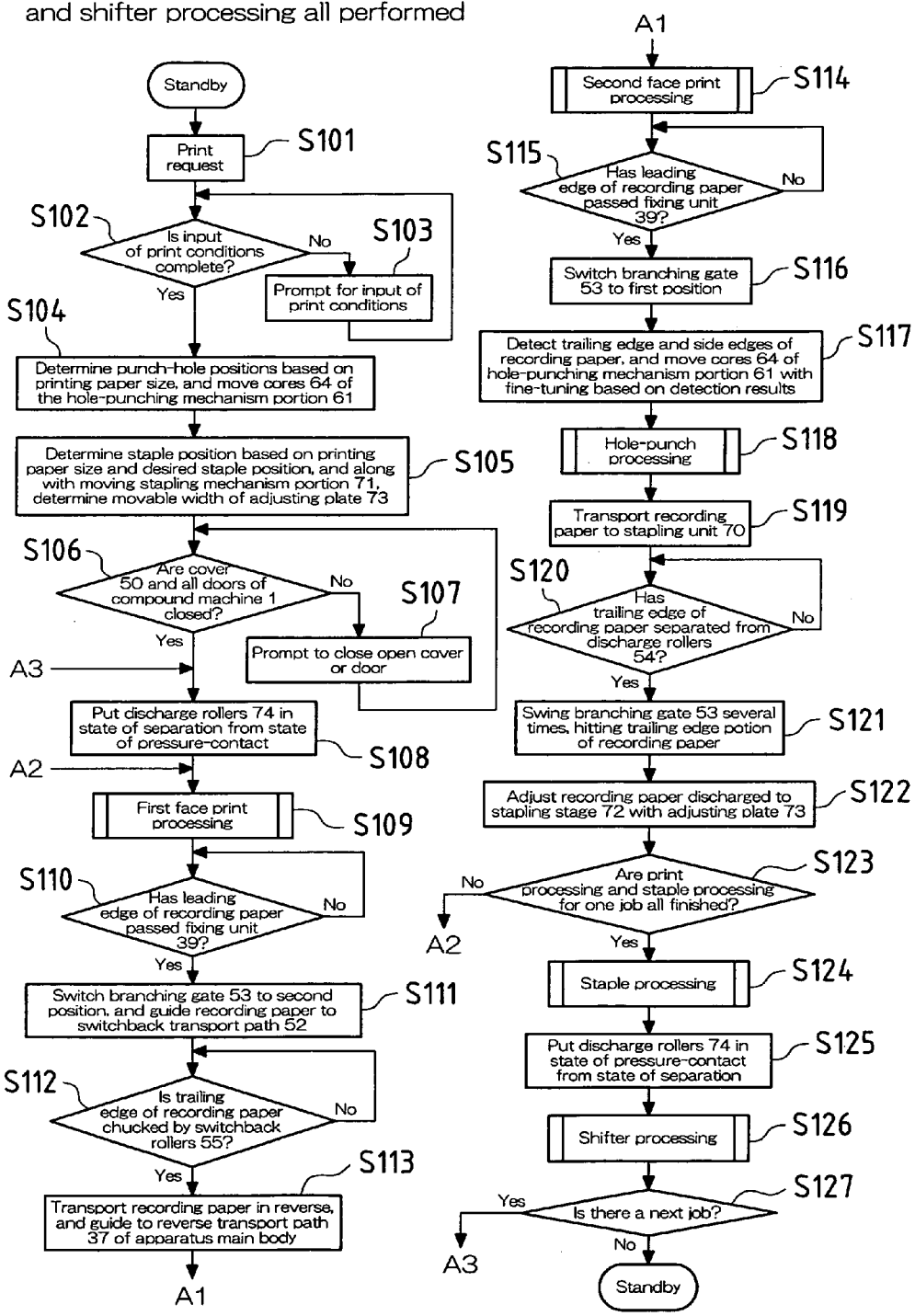
FIG. 11 is a flowchart that shows the procedure of processing A in FIG. 10, i.e., a case in which duplex print processing, shifter processing, punch processing, and staple processing are performed.

First is a description of the procedure of processing A using the flowchart in FIG. 11. This processing A is processing when there is duplex print processing, shifter processing, punch processing, and staple processing.

When a print request has been made (Step S101), the control portion of the compound machine 1 judges whether or not the above print conditions selection (see FIG. 10) is complete (Step S102). When the result of this judgment is that selection of print conditions is not yet complete, the user is prompted to select print conditions (Step S103), and the control portion waits until the print conditions are selected. In this processing A, duplex print processing, shifter processing, punch processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S104). Then, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S105).

Next, the control portion judges whether or not all of the doors of the compound machine 1 and the cover 50 of the paper post-processing portion 5 are closed (Step S106), and when any of the doors of the compound machine 1 and the cover 50 of the paper post-processing portion 5 are not closed, the user is prompted to close the open door of the compound machine 1 or the cover 50 of the paper post-processing portion 5 (Step S107). In this way, it is confirmed that the cover 50 and the like are closed, and in a state in which the cover 50 or the like is open, print processing, paper post-processing, and the like are prevented from being performed. On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S108).

Next, print processing is executed for the first face (front face) of the recording paper (Step S109). Then, the control portion judges whether or not the leading edge of the recording paper for which print processing for the front face is complete has passed the fixing unit 39 (Step S110). When the leading edge of the recording paper has passed the fixing unit 39, the control portion proceeds to the next step S111. On the other hand, when the leading edge of the recording paper has not yet passed the fixing unit 39, the control portion waits for the leading edge of the recording paper to pass the fixing unit 39, and then proceeds to Step S111.

In Step S111, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S112). When the trailing edge portion of the recording paper is chucked by the switchback rollers 55, the control portion proceeds to the next step S113. On the other hand, when the trailing edge portion of the recording paper is not yet chucked by the switchback rollers 55, the control portion waits for the trailing edge portion of the recording paper to be chucked by the switchback rollers 55, and then proceeds to Step S113.

In Step S113, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S114). Then, the control portion judges whether or not the leading edge of the recording paper for which print processing for the back face is complete has passed the fixing unit 39 (Step S115). When the leading edge of the recording paper has passed the fixing unit 39, the control portion proceeds to the next step 116. On the other hand, when the leading edge of the recording paper has not yet passed the fixing unit 39, the control portion waits for the leading edge of the recording paper to pass the fixing unit 39, and then proceeds to Step S116.

In Step S116, the branching gate 53 of the stapling unit 70 is switched to the first position. Next, the trailing edge and the side edges of the recording paper that has passed the fixing unit 39 are detected, and the cores 64 of the hole-punching mechanism portion 61 of the punching unit 60 are moved with fine-tuning (Step S117) such that it is possible to precisely open punch-holes at the punch-hole positions determined in Step S104. Then, punch processing is performed for the recording paper, which is transported from the main transport path 36 of the apparatus main body to the main transport path 51 of the paper post-processing portion 5 (Step S118). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72 (Step S119). Then, the control portion judges whether or not the trailing edge of the recording paper has separated from the discharge rollers 54 (Step S120). When the trailing edge of the recording paper has separated from the discharge rollers 54, the control portion proceeds to the next step S121, and when it has not yet separated, the control portion waits for the trailing edge of the recording paper to separate from the discharge rollers 54, and then proceeds to Step S121. In Step S121, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S122). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing and punch processing for one job in the print request that has been made are finished (Step S123). Here, the print processing and punch processing of a predetermined number of pages of recording paper that will be the target of one instance of staple processing are referred to together as the print processing and punch processing for one job. Because staple processing is performed after print processing and punch processing for a predetermined number of pages of recording paper are all finished, in Step S123, the control portion judges whether or not the print processing and punch processing of a predetermined number of pages of recording paper that will be the target of staple processing are all finished.

Then, when the result of the judgment in Step S123 is that the print processing and punch processing for one job are not all finished, the control portion proceeds to Step S109, and the processing of Steps S109 to S122 is performed repeatedly until the print processing and punch processing for one job are finished. On the other hand, when the print processing and punch processing for one job are all finished, next, staple processing is executed (Step S124). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S125), chucking the recording paper batch after staple processing. Next, after shifter processing is performed for the recording paper batch following staple processing (Step S126), the recording paper batch is discharged to the discharge tray 8, completing one job.

Afterwards, the control portion judges whether or not there is a next job (Step S127). That is, the control portion judges whether or not it is necessary to perform continuing duplex print processing, punch processing, staple processing, and shifter processing. When the result of this judgment is that there is a next job, the control portion proceeds to Step S108, and the processing of Steps S108 to S126 is performed repeatedly until all jobs are finished. After staple processing, a recording paper batch is sorted by shifter processing and discharged onto the discharge tray 8 each time one job is finished. On the other hand, when the judgment in Step S127 is that there is not a next job, control of this processing A is finished.

Processing B

Figure 12:
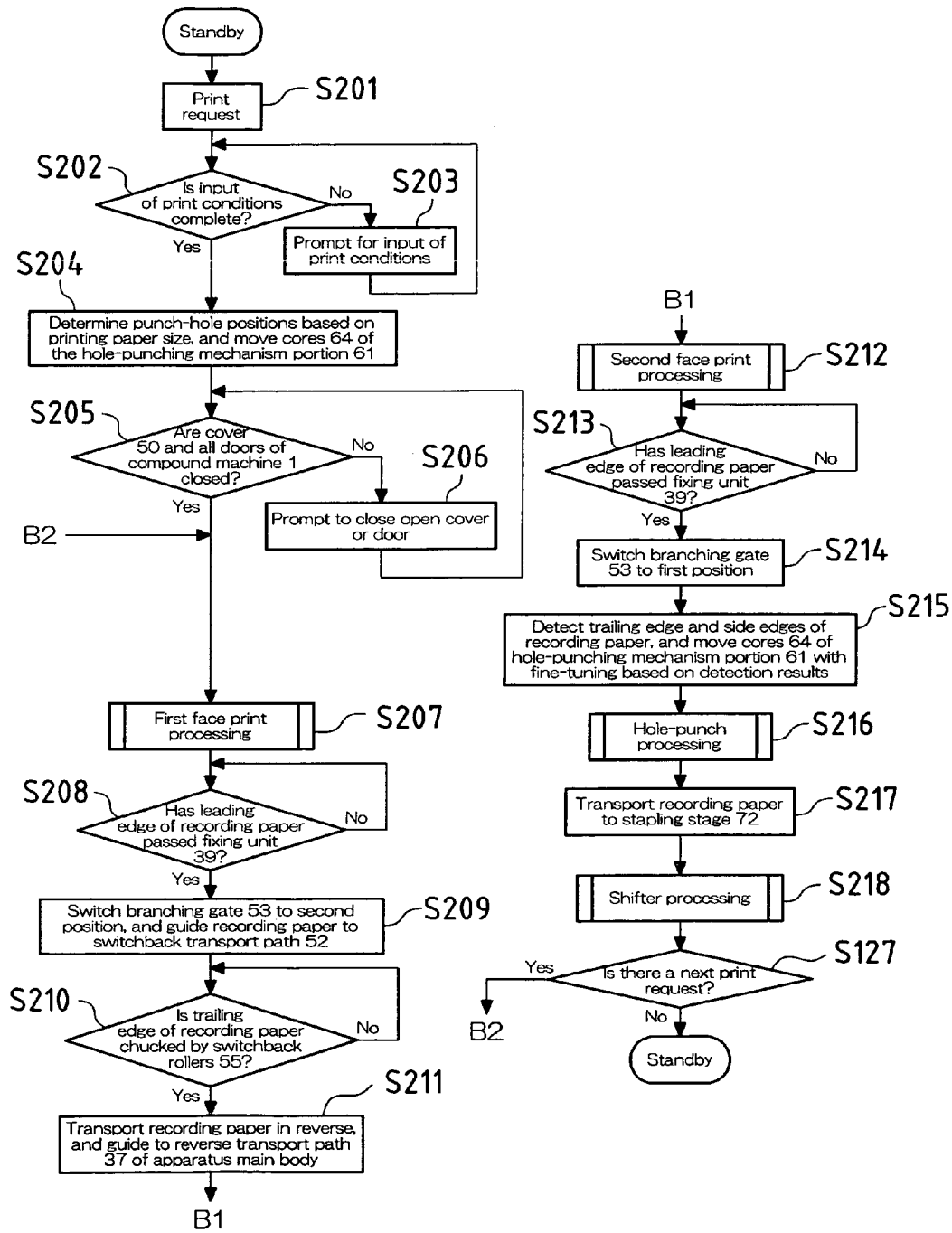
FIG. 12 is a flowchart that shows the procedure of processing B in FIG. 10, i.e., a case in which duplex print processing, shifter processing, and punch processing are performed, and staple processing is not performed.

Next, the procedure of processing B will be described using the flowchart in FIG. 12. This processing B is processing when there is duplex print processing, shifter processing, and punch processing, and there is no staple processing.

When a print request has been made (Step S201), the control portion of the compound machine 1 judges whether or not the above selection of print conditions (see FIG. 10) is completed (Step S202). When the result of this judgment is that the selection of print conditions has not yet been completed, the user is prompted to select print conditions (Step S203), and the control portion waits until the print conditions are selected. In this processing B, duplex print processing, shifter processing, and punch processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, the positions at which punch holes will be opened in the recording paper are determined based on the size of the recording paper, and the cores 64 of the hole-punching mechanism portion 61 of the punching unit 60 are moved to the corresponding positions (Step S204).

Next, the control portion judges whether or not all of the doors of the compound machine 1 and the cover 50 of the paper post-processing portion 5 are closed (Step S205), and when any of the doors of the compound machine 1 or the cover 50 of the paper post-processing portion 5 are not closed, the user is prompted to close the open door of the compound machine 1 or the cover 50 of the paper post-processing portion 5 (Step S206).

On the other hand, when all of the doors of the compound machine 1 and the cover 50 of the paper post-processing portion 5 are closed, next, print processing is executed for the first face (front face) of the recording paper (Step S207). Then, the control portion judges whether or not the leading edge of the recording paper for which print processing for the front face is complete has passed the fixing unit 39 (Step S208). When the leading edge of the recording paper has passed the fixing unit 39, the procedure proceeds to the next step 209. On the other hand, when the leading edge of the recording paper has not yet passed the fixing unit 39, the control portion waits for the leading edge of the recording paper to pass the fixing unit 39, and then proceeds to Step S209.

In Step S209, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S210). When the trailing edge portion of the recording paper is chucked by the switchback rollers 55, the control portion proceeds to the next step S211. On the other hand, when the trailing edge portion of the recording paper is not yet chucked by the switchback rollers 55, the control portion waits for the trailing edge portion of the recording paper to be chucked by the switchback rollers 55, and then proceeds to Step S211.

In Step S211, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S212). Then, the control portion judges whether or not the leading edge of the recording paper for which print processing for the back face is complete has passed the fixing unit 39 (Step S213). When the leading edge of the recording paper has passed the fixing unit 39, the control portion proceeds to the next step S214. On the other hand, when the leading edge of the recording paper has not yet passed the fixing unit 39, the control portion waits for the leading edge of the recording paper to pass the fixing unit 39, and then proceeds to Step S214.

In Step S214, the branching gate 53 of the stapling unit 70 is switched to the first position. Next, the trailing edge and the side edges of the recording paper that has passed the fixing unit 39 are detected, and the cores 64 of the hole-punching mechanism portion 61 of the punching unit 60 are moved with fine-tuning (Step S215) such that it is possible to precisely open punch-holes at the punch-hole positions determined in Step S104. Then, punch processing is performed for the recording paper, which is transported from the main transport path 36 of the apparatus main body to the main transport path 51 of the paper post-processing portion 5 (Step S216). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72, and further transported to a position where it is chucked by the upper and lower discharge rollers 74, which are in a state of pressure-contact (Step S217). Next, after shifter processing is executed for the recording paper in a state chucked by the upper and lower discharge rollers 74 (Step S218), the recording paper is discharged to the discharge tray 8.

Afterwards, the control portion judges whether or not there is a next print request (Step S219). That is, the control portion judges whether or not it is necessary to perform continuing duplex print processing, punch processing, and shifter processing. When the result of this judgment is that there is a next print request, the control portion proceeds to Step S207, and the processing of Steps S207 to S218 is performed repeatedly until all print requests are finished. After punch processing, the recording paper is sorted by shifter processing and discharged onto the discharge tray 8. On the other hand, when the judgment in Step S219 is that there is not a next print request, control of this processing B is finished.

Processing C

Figure 13:
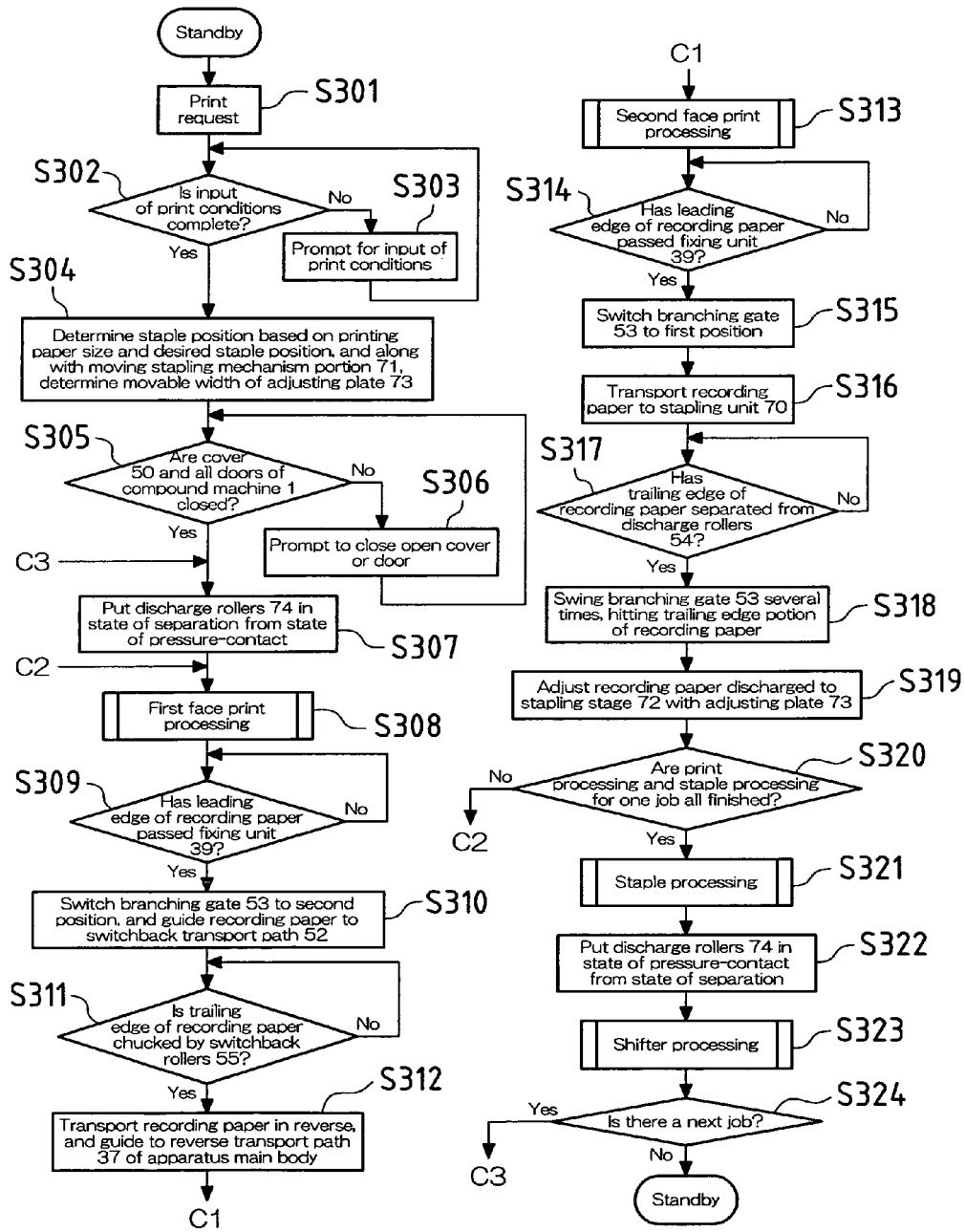
FIG. 13 is a flowchart that shows the procedure of processing C in FIG. 10, i.e., a case in which duplex print processing, shifter processing, and staple processing are performed, and punch processing is not performed.

Next, the procedure of processing C will be described using the flowchart in FIG. 13. This processing C is processing when there is duplex print processing, shifter processing, and staple processing, and there is no punch processing.

When a print request has been made (Step S301), the control portion of the compound machine 1 judges whether or not the above selection of print conditions (see FIG. 10) is completed (Step S302). When the result of this judgment is that the selection of print conditions has not yet been completed, the user is prompted to select print conditions (Step S303), and the control portion waits until the print conditions are selected. In this processing C, duplex print processing, shifter processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S304).

Next, the control portion judges whether or not all of the doors of the compound machine 1 and the cover 50 of the paper post-processing portion 5 are closed (Step S305), and when any of the doors of the compound machine 1 and the cover 50 of the paper post-processing portion 5 are not closed, the user is prompted to close the open door of the compound machine 1 or the cover 50 of the paper post-processing portion 5 (Step S306). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S307).

Next, print processing is executed for the first face (front face) of the recording paper (Step S308). Then, the control portion judges whether or not the leading edge of the recording paper for which print processing for the front face is complete has passed the fixing unit 39 (Step S309). When the leading edge of the recording paper has passed the fixing unit 39, the control portion proceeds to the next step S310. On the other hand, when the leading edge of the recording paper has not yet passed the fixing unit 39, the control portion waits for the leading edge of the recording paper to pass the fixing unit 39, and then proceeds to Step S310.

In Step S310, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S311). When the trailing edge portion of the recording paper is chucked by the switchback rollers 55, the control portion proceeds to the next step S312. On the other hand, when the trailing edge portion of the recording paper is not yet chucked by the switchback rollers 55, the control portion waits for the trailing edge portion of the recording paper to be chucked by the switchback rollers 55, and then proceeds to Step S312.

In Step S312, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S313). Then, the control portion judges whether or not the leading edge of the recording paper for which print processing for the back face is complete has passed the fixing unit 39 (Step S314). When the leading edge of the recording paper has passed the fixing unit 39, the control portion proceeds to the next step S315. On the other hand, when the leading edge of the recording paper has not yet passed the fixing unit 39, the control portion waits for the leading edge of the recording paper to pass the fixing unit 39, and then proceeds to Step S315.

In Step S315, the branching gate 53 of the stapling unit 70 is switched to the first position. Then, the recording paper transported into the stapling unit 70 is discharged from the discharge rollers 54 to the stapling stage 72 (Step S316). Next, the control portion judges whether or not the trailing edge of the recording paper has separated from the discharge rollers 54 (Step S317). When the trailing edge of the recording paper has separated from the discharge rollers 54, the control portion proceeds to the next step S318, and when it has not yet separated, the control portion waits for the trailing edge of the recording paper to separate from the discharge rollers 54, and then proceeds to Step S318. In Step S318, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S319). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing for one job in the print request that has been made is finished (Step S320). Here, the print processing for a predetermined number of pages of recording paper that will be the target of one instance of staple processing is referred to together as the print processing for one job. Because staple processing is performed after print processing for a predetermined number of pages of recording paper is all finished, in Step S320, the control portion judges whether or not the print processing for a predetermined number of pages of recording paper that will be the target of staple processing is all finished.

Then, when the result of the judgment in Step S320 is that the print processing for one job is not all finished, the control portion proceeds to Step S308, and the processing of Steps S308 to S319 is performed repeatedly until the print processing for one job is finished. On the other hand, when the print processing for one job is all finished, next, staple processing is executed (Step S321). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S322), chucking the recording paper batch after staple processing. Next, after shifter processing is performed for the recording paper batch following staple processing (Step S323), the recording paper batch is discharged to the discharge tray 8, completing one job.

Afterwards, the control portion judges whether or not there is a next job (Step S324). That is, the control portion judges whether or not it is necessary to perform continuing duplex print processing, staple processing, and shifter processing. When the result of this judgment is that there is a next job, the control portion proceeds to Step S307, and the processing of Steps S307 to S323 is performed repeatedly until all jobs are finished. After staple processing, a recording paper batch is sorted by shifter processing and discharged onto the discharge tray 8 each time one job is finished. On the other hand, when the judgment in Step S324 is that there is not a next job, control of this processing C is finished.

Processing D

Figure 14:
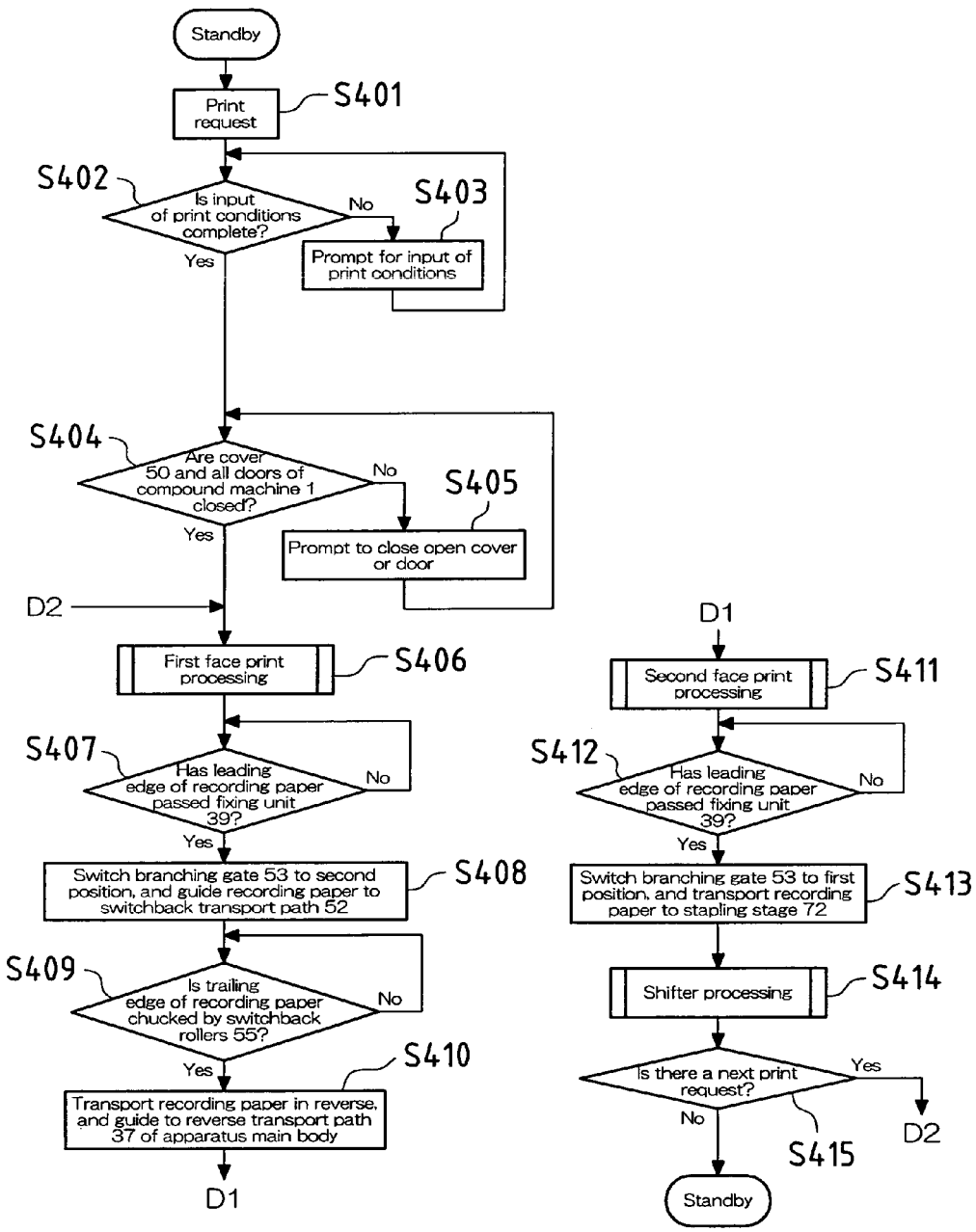
FIG. 14 is a flowchart that shows the procedure of processing D in FIG. 10, i.e., a case in which duplex print processing and shifter processing are performed, and punch processing and staple processing are not performed.

Next, the procedure of processing D will be described using the flowchart in FIG. 14. This processing D is processing when there is duplex print processing and shifter processing, and no punch processing or staple processing.

When a print request has been made (Step S401), the control portion of the compound machine 1 judges whether or not the above selection of print conditions (see FIG. 10) is completed (Step S402). When the result of this judgment is that the selection of print conditions has not yet been completed, the user is prompted to select print conditions (Step S403), and the control portion waits until the print conditions are selected. In this processing D, duplex print processing and shifter processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, the control portion judges whether or not all of the doors of the compound machine 1 and the cover 50 of the paper post-processing portion 5 are closed (Step S404), and when any of the doors of the compound machine 1 and the cover 50 of the paper post-processing portion 5 are not closed, the user is prompted to close the open door of the compound machine 1 or the cover 50 of the paper post-processing portion 5 (Step S405).

Next, print processing is executed for the first face (front face) of the recording paper (Step S406). Then, the control portion judges whether or not the leading edge of the recording paper for which print processing for the front face is complete has passed the fixing unit 39 (Step S407). When the leading edge of the recording paper has passed the fixing unit 39, the control portion proceeds to the next step S408. On the other hand, when the leading edge of the recording paper has not yet passed the fixing unit 39, the control portion waits for the leading edge of the recording paper to pass the fixing unit 39, and then proceeds to Step S408.

In Step S408, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S409). When the trailing edge portion of the recording paper is chucked by the switchback rollers 55, the control portion proceeds to the next step S410. On the other hand, when the trailing edge portion of the recording paper is not yet chucked by the switchback rollers 55, the control portion waits for the trailing edge portion of the recording paper to be chucked by the switchback rollers 55, and then proceeds to Step S410.

In Step S410, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S411). Then, the control portion judges whether or not the leading edge of the recording paper for which print processing for the back face is complete has passed the fixing unit 39 (Step S412). When the leading edge of the recording paper has passed the fixing unit 39, the control portion proceeds to the next step S413. On the other hand, when the leading edge of the recording paper has not yet passed the fixing unit 39, the control portion waits for the leading edge of the recording paper to pass the fixing unit 39, and then proceeds to Step S413.

In Step S413, the branching gate 53 of the stapling unit 70 is switched to the first position. Then, the recording paper transported into the stapling unit 70 is discharged from the discharge rollers 54 to the stapling stage 72, and further, is transported to a position where it is chucked by the upper and lower discharge rollers 74, which are in a state of pressure-contact. Next, after shifter processing is performed for the recording paper in a state chucked by the upper and lower discharge rollers 74 (Step S414), the recording paper is discharged to the discharge tray 8.

Afterwards, the control portion judges whether or not there is a next print request (Step S415). That is, the control portion judges whether or not it is necessary to perform continuing duplex print processing and shifter processing. When the result of this judgment is that there is a next print request, the control portion proceeds to Step S406, and the processing of Steps S406 to S414 is performed repeatedly until all print requests are finished. After being discharged to the stapling stage 72, the recording paper is sorted by shifter processing and discharged onto the discharge tray 8. On the other hand, when the judgment in Step S415 is that there is not a next print request, control of this processing D is finished.

Processing E

Figure 15:
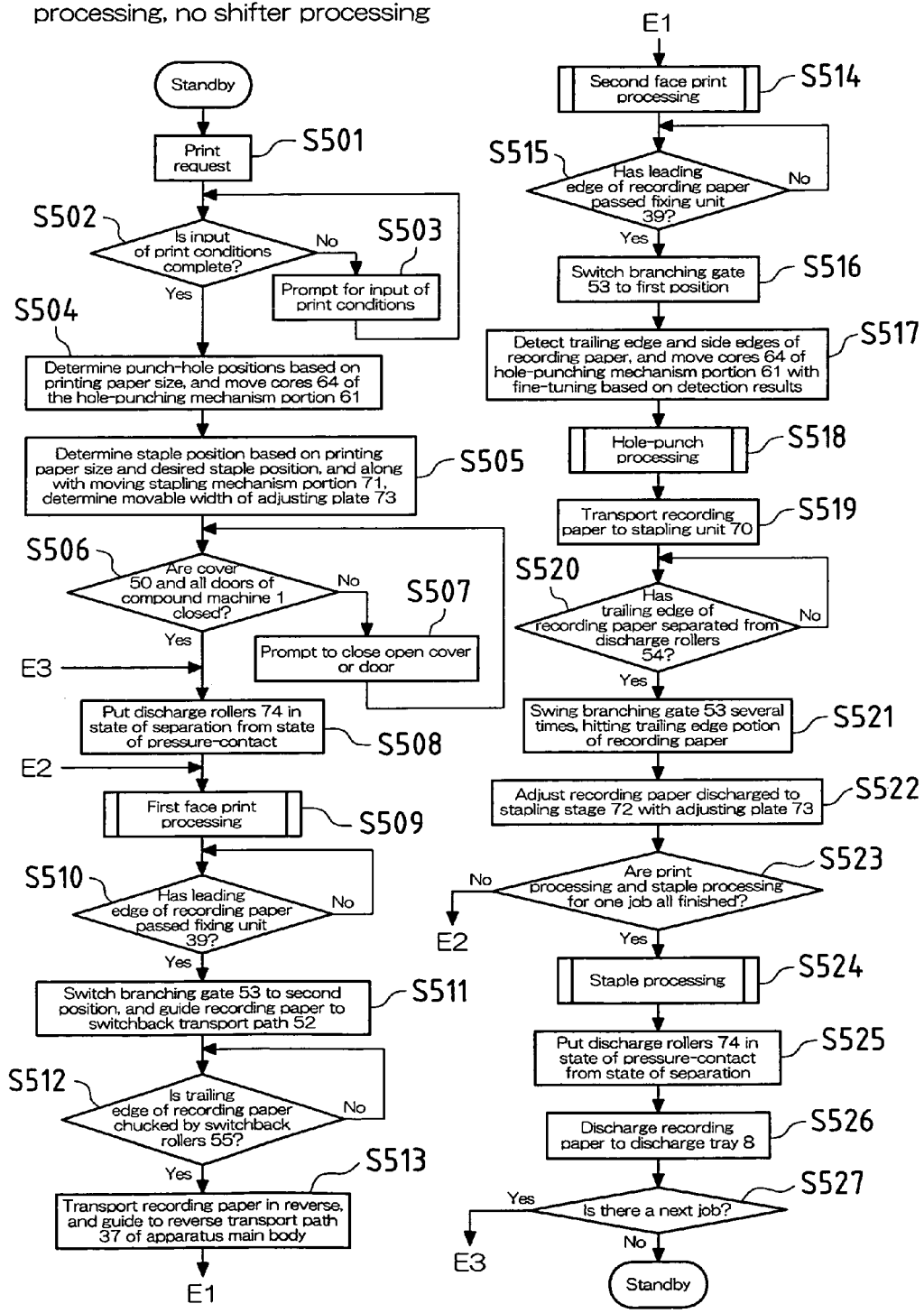
FIG. 15 is a flowchart that shows the procedure of processing E in FIG. 10, i.e., a case in which duplex print processing, punch processing, and staple processing are performed, and shifter processing is not performed.

Next, the procedure of processing E will be described using the flowchart in FIG. 15. This processing E is processing when there is duplex print processing, punch processing, and staple processing, and no shifter processing.

When a print request has been made (Step S501), the control portion of the compound machine 1 judges whether or not the above selection of print conditions (see FIG. 10) is completed (Step S502). When the result of this judgment is that the selection of print conditions has not yet been completed, the user is prompted to select print conditions (Step S503), and the control portion waits until the print conditions are selected. In this processing E, duplex print processing, punch processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S504). Then, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S505).

Next, the control portion judges whether or not all of the doors of the compound machine 1 and the cover 50 of the paper post-processing portion 5 are closed (Step S506), and when any of the doors of the compound machine 1 and the cover 50 of the paper post-processing portion 5 are not closed, the user is prompted to close the open door of the compound machine 1 or the cover 50 of the paper post-processing portion 5 (Step S507). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S508).

Next, print processing is executed for the first face (front face) of the recording paper (Step S509). Then, the control portion judges whether or not the leading edge of the recording paper for which print processing for the front face is complete has passed the fixing unit 39 (Step S510). When the leading edge of the recording paper has passed the fixing unit 39, the control portion proceeds to the next step S511. On the other hand, when the leading edge of the recording paper has not yet passed the fixing unit 39, the control portion waits for the leading edge of the recording paper to pass the fixing unit 39, and then proceeds to Step S511.

In Step S511, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S512). When the trailing edge portion of the recording paper is chucked by the switchback rollers 55, the control portion proceeds to the next step S513. On the other hand, when the trailing edge portion of the recording paper is not yet chucked by the switchback rollers 55, the control portion waits for the trailing edge portion of the recording paper to be chucked by the switchback rollers 55, and then proceeds to Step S513.

In Step S513, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S514). Then, the control portion judges whether or not the leading edge of the recording paper for which print processing for the back face is complete has passed the fixing unit 39 (Step S515). When the leading edge of the recording paper has passed the fixing unit 39, the control portion proceeds to the next step S516. On the other hand, when the leading edge of the recording paper has not yet passed the fixing unit 39, the control portion waits for the leading edge of the recording paper to pass the fixing unit 39, and then proceeds to Step S516.

In Step S516, the branching gate 53 of the stapling unit 70 is switched to the first position. Next, the trailing edge and the side edges of the recording paper that has passed the fixing unit 39 are detected, and the cores 64 of the hole-punching mechanism portion 61 of the punching unit 60 are moved with fine-tuning (Step S517) such that it is possible to precisely open punch-holes at the punch-hole positions determined in Step S504. Then, punch processing is performed for the recording paper, which is transported from the main transport path 36 of the apparatus main body to the main transport path 51 of the paper post-processing portion 5 (Step S518). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72 (Step S519). Then, the control portion judges whether or not the trailing edge of the recording paper has separated from the discharge rollers 54 (Step S520). When the trailing edge of the recording paper has separated from the discharge rollers 54, the control portion proceeds to the next step S521, and when it has not yet separated, the control portion waits for the trailing edge of the recording paper to separate from the discharge rollers 54, and then proceeds to Step S521. In Step S521, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S522). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing and punch processing for one job in the print request that has been made are finished (Step S523). Here, the print processing and punch processing of a predetermined number of pages of recording paper that will be the target of one instance of staple processing are referred to together as the print processing and punch processing for one job. Because staple processing is performed after print processing and punch processing for a predetermined number of pages of recording paper are all finished, in Step S523, the control portion judges whether or not the print processing and punch processing of a predetermined number of pages of recording paper that will be the target of staple processing are all finished.

Then, when the result of the judgment in Step S523 is that the print processing and punch processing for one job are not all finished, the control portion proceeds to Step S509, and the processing of Steps S509 to S522 is performed repeatedly until the print processing and punch processing for one job are finished. On the other hand, when the print processing and punch processing for one job are all finished, next, staple processing is executed (Step S524). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S525), chucking the recording paper batch after staple processing. Next, after shifter processing is performed for the recording paper batch following staple processing, the recording paper batch is discharged to the discharge tray 8 (Step S526), finishing one job.

Afterwards, the control portion judges whether or not there is a next job (Step S527). That is, the control portion judges whether or not it is necessary to perform continuing duplex print processing, punch processing, and staple processing. When the result of this judgment is that there is a next job, the control portion proceeds to Step S508, and the processing of Steps S508 to S526 is performed repeatedly until all jobs are finished. After staple processing, a recording paper batch is sorted by shifter processing and discharged onto the discharge tray 8 each time one job is finished. On the other hand, when the judgment in Step S527 is that there is not a next job, control of this processing E is finished.

Processing F

Figure 16:
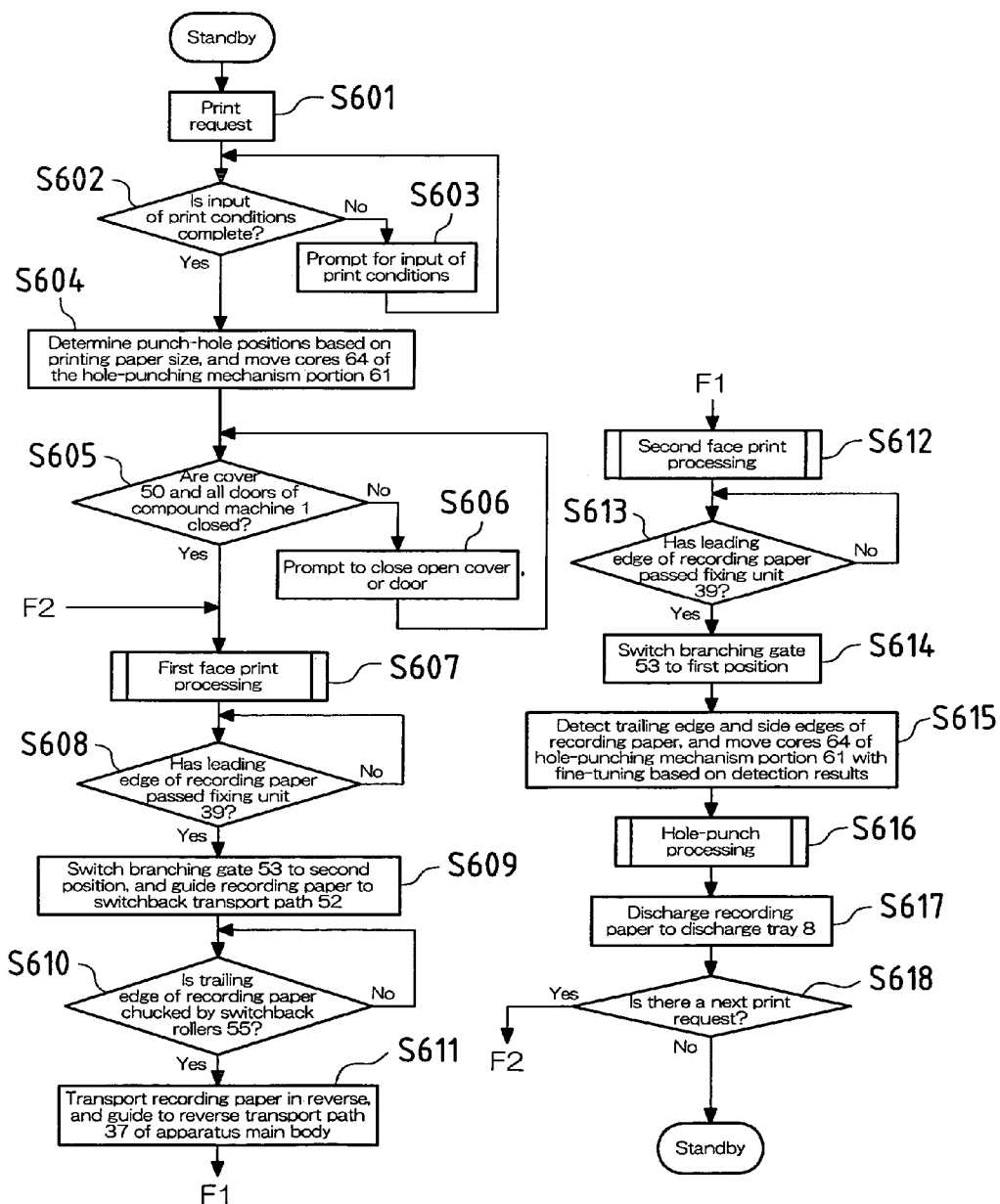
FIG. 16 is a flowchart that shows the procedure of processing F in FIG. 10, i.e., a case in which duplex print processing and punch processing are performed, and shifter processing and staple processing are not performed.

Next is a description of the procedure of processing F using the flowchart in FIG. 16. This processing F is processing when there is duplex print processing and punch processing, and no shifter processing or staple processing.

When a print request has been made (Step S601), the control portion of the compound machine 1 judges whether or not the above print conditions selection (see FIG. 10) is complete (Step S602). When the result of this judgment is that selection of print conditions is not yet complete, the user is prompted to select print conditions (Step S603), and the control portion waits until the print conditions are selected. In this processing F, duplex print processing and punch processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S604).

Next, the control portion judges whether or not all of the doors of the compound machine 1 and the cover 50 of the paper post-processing portion 5 are closed (Step S605), and when any of the doors of the compound machine 1 and the cover 50 of the paper post-processing portion 5 are not closed, the user is prompted to close the open door of the compound machine 1 or the cover 50 of the paper post-processing portion 5 (Step S606).

On the other hand, when all of the doors of the compound machine 1 and the cover 50 of the paper post-processing portion 5 are closed, next, print processing is executed for the first face (front face) of the recording paper (Step S607). Then, the control portion judges whether or not the leading edge of the recording paper for which print processing for the front face is complete has passed the fixing unit 39 (Step S608). When the leading edge of the recording paper has passed the fixing unit 39, the control portion proceeds to the next step S609. On the other hand, when the leading edge of the recording paper has not yet passed the fixing unit 39, the control portion waits for the leading edge of the recording paper to pass the fixing unit 39, and then proceeds to Step S609.

In Step S609, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S610). When the trailing edge portion of the recording paper is chucked by the switchback rollers 55, the control portion proceeds to the next step S611. On the other hand, when the trailing edge portion of the recording paper is not yet chucked by the switchback rollers 55, the control portion waits for the trailing edge portion of the recording paper to be chucked by the switchback rollers 55, and then proceeds to Step S611.

In Step S611, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S612). Then, the control portion judges whether or not the leading edge of the recording paper for which print processing for the back face is complete has passed the fixing unit 39 (Step S613). When the leading edge of the recording paper has passed the fixing unit 39, the control portion proceeds to the next step S614. On the other hand, when the leading edge of the recording paper has not yet passed the fixing unit 39, the control portion waits for the leading edge of the recording paper to pass the fixing unit 39, and then proceeds to Step S614.

In Step S614, the branching gate 53 of the stapling unit 70 is switched to the first position. Next, the trailing edge and the side edges of the recording paper that has passed the fixing unit 39 are detected, and the cores 64 of the hole-punching mechanism portion 61 of the punching unit 60 are moved with fine-tuning (Step S615) such that it is possible to precisely open punch-holes at the punch-hole positions determined in Step S604. Then, punch processing is performed for the recording paper, which is transported from the main transport path 36 of the apparatus main body to the main transport path 51 of the paper post-processing portion 5 (Step S616). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, discharged from the discharge rollers 54 to the stapling stage 72, and, further, discharged to the discharge tray 8 from the upper and lower discharge rollers 74, which are in a state of pressure-contact (Step S617).

Afterwards, the control portion judges whether or not there is a next print request (Step S618). That is, the control portion judges whether or not it is necessary to perform continuing duplex print processing and punch processing. When the result of this judgment is that there is a next print request, the control portion proceeds to Step S607, and the processing of Steps S607 to S617 is performed repeatedly until all print requests are finished. After punch processing, the recording paper is discharged onto the discharge tray 8 from the discharge rollers 74. On the other hand, when the judgment in Step S618 is that there is not a next print request, control of this processing F is finished.

Processing G

Figure 17:
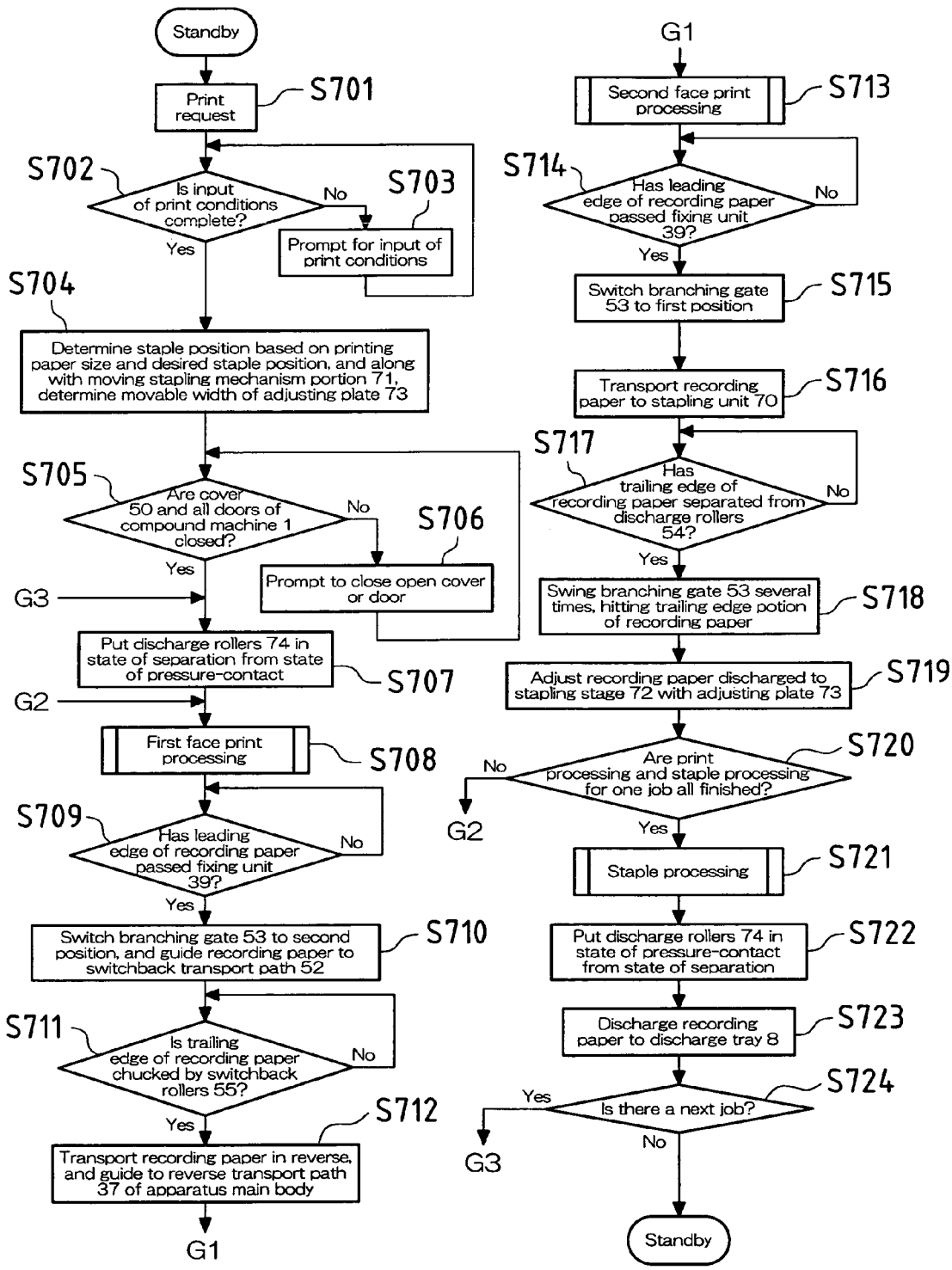
FIG. 17 is a flowchart that shows the procedure of processing G in FIG. 10, i.e., a case in which duplex print processing and staple processing are performed, and shifter processing and punch processing are not performed.

Next is a description of the procedure of processing G using the flowchart in FIG. 17. This processing G is processing when there is duplex print processing and staple processing, and no shifter processing or punch processing.

When a print request has been made (Step S701), the control portion of the compound machine 1 judges whether or not the above print conditions selection (see FIG. 10) is complete (Step S702). When the result of this judgment is that selection of print conditions is not yet complete, the user is prompted to select print conditions (Step S703), and the control portion waits until the print conditions are selected. In this processing G, duplex print processing and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S704).

Next, the control portion judges whether or not all of the doors of the compound machine 1 and the cover 50 of the paper post-processing portion 5 are closed (Step S705), and when any of the doors of the compound machine 1 and the cover 50 of the paper post-processing portion 5 are not closed, the user is prompted to close the open door of the compound machine 1 or the cover 50 of the paper post-processing portion 5 (Step S706). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S707).

Next, print processing is executed for the first face (front face) of the recording paper (Step S708). Then, the control portion judges whether or not the leading edge of the recording paper for which print processing for the front face is complete has passed the fixing unit 39 (Step S709). When the leading edge of the recording paper has passed the fixing unit 39, the control portion proceeds to the next step S710. On the other hand, when the leading edge of the recording paper has not yet passed the fixing unit 39, the control portion waits for the leading edge of the recording paper to pass the fixing unit 39, and then proceeds to Step S710.

In Step S710, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S711). When the trailing edge portion of the recording paper is chucked by the switchback rollers 55, the control portion proceeds to the next step S712. On the other hand, when the trailing edge portion of the recording paper is not yet chucked by the switchback rollers 55, the control portion waits for the trailing edge portion of the recording paper to be chucked by the switchback rollers 55, and then proceeds to Step S712.

In Step S712, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S713). Then, the control portion judges whether or not the leading edge of the recording paper for which print processing for the back face is complete has passed the fixing unit 39 (Step S714). When the leading edge of the recording paper has passed the fixing unit 39, the control portion proceeds to the next step S715. On the other hand, when the leading edge of the recording paper has not yet passed the fixing unit 39, the control portion waits for the leading edge of the recording paper to pass the fixing unit 39, and then proceeds to Step S715.

In Step S715, the branching gate 53 of the stapling unit 70 is switched to the first position. Then, the recording paper transported into the stapling unit 70 is discharged from the discharge rollers 54 to the stapling stage 72 (Step S716). Next, the control portion judges whether or not the trailing edge of the recording paper has separated from the discharge rollers 54 (Step S717). When the trailing edge of the recording paper has separated from the discharge rollers 54, the control portion proceeds to the next step S718, and when it has not yet separated, the control portion waits for the trailing edge of the recording paper to separate from the discharge rollers 54, and then proceeds to Step S718. In Step S718, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S719). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing for one job in the print request that has been made is finished (Step S720). Here, the print processing for a predetermined number of pages of recording paper that will be the target of one instance of staple processing is referred to together as the print processing for one job. Because staple processing is performed after print processing for a predetermined number of pages of recording paper is all finished, in Step S720, the control portion judges whether or not the print processing for a predetermined number of pages of recording paper that will be the target of staple processing is all finished.

Then, when the result of the judgment in Step S720 is that the print processing for one job is not all finished, the control portion proceeds to Step S708, and the processing of Steps S708 to S719 is performed repeatedly until the print processing for one job is finished. On the other hand, when the print processing for one job is all finished, next, staple processing is executed (Step S721). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S722), chucking the recording paper batch after staple processing. Next, after shifter processing is performed for the recording paper batch following staple processing (Step S723), the recording paper batch is discharged to the discharge tray 8, completing one job.

Afterwards, the control portion judges whether or not there is a next job (Step S724). That is, the control portion judges whether or not it is necessary to perform continuing duplex print processing, staple processing, and shifter processing. When the result of this judgment is that there is a next job, the control portion proceeds to Step S707, and the processing of Steps S707 to S723 is performed repeatedly until all jobs are finished. After staple processing, a recording paper batch is sorted by shifter processing and discharged onto the discharge tray 8 each time one job is finished. On the other hand, when the judgment in Step S724 is that there is not a next job, control of this processing G is finished.

Processing H

Figure 18:
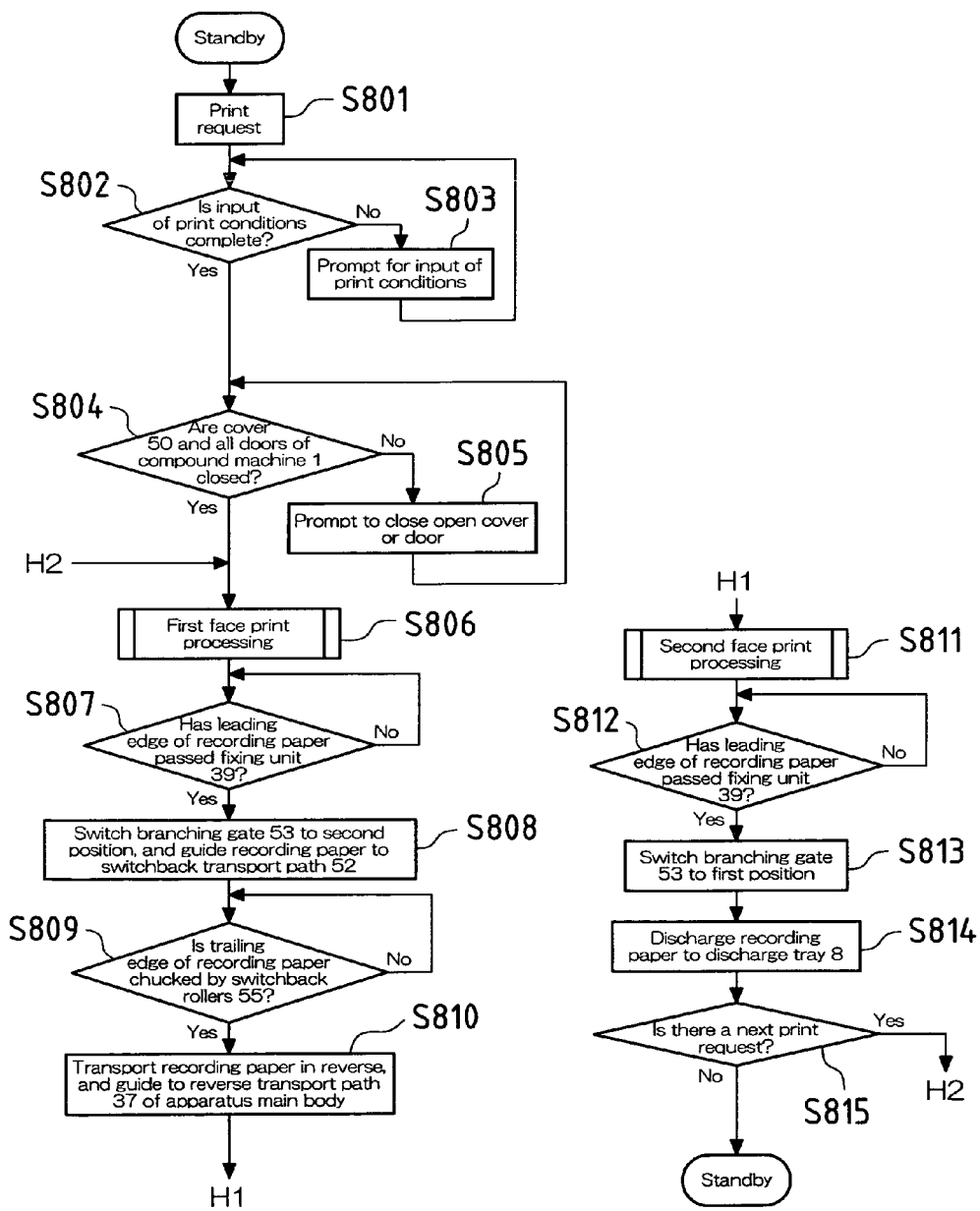
FIG. 18 is a flowchart that shows the procedure of processing H in FIG. 10, i.e., a case in which duplex print processing is performed, and punch processing, staple processing, and shifter processing are not performed.

Next is a description of the procedure of processing H using the flowchart in FIG. 18. This processing H is processing when there is duplex print processing, and no staple processing, shifter processing, or punch processing.

When a print request has been made (Step S801), the control portion of the compound machine 1 judges whether or not the above print conditions selection (see FIG. 10) is complete (Step S802). When the result of this judgment is that selection of print conditions is not yet complete, the user is prompted to select print conditions (Step S803), and the control portion waits until the print conditions are selected. In this processing H, duplex print processing is performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, the control portion judges whether or not all of the doors of the compound machine 1 and the cover 50 of the paper post-processing portion 5 are closed (Step S804), and when any of the doors of the compound machine 1 and the cover 50 of the paper post-processing portion 5 are not closed, the user is prompted to close the open door of the compound machine 1 or the cover 50 of the paper post-processing portion 5 (Step S805).

Next, print processing is executed for the first face (front face) of the recording paper (Step S806). Then, the control portion judges whether or not the leading edge of the recording paper for which print processing for the front face is complete has passed the fixing unit 39 (Step S807). When the leading edge of the recording paper has passed the fixing unit 39, the control portion proceeds to the next step S808. On the other hand, when the leading edge of the recording paper has not yet passed the fixing unit 39, the control portion waits for the leading edge of the recording paper to pass the fixing unit 39, and then proceeds to Step S808.

In Step S808, the branching gate 53 of the stapling unit 70 is switched to the second position, and the recording paper is guided to the switchback transport path 52. Then, the control portion judges whether or not the trailing edge portion of the recording paper guided to the switchback transport path 52 is chucked by the switchback rollers 55 (Step S809). When the trailing edge portion of the recording paper is chucked by the switchback rollers 55, the control portion proceeds to the next step S810. On the other hand, when the trailing edge portion of the recording paper is not yet chucked by the switchback rollers 55, the control portion waits for the trailing edge portion of the recording paper to be chucked by the switchback rollers 55, and then proceeds to Step S810.

In Step S810, in a state in which the trailing edge portion of the recording paper is chucked by the switchback rollers 55, the switchback rollers 55 are rotated in reverse, reversing the recording paper in the switchback transport path 52. Then, the recording paper is transported from the switchback transport path 52 via the main transport path 51 to the main transport path 36 of the apparatus main body, and further, guided to the reverse transport path 37.

Next, print processing is executed for the second face (back face) of the recording paper (Step S811). Then, the control portion judges whether or not the leading edge of the recording paper for which print processing for the back face is complete has passed the fixing unit 39 (Step S812). When the leading edge of the recording paper has passed the fixing unit 39, the control portion proceeds to the next step S813. On the other hand, when the leading edge of the recording paper has not yet passed the fixing unit 39, the control portion waits for the leading edge of the recording paper to pass the fixing unit 39, and then proceeds to Step S813.

In Step S813, the branching gate 53 of the stapling unit 70 is switched to the first position. Then, the recording paper transported into the stapling unit 70 is discharged from the discharge rollers 54 to the stapling stage 72, and further, discharged to the discharge tray 8 from the upper and lower discharge rollers 74, which are in a state of pressure-contact (Step S814).

Afterwards, the control portion judges whether or not there is a next print request (Step S815). That is, the control portion judges whether or not it is necessary to perform continuing duplex print processing. When the result of this judgment is that there is a next print request, the control portion proceeds to Step S806, and the processing of Steps S806 to S814 is performed repeatedly until all print requests are finished. After being discharged to the stapling stage 72, the recording paper is discharged onto the discharge tray 8 from the discharge rollers 74. On the other hand, when the judgment in Step S815 is that there is not a next print request, control of this processing H is finished.

Processing I

Figure 19:
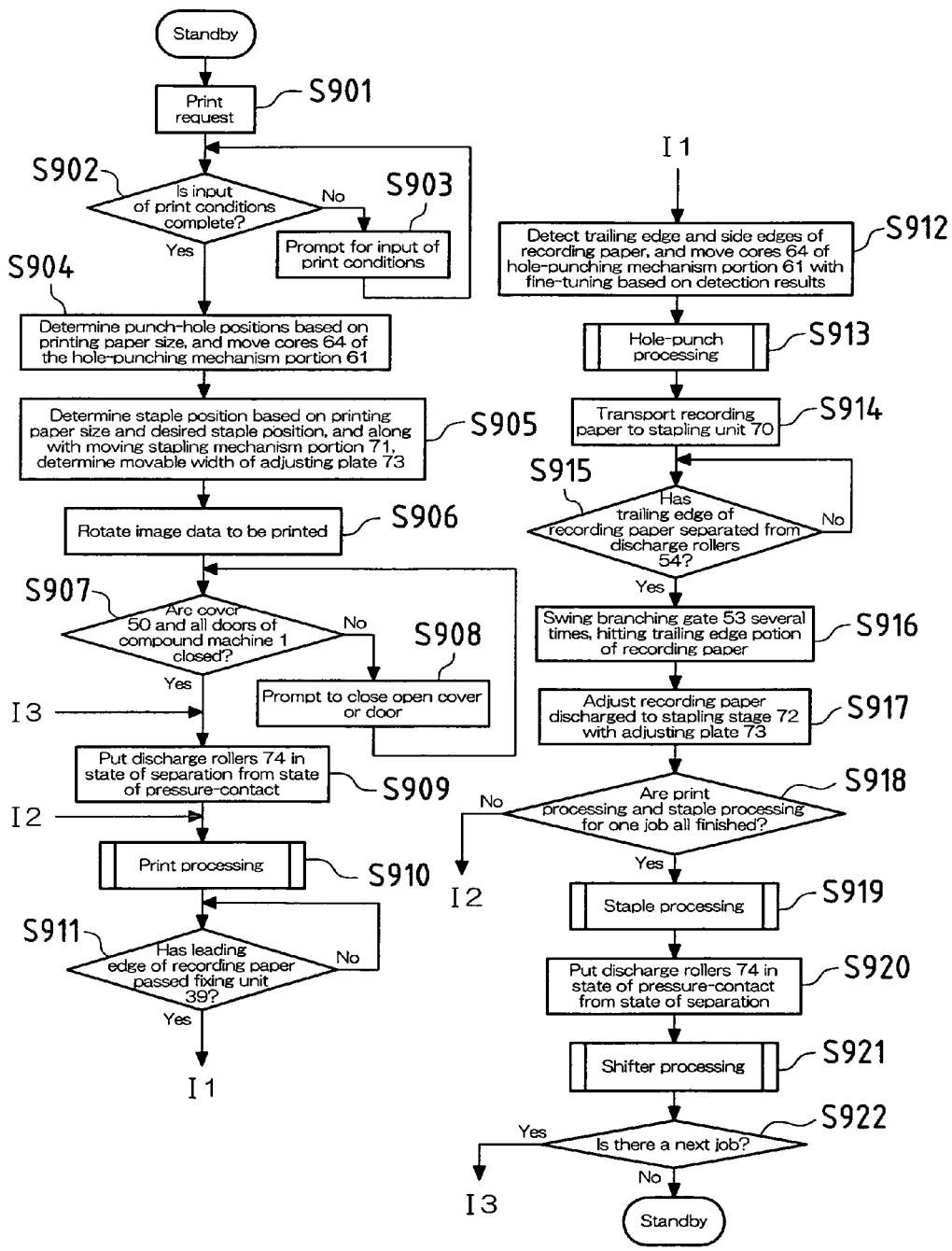
FIG. 19 is a flowchart that shows the procedure of processing I in FIG. 10, i.e., a case in which simplex print processing, shifter processing, punch processing, and staple processing are performed.

Next is a description of the procedure of processing I using the flowchart in FIG. 19. This processing I is processing when there is simplex print processing, shifter processing, punch processing, and staple processing.

When a print request has been made (Step S901), the control portion of the compound machine 1 judges whether or not the above print conditions selection (see FIG. 10) is complete (Step S902). When the result of this judgment is that selection of print conditions is not yet complete, the user is prompted to select print conditions (Step S903), and the control portion waits until the print conditions are selected. In this processing I, simplex print processing, shifter processing, punch processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S904). Then, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S905).

Next, image data transmitted from the scanner portion 2 or an external terminal apparatus is rotated (Step S906). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like.

The reasons for performing such rotation of the image data are as follows. The first reason is that punch processing and staple processing are ordinarily performed for the left edge portion or the top edge portion of the image printed on the recording paper, i.e., performed for the leading edge side of the image. On the other hand, with the paper post-processing portion 5 of this example, punch processing and staple processing are performed at predetermined positions of the trailing edge portion of the recording paper. Thus, when the image data is not rotated, punch processing and staple processing become performed for the trailing edge side of the image printed on the recording paper. Accordingly, in Step S906, by rotating the image data by 180 degrees, the leading edge and the trailing edge of the image printed on the recording paper are reversed from the transmitted image data, making it possible to perform punch processing and staple processing for the leading edge side of the image printed on the recording paper. When performing duplex image processing, because switchback of the recording paper is performed when printing the back face, this sort of image data rotation is not necessary.

The second reason is that the orientation of the transmitted image data (portrait orientation, landscape orientation) and the orientation of the transported recording paper (portrait transport, landscape transport) may differ by 90 degrees or 270 degrees. In this case, in Step S906, by rotating the image data by 90 degrees or 270 degrees, it is possible to make the orientation of the transmitted image data and the orientation of the transported recording paper the same.

Next, the control portion judges whether or not all of the doors of the compound machine 1 and the cover 50 of the paper post-processing portion 5 are closed (Step S907), and when any of the doors of the compound machine 1 and the cover 50 of the paper post-processing portion 5 are not closed, the user is prompted to close the open door of the compound machine 1 or the cover 50 of the paper post-processing portion 5 (Step S908). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S909).

Next, print processing is executed for one face of the recording paper (Step S910). Due to the rotation of image data in Step S906, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S911). When the leading edge of the recording paper has passed the fixing unit 39, the control portion proceeds to the next step S912. On the other hand, when the leading edge of the recording paper has not yet passed the fixing unit 39, the control portion waits for the leading edge of the recording paper to pass the fixing unit 39, and then proceeds to Step S912.

In Step S912, the trailing edge and the side edges of the recording paper that has passed the fixing unit 39 are detected, and the cores 64 of the hole-punching mechanism portion 61 of the punching unit 60 are moved with fine-tuning such that it is possible to precisely open punch-holes at the punch-hole positions determined in Step S904. Then, punch processing is performed for the recording paper, which is transported from the main transport path 36 of the apparatus main body to the main transport path 51 of the paper post-processing portion 5 (Step S913). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72 (Step S914). Then, the control portion judges whether or not the trailing edge of the recording paper has separated from the discharge rollers 54 (Step S915). When the trailing edge of the recording paper has separated from the discharge rollers 54, the control portion proceeds to the next step S916, and when it has not yet separated, the control portion waits for the trailing edge of the recording paper to separate from the discharge rollers 54, and then proceeds to Step S916. In Step S916, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S917). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing and punch processing for one job in the print request that has been made are finished (Step S918). Here, the print processing and punch processing of a predetermined number of pages of recording paper that will be the target of one instance of staple processing are referred to together as the print processing and punch processing for one job. Because staple processing is performed after print processing and punch processing for a predetermined number of pages of recording paper are all finished, in Step S918, the control portion judges whether or not the print processing and punch processing of a predetermined number of pages of recording paper that will be the target of staple processing are all finished.

Then, when the result of the judgment in Step S918 is that the print processing and punch processing for one job are not all finished, the control portion proceeds to Step S910, and the processing of Steps S910 to S917 is performed repeatedly until the print processing and punch processing for one job are finished. On the other hand, when the print processing and punch processing for one job are all finished, next, staple processing is executed (Step S919). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S920), chucking the recording paper batch after staple processing. Next, after shifter processing is performed for the recording paper batch following staple processing (Step S921), the recording paper batch is discharged to the discharge tray 8, completing one job.

Afterwards, the control portion judges whether or not there is a next job (Step S922). That is, the control portion judges whether or not it is necessary to perform continuing duplex print processing, punch processing, staple processing, and shifter processing. When the result of this judgment is that there is a next job, the control portion proceeds to Step S909, and the processing of Steps S909 to S921 is performed repeatedly until all jobs are finished. After staple processing, a recording paper batch is sorted by shifter processing and discharged onto the discharge tray 8 each time one job is finished. On the other hand, when the judgment in Step S922 is that there is not a next job, control of this processing I is finished.

Processing J

Figure 20:
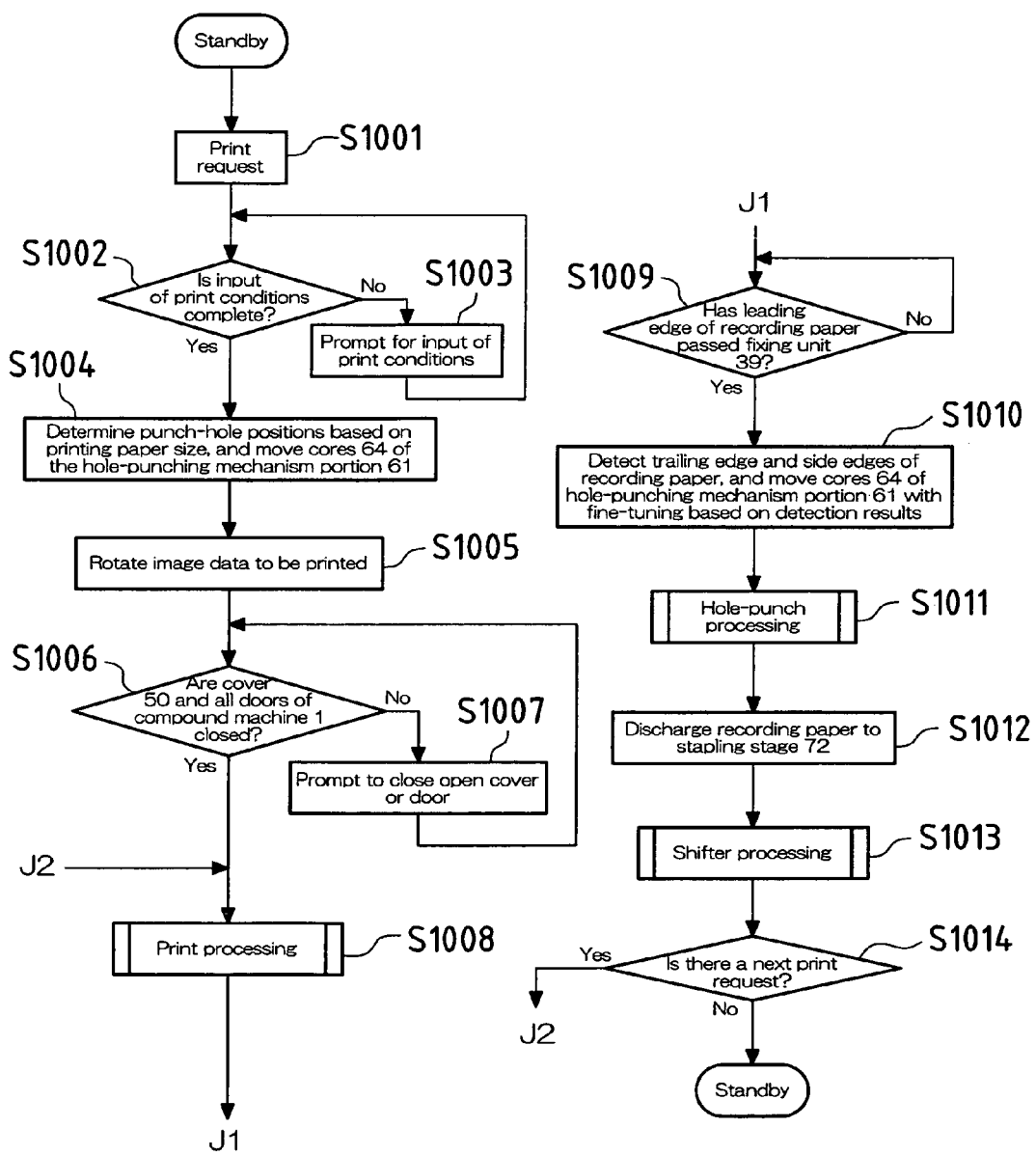
FIG. 20 is a flowchart that shows the procedure of processing J in FIG. 10, i.e., a case in which simplex print processing, shifter processing, and punch processing are performed, and staple processing is not performed.

Next, the procedure of processing J will be described using the flowchart in FIG. 20. This processing J is processing when there is simplex print processing, shifter processing, and punch processing, and there is no staple processing.

When a print request has been made (Step S1001), the control portion of the compound machine 1 judges whether or not the above selection of print conditions (see FIG. 10) is completed (Step S1002). When the result of this judgment is that the selection of print conditions has not yet been completed, the user is prompted to select print conditions (Step S1003), and the control portion waits until the print conditions are selected. In this processing J, simplex print processing, shifter processing, and punch processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, the positions at which punch holes will be opened in the recording paper are determined based on the size of the recording paper, and the cores 64 of the hole-punching mechanism portion 61 of the punching unit 60 are moved to the corresponding positions (Step S1004).

Next, image data transmitted from the scanner portion 2 or an external terminal apparatus is rotated (Step S1005). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1006), and when any of the doors of the compound machine 1 and the cover 50 of the paper post-processing portion 5 are not closed, the user is prompted to close the open door of the compound machine 1 or the cover 50 of the paper post-processing portion 5 (Step S1007).

Next, print processing is executed for one face of the recording paper (Step S1008). Due to the rotation of image data in Step S1005, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1009). When the leading edge of the recording paper has passed the fixing unit 39, the control portion proceeds to the next step S1010. On the other hand, when the leading edge of the recording paper has not yet passed the fixing unit 39, the control portion waits for the leading edge of the recording paper to pass the fixing unit 39, and then proceeds to Step S1010.

In Step S1010, the trailing edge and the side edges of the recording paper that has passed the fixing unit 39 are detected, and the cores 64 of the hole-punching mechanism portion 61 of the punching unit 60 are moved with fine-tuning such that it is possible to precisely open punch-holes at the punch-hole positions determined in Step S1004. Then, punch processing is performed for the recording paper, which is transported from the main transport path 36 of the apparatus main body to the main transport path 51 of the paper post-processing portion 5 (Step S1011). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72 (Step S1012). Next, after the control portion judges whether or not the trailing edge of the recording paper has separated from the discharge rollers 54 (Step S1013), the recording paper is discharged to the discharge tray 8.

Afterwards, the control portion judges whether or not there is a next print request (Step S1014). That is, the control portion judges whether or not it is necessary to perform continuing simplex print processing, punch processing, and shifter processing. When the result of this judgment is that there is a next print request, the control portion proceeds to Step S1008, and the processing of Steps S1008 to S1013 is performed repeatedly until all print requests are finished. After punch processing, the recording paper is sorted by shifter processing and discharged onto the discharge tray 8. On the other hand, when the judgment in Step S1014 is that there is not a next print request, control of this processing J is finished.

Figure 21:
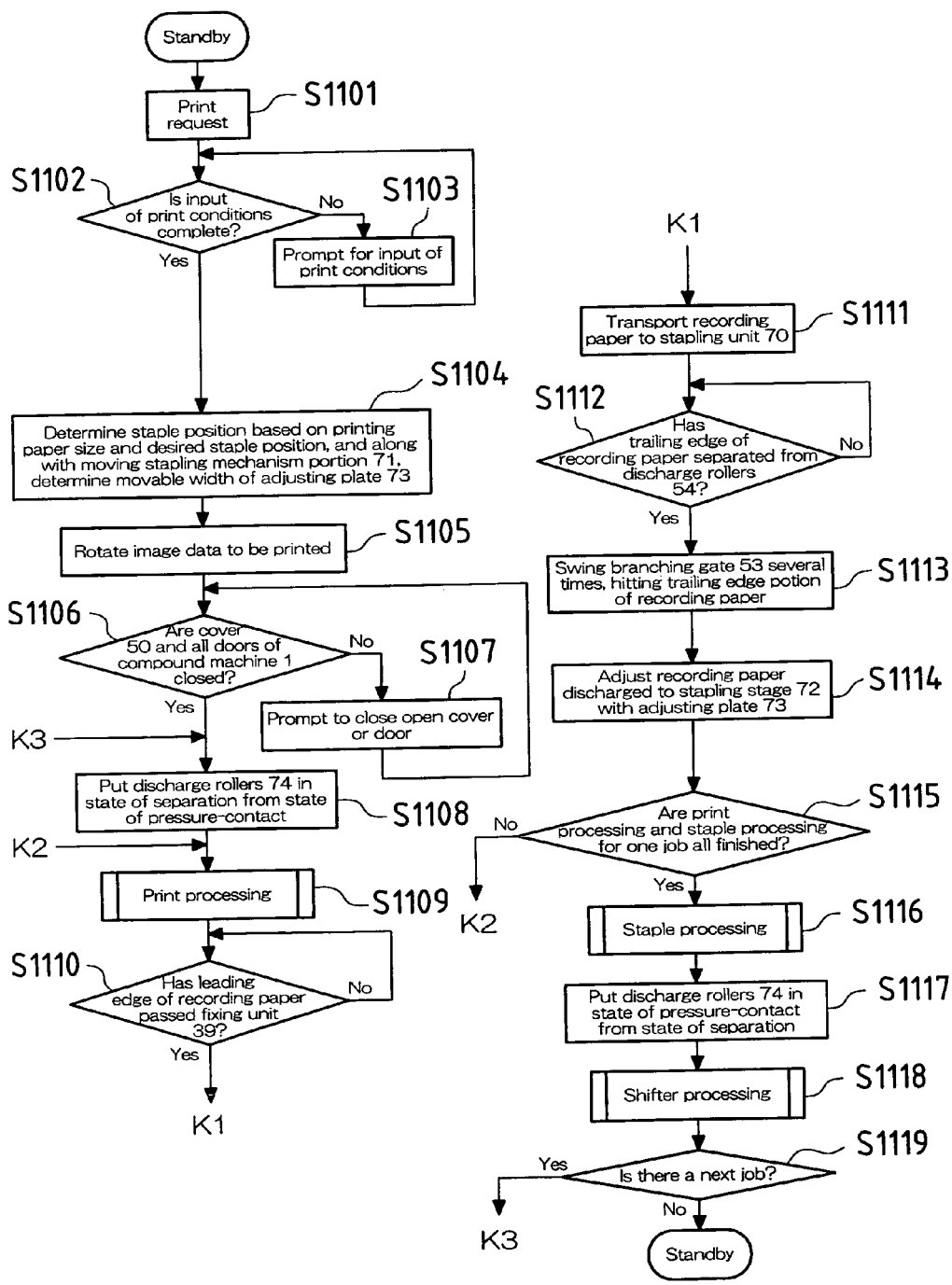
FIG. 21 is a flowchart that shows the procedure of processing K in FIG. 10, i.e., a case in which simplex print processing, shifter processing, and staple processing are performed, and punch processing is not performed.

Processing K Next, the procedure of processing K will be described using the flowchart in FIG. 21. This processing K is processing when there is simplex print processing, shifter processing, and staple processing, and there is no punch processing.

When a print request has been made (Step S1101), the control portion of the compound machine 1 judges whether or not the above selection of print conditions (see FIG. 10) is completed (Step S1102). When the result of this judgment is that the selection of print conditions has not yet been completed, the user is prompted to select print conditions (Step S1103), and the control portion waits until the print conditions are selected. In this processing K, simplex print processing, shifter processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S1104).

Next, image data transmitted from the scanner portion 2 or an external terminal apparatus is rotated (Step S1105). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1106), and when any of the doors of the compound machine 1 and the cover 50 of the paper post-processing portion 5 are not closed, the user is prompted to close the open door of the compound machine 1 or the cover 50 of the paper post-processing portion 5 (Step S1107). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S1108).

Next, print processing is executed for one face of the recording paper (Step S1109). Due to the rotation of image data in Step S1105, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1110). When the leading edge of the recording paper has passed the fixing unit 39, the control portion proceeds to the next step S1111. On the other hand, when the leading edge of the recording paper has not yet passed the fixing unit 39, the control portion waits for the leading edge of the recording paper to pass the fixing unit 39, and then proceeds to Step S1111.

In Step S1111, the recording paper transported into the stapling unit 70 is discharged from the discharge rollers 54 to the stapling stage 72. Then, the control portion judges whether or not the trailing edge of the recording paper has separated from the discharge rollers 54 (Step S1112). When the trailing edge of the recording paper has separated from the discharge rollers 54, the control portion proceeds to the next step S1113, and when it has not yet separated, the control portion waits for the trailing edge of the recording paper to separate from the discharge rollers 54, and then proceeds to Step S1113. In Step S1113, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S1114). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing for one job in the print request that has been made is finished (Step S1115). Here, the print processing for a predetermined number of pages of recording paper that will be the target of one instance of staple processing is referred to together as the print processing for one job. Because staple processing is performed after print processing for a predetermined number of pages of recording paper is all finished, in Step S1115, the control portion judges whether or not the print processing for a predetermined number of pages of recording paper that will be the target of staple processing is all finished.

Then, when the result of the judgment in Step S1115 is that the print processing for one job is not all finished, the control portion proceeds to Step S1109, and the processing of Steps S1109 to S1114 is performed repeatedly until the print processing for one job is finished. On the other hand, when the print processing for one job is all finished, next, staple processing is executed (Step S1116). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S1117), chucking the recording paper batch after staple processing. Next, after shifter processing is performed for the recording paper batch following staple processing (Step S1118), the recording paper batch is discharged to the discharge tray 8, completing one job.

Afterwards, the control portion judges whether or not there is a next job (Step S1119). That is, the control portion judges whether or not it is necessary to perform continuing duplex print processing, staple processing, and shifter processing. When the result of this judgment is that there is a next job, the control portion proceeds to Step S1108, and the processing of Steps S1108 to S1118 is performed repeatedly until all jobs are finished. After staple processing, a recording paper batch is sorted by shifter processing and discharged onto the discharge tray 8 each time one job is finished. On the other hand, when the judgment in Step S1119 is that there is not a next job, control of this processing K is finished.

Processing L

Figure 22:
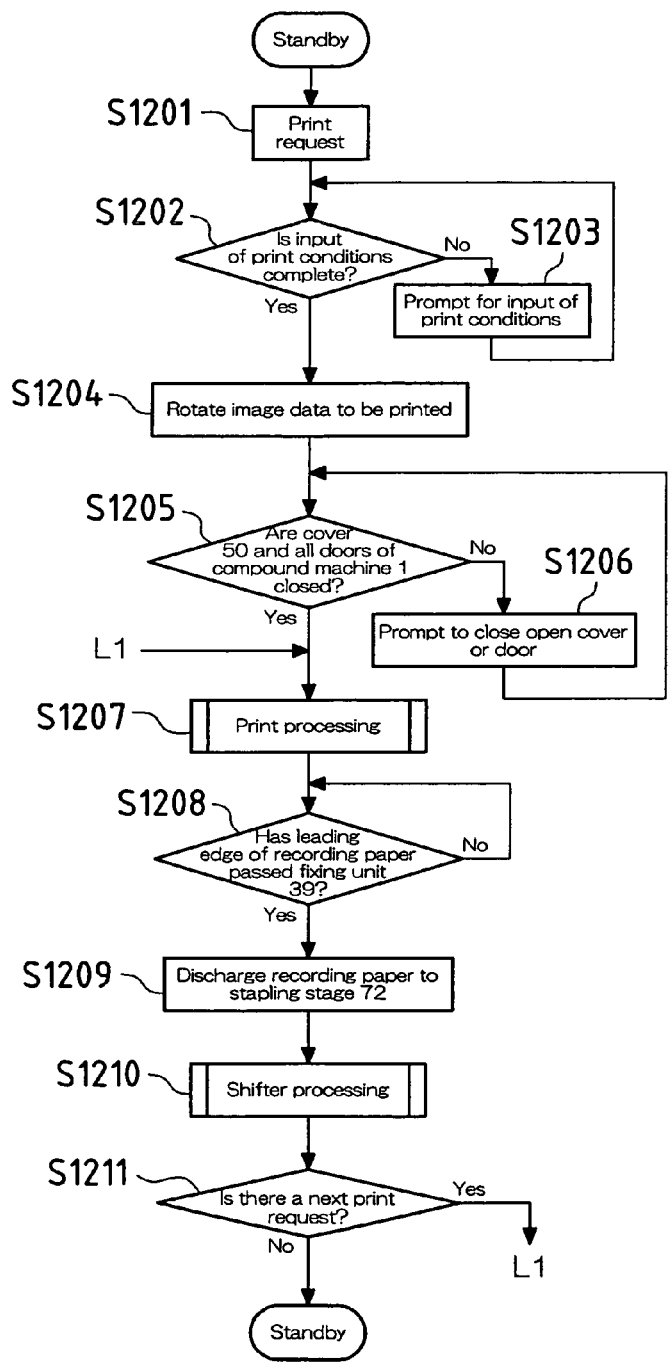
FIG. 22 is a flowchart that shows the procedure of processing L in FIG. 10, i.e., a case in which simplex print processing and shifter processing are performed, and punch processing and staple processing are not performed.

Next, the procedure of processing L will be described using the flowchart in FIG. 22. This processing L is processing when there is simplex print processing and shifter processing, and no punch processing or staple processing.

When a print request has been made (Step S1201), the control portion of the compound machine 1 judges whether or not the above selection of print conditions (see FIG. 10) is completed (Step S1202). When the result of this judgment is that the selection of print conditions has not yet been completed, the user is prompted to select print conditions (Step S1203), and the control portion waits until the print conditions are selected. In this processing L, simplex print processing and shifter processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, image data transmitted from the scanner portion 2 or an external terminal apparatus is rotated (Step S1204). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1205), and when any of the doors of the compound machine 1 and the cover 50 of the paper post-processing portion 5 are not closed, the user is prompted to close the open door of the compound machine 1 or the cover 50 of the paper post-processing portion 5 (Step S1206).

Next, print processing is executed for one face of the recording paper (Step S1207). Due to the rotation of image data in Step S1204, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1208). When the leading edge of the recording paper has passed the fixing unit 39, the control portion proceeds to the next step S1209. On the other hand, when the leading edge of the recording paper has not yet passed the fixing unit 39, the control portion waits for the leading edge of the recording paper to pass the fixing unit 39, and then proceeds to Step S1209.

In Step S1209, the recording paper transported into the stapling unit 70 is discharged from the discharge rollers 54 to the stapling stage 72, and further, is transported to a position where it is chucked by the upper and lower discharge rollers 74, which are in a state of pressure-contact. Next, after shifter processing is performed for the recording paper in a state chucked by the upper and lower discharge rollers 74 (Step S1210), the recording paper is discharged to the discharge tray 8.

Afterwards, the control portion judges whether or not there is a next print request (Step S1211). That is, the control portion judges whether or not it is necessary to perform continuing simplex print processing and shifter processing. When the result of this judgment is that there is a next print request, the control portion proceeds to Step S1207, and the processing of Steps S1207 to S1210 is performed repeatedly until all print requests are finished. After being discharged to the stapling stage 72, the recording paper is sorted by shifter processing and discharged onto the discharge tray 8. On the other hand, when the judgment in Step S1211 is that there is not a next print request, control of this processing L is finished.

Processing M

Figure 23:
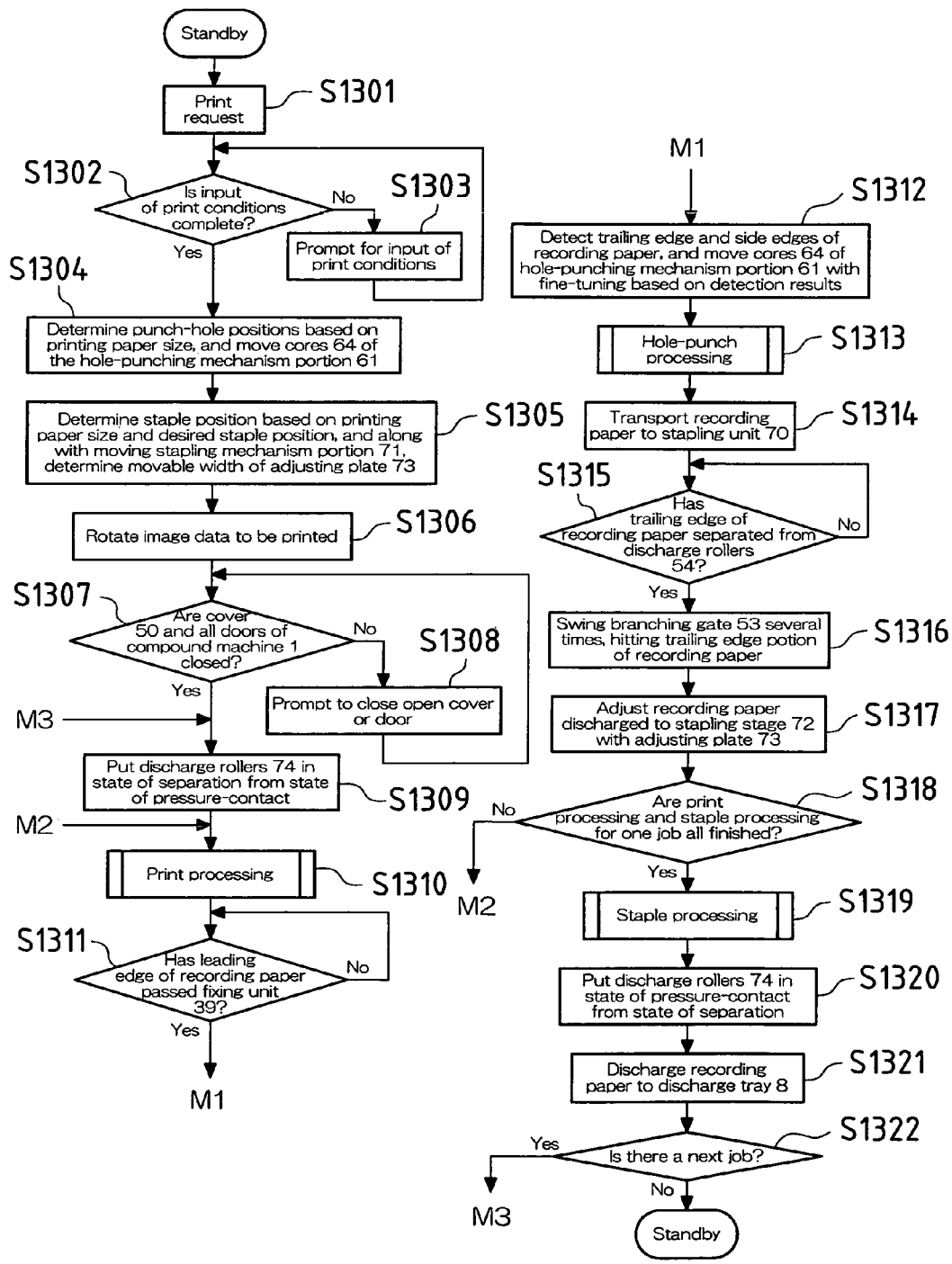
FIG. 23 is a flowchart that shows the procedure of processing M in FIG. 10, i.e., a case in which simplex print processing, punch processing, and staple processing are performed, and shifter processing is not performed.

Next, the procedure of processing M will be described using the flowchart in FIG. 23. This processing M is processing when there is simplex print processing, punch processing, and staple processing, and no shifter processing.

When a print request has been made (Step S1301), the control portion of the compound machine 1 judges whether or not the above selection of print conditions (see FIG. 10) is completed (Step S1302). When the result of this judgment is that the selection of print conditions has not yet been completed, the user is prompted to select print conditions (Step S1303), and the control portion waits until the print conditions are selected. In this processing M, duplex print processing, punch processing, and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S1304). Then, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S1305).

Next, image data transmitted from the scanner portion 2 or an external terminal apparatus is rotated (Step S1306). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1307), and when any of the doors of the compound machine 1 and the cover 50 of the paper post-processing portion 5 are not closed, the user is prompted to close the open door of the compound machine 1 or the cover 50 of the paper post-processing portion 5 (Step S1308). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S1309).

Next, print processing is executed for one face of the recording paper (Step S1310). Due to the rotation of image data in Step S1306, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1311). When the leading edge of the recording paper has passed the fixing unit 39, the control portion proceeds to the next step S1312. On the other hand, when the leading edge of the recording paper has not yet passed the fixing unit 39, the control portion waits for the leading edge of the recording paper to pass the fixing unit 39, and then proceeds to Step S1312.

In Step S1312, the trailing edge and the side edges of the recording paper that has passed the fixing unit 39 are detected, and the cores 64 of the hole-punching mechanism portion 61 of the punching unit 60 are moved with fine-tuning such that it is possible to precisely open punch-holes at the punch-hole positions determined in Step S1304. Then, punch processing is performed for the recording paper, which is transported from the main transport path 36 of the apparatus main body to the main transport path 51 of the paper post-processing portion 5 (Step S1313). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, and discharged from the discharge rollers 54 to the stapling stage 72 (Step S1314). Then, the control portion judges whether or not the trailing edge of the recording paper has separated from the discharge rollers 54 (Step S1315). When the trailing edge of the recording paper has separated from the discharge rollers 54, the control portion proceeds to the next step S1316, and when it has not yet separated, the control portion waits for the trailing edge of the recording paper to separate from the discharge rollers 54, and then proceeds to Step S1316. In Step S1316, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S1317). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing and punch processing for one job in the print request that has been made are finished (Step S1318). Here, the print processing and punch processing of a predetermined number of pages of recording paper that will be the target of one instance of staple processing are referred to together as the print processing and punch processing for one job. Because staple processing is performed after print processing and punch processing for a predetermined number of pages of recording paper are all finished, in Step S1318, the control portion judges whether or not the print processing and punch processing of a predetermined number of pages of recording paper that will be the target of staple processing are all finished.

Then, when the result of the judgment in Step S1318 is that the print processing and punch processing for one job are not all finished, the control portion proceeds to Step S1310, and the processing of Steps S1310 to S1317 is performed repeatedly until the print processing and punch processing for one job are finished. On the other hand, when the print processing and punch processing for one job are all finished, next, staple processing is executed (Step S1319). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S1320), chucking the recording paper batch after staple processing. Next, after shifter processing is performed for the recording paper batch following staple processing, the recording paper batch is discharged to the discharge tray 8 (Step S1321), finishing one job.

Afterwards, the control portion judges whether or not there is a next job (Step S1322). That is, the control portion judges whether or not it is necessary to perform continuing duplex print processing, punch processing, and staple processing. When the result of this judgment is that there is a next job, the control portion proceeds to Step S1309, and the processing of Steps S1309 to S1321 is performed repeatedly until all jobs are finished. After staple processing, a recording paper batch is sorted by shifter processing and discharged onto the discharge tray 8 each time one job is finished. On the other hand, when the judgment in Step S1322 is that there is not a next job, control of this processing M is finished.

Processing N

Figure 24:
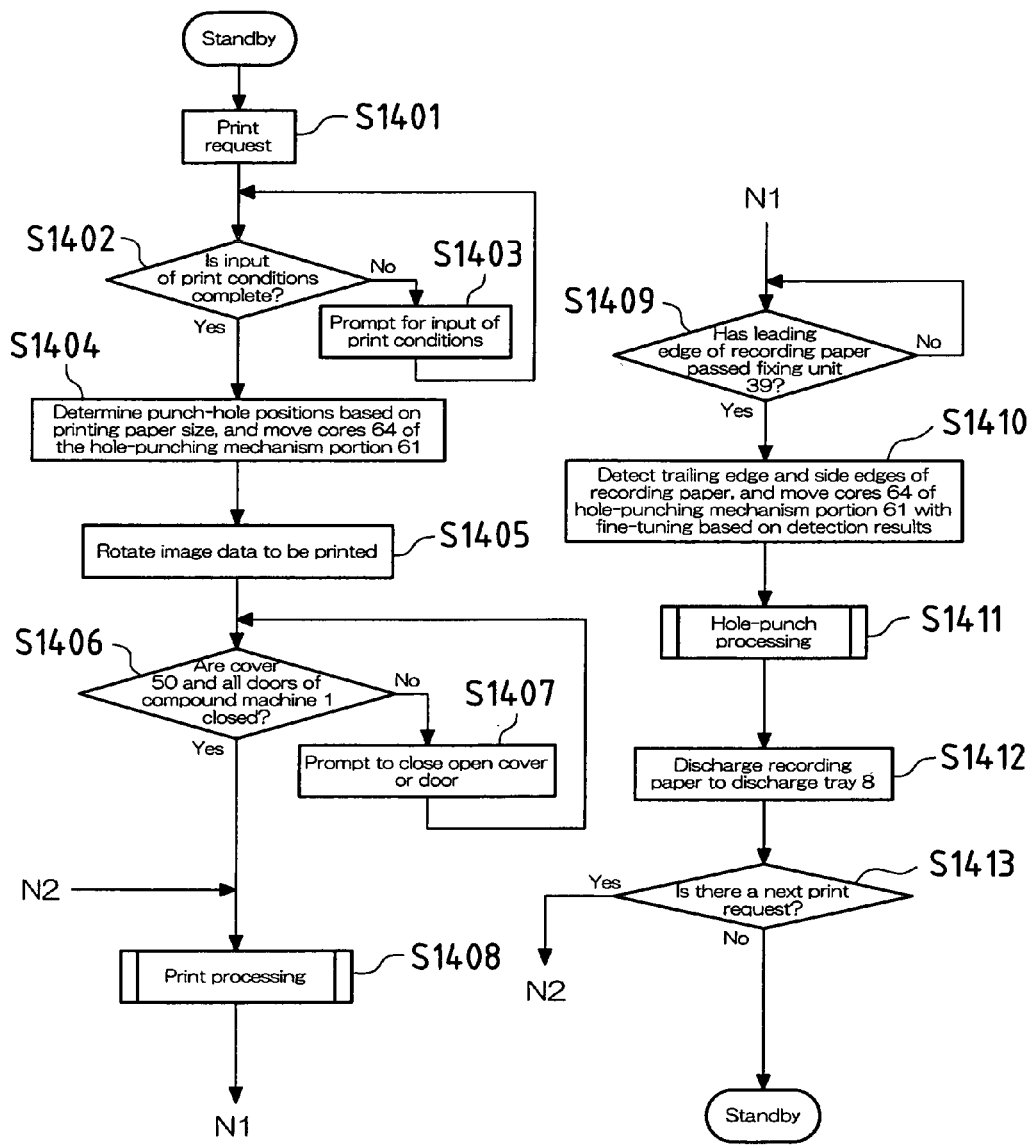
FIG. 24 is a flowchart that shows the procedure of processing N in FIG. 10, i.e., a case in which simplex print processing and punch processing are performed, and shifter processing and staple processing are not performed.

Next is a description of the procedure of processing N using the flowchart in FIG. 24. This processing N is processing when there is simplex print processing and punch processing, and no shifter processing or staple processing.

When a print request has been made (Step S1401), the control portion of the compound machine 1 judges whether or not the above print conditions selection (see FIG. 10) is complete (Step S1402). When the result of this judgment is that selection of print conditions is not yet complete, the user is prompted to select print conditions (Step S1403), and the control portion waits until the print conditions are selected. In this processing N, simplex print processing and punch processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size, the positions for opening punch holes in the recording paper are determined, and the cores 64 of the hole-punching mechanism portion 61 of the punching unit 60 are moved to the corresponding positions (Step S1404).

Next, image data transmitted from the scanner portion 2 or an external terminal apparatus is rotated (Step S1405). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1406), and when any of the doors of the compound machine 1 and the cover 50 of the paper post-processing portion 5 are not closed, the user is prompted to close the open door of the compound machine 1 or the cover 50 of the paper post-processing portion 5 (Step S1407).

Next, print processing is executed for one face of the recording paper (Step S1408). Due to the rotation of image data in Step S1405, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1409). When the leading edge of the recording paper has passed the fixing unit 39, the control portion proceeds to the next step S1410. On the other hand, when the leading edge of the recording paper has not yet passed the fixing unit 39, the control portion waits for the leading edge of the recording paper to pass the fixing unit 39, and then proceeds to Step S1410.

In Step S1410, the trailing edge and the side edges of the recording paper that has passed the fixing unit 39 are detected, and the cores 64 of the hole-punching mechanism portion 61 of the punching unit 60 are moved with fine-tuning such that it is possible to precisely open punch-holes at the punch-hole positions determined in Step S1404. Then, punch processing is performed for the recording paper, which is transported from the main transport path 36 of the apparatus main body to the main transport path 51 of the paper post-processing portion 5 (Step S1411). That is, the recording paper that has been transported to the punching unit 60 is stopped on the guide plate 62, the cores 64 of the hole-punching mechanism portion 61 are dropped, and punch-holes are opened at the predetermined positions of the trailing edge portion of the recording paper.

After punch processing is finished, the recording paper is transported into the stapling unit 70, discharged from the discharge rollers 54 to the stapling stage 72, and further discharged to the discharge tray 8 from the upper and lower discharge rollers 74, which are in a state of pressure-contact (Step S1412).

Afterwards, the control portion judges whether or not there is a next print request (Step S1413). That is, the control portion judges whether or not it is necessary to perform continuing duplex print processing and punch processing. When the result of this judgment is that there is a next print request, the control portion proceeds to Step S1408, and the processing of Steps S1408 to S1412 is performed repeatedly until all print requests are finished. After punch processing, the recording paper is discharged onto the discharge tray 8 from the discharge rollers 74. On the other hand, when the judgment in Step S1413 is that there is not a next print request, control of this processing N is finished.

Processing O

Figure 25:
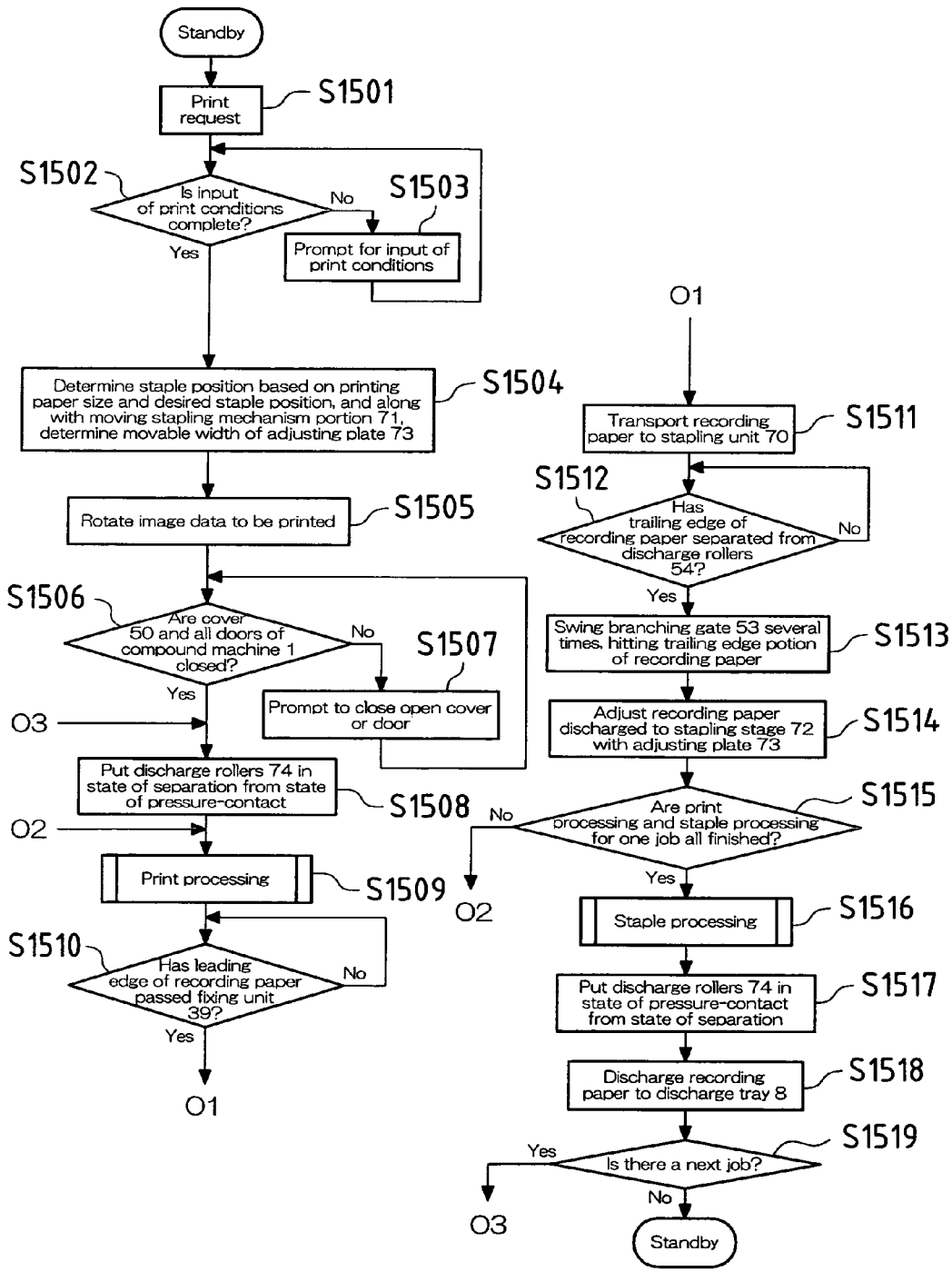
FIG. 25 is a flowchart that shows the procedure of processing O in FIG. 10, i.e., a case in which simplex print processing and staple processing are performed, and shifter processing and punch processing are not performed.

Next is a description of the procedure of processing O using the flowchart in FIG. 25. This processing O is processing when there is simplex print processing and staple processing, and no shifter processing or punch processing.

When a print request has been made (Step S1501), the control portion of the compound machine 1 judges whether or not the above print conditions selection (see FIG. 10) is complete (Step S1502). When the result of this judgment is that selection of print conditions is not yet complete, the user is prompted to select print conditions (Step S1503), and the control portion waits until the print conditions are selected. In this processing O, simplex print processing and staple processing are performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, based on the printing paper size and the desired staple position, the position at which to bind the recording paper with staples is determined, and along with moving the stapling mechanism portion 71 of the stapling unit 70 to the corresponding position, the movable width of the adjusting plate 73 is determined (Step S1504).

Next, image data transmitted from the scanner portion 2 or an external terminal apparatus is rotated (Step S1505). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1506), and when any of the doors of the compound machine 1 and the cover 50 of the paper post-processing portion 5 are not closed, the user is prompted to close the open door of the compound machine 1 or the cover 50 of the paper post-processing portion 5 (Step S1507). On the other hand, when all of the doors of the compound machine 1 and the cover 50 of the paper post-processing portion 5 are closed, the top side discharge roller 74 is moved upward, so that the upper and lower discharge rollers 74 are placed in a state of separation from a state of pressure-contact (S1508).

Next, print processing is executed for one face of the recording paper (Step S1509). Due to the rotation of image data in Step S1505, the direction of the image formed on the recording paper differs from the direction of the transmitted image data by 90 degrees, 180 degrees, or 270 degrees. Then, the control portion judges whether or not the leading edge of the recording paper for which print processing for one face is complete has passed the fixing unit 39 (Step S1510). When the leading edge of the recording paper has passed the fixing unit 39, the control portion proceeds to the next step S1511. On the other hand, when the leading edge of the recording paper has not yet passed the fixing unit 39, the control portion waits for the leading edge of the recording paper to pass the fixing unit 39, and then proceeds to Step S1511.

In Step S1511, the recording paper transported into the stapling unit 70 is discharged from the discharge rollers 54 to the stapling stage 72. Next, the control portion judges whether or not the trailing edge of the recording paper has separated from the discharge rollers 54 (Step S1512). When the trailing edge of the recording paper has separated from the discharge rollers 54, the control portion proceeds to the next step S1513, and when it has not yet separated, the control portion waits for the trailing edge of the recording paper to separate from the discharge rollers 54, and then proceeds to Step S1513. In Step S1513, the branching gate 53 is swung several times, hitting down the trailing edge potion of the recording paper separated from the discharge rollers 54 with the branching gate 53 from above.

Next, the recording paper discharged to the stapling stage 72 is adjusted in the widthwise direction of the recording paper with the adjusting plate 73 (Step S1514). At this time, adjustment in the widthwise direction of the recording paper is performed by the recording paper sliding down along the incline of the stapling stage 72 due to its own weight. Also, at this time, the leading edge portion of the recording paper discharged from the discharge rollers 54 has arrived between the upper and lower discharge rollers 74, which are separated.

Next, the control portion judges whether or not the print processing for one job in the print request that has been made is finished (Step S1515). Here, the print processing for a predetermined number of pages of recording paper that will be the target of one instance of staple processing is referred to together as the print processing for one job. Because staple processing is performed after print processing for a predetermined number of pages of recording paper is all finished, in Step S1515, the control portion judges whether or not the print processing for a predetermined number of pages of recording paper that will be the target of staple processing is all finished.

Then, when the result of the judgment in Step S1515 is that the print processing for one job is not all finished, the control portion proceeds to Step S1509, and the processing of Steps S1509 to S1514 is performed repeatedly until the print processing for one job is finished. On the other hand, when the print processing for one job is all finished, next, staple processing is executed (Step S1516). That is, in the stapling unit 70, staples are applied at the predetermined staple position of the recording paper with the stapling mechanism portion 71, binding the trailing edge portion of the recording paper stacked on the stapling stage 72.

After staple processing is finished, the top side discharge roller 74 is moved downward so that the upper and lower discharge rollers 74 are placed in a state of pressure-contact from a state of separation (Step S1517), chucking the recording paper batch after staple processing. Next, after shifter processing is performed for the recording paper batch following staple processing (Step S1518), the recording paper batch is discharged to the discharge tray 8, completing one job.

Afterwards, the control portion judges whether or not there is a next job (Step S1519). That is, the control portion judges whether or not it is necessary to perform continuing duplex print processing, staple processing, and shifter processing. When the result of this judgment is that there is a next job, the control portion proceeds to Step S1508, and the processing of Steps S1508 to S1518 is performed repeatedly until all jobs are finished. After staple processing, a recording paper batch is sorted by shifter processing and discharged onto the discharge tray 8 each time one job is finished. On the other hand, when the judgment in Step S1519 is that there is not a next job, control of this processing O is finished.

Processing P

Figure 26:
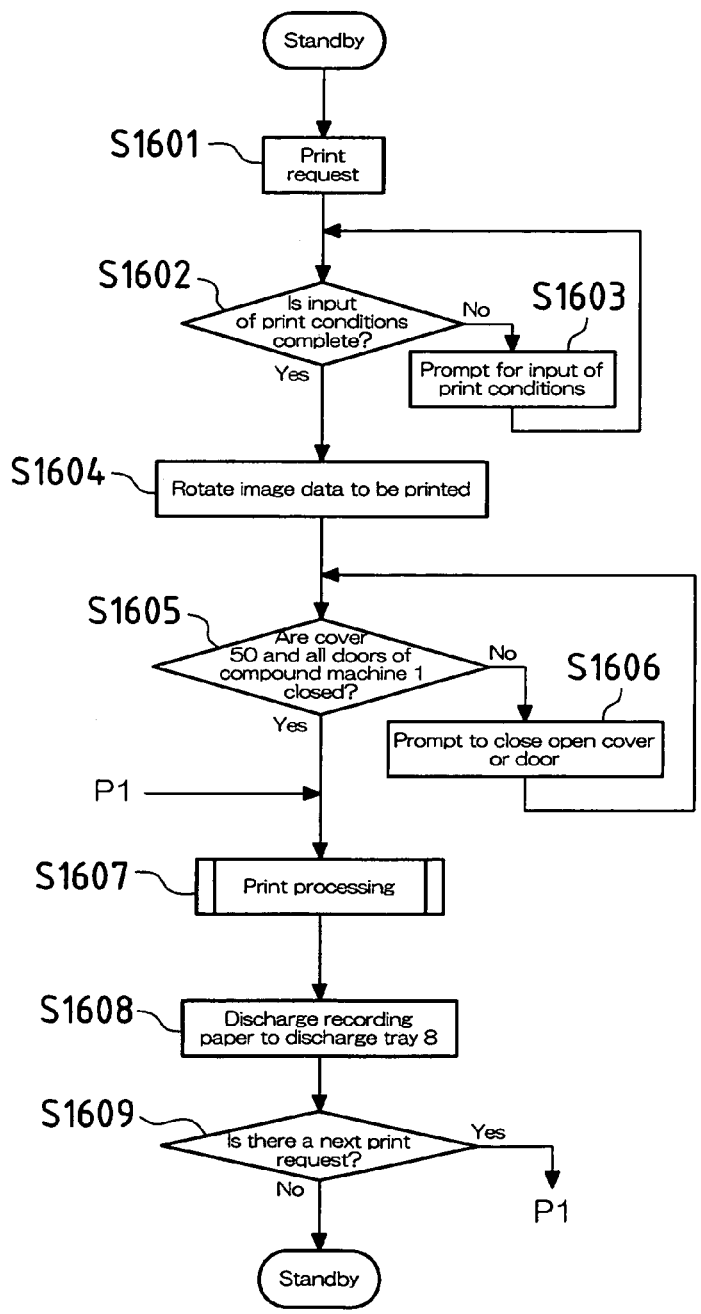
FIG. 26 is a flowchart that shows the procedure of processing P in FIG. 10, i.e., a case in which simplex print processing is performed, and punch processing, staple processing, and shifter processing are not performed.

Next is a description of the procedure of processing P using the flowchart in FIG. 26. This processing P is processing when there is simplex print processing, and no staple processing, shifter processing, or punch processing.

When a print request has been made (Step S1601), the control portion of the compound machine 1 judges whether or not the above print conditions selection (see FIG. 10) is complete (Step S1602). When the result of this judgment is that selection of print conditions is not yet complete, the user is prompted to select print conditions (Step S1603), and the control portion waits until the print conditions are selected. In this processing P, simplex print processing is performed in the compound machine 1 as a result of the selection of print conditions. The branching gate 53 in the stapling unit 70 is in the first position, which is the home position, and the upper and lower discharge rollers 74 are in the position in which they are in pressure-contact, which is the home position.

Next, image data transmitted from the scanner portion 2 or an external terminal apparatus is rotated (Step S1604). At this time, the rotation angle of the image data (90 degrees, 180 degrees, 270 degrees) is determined according to whether the recording paper transport orientation is portrait or landscape, whether or not punch processing has been selected as a print condition, whether or not staple processing has been selected as a print condition, and the like. This sort of image data rotation is performed for the same reasons as in the case of above processing I.

Next, the control portion judges whether or not all of the doors of the compound machine 1 and the cover 50 of the paper post-processing portion 5 are closed (Step S1605), and when any of the doors of the compound machine 1 and the cover 50 of the paper post-processing portion 5 are not closed, the user is prompted to close the open door of the compound machine 1 or the cover 50 of the paper post-processing portion 5 (Step S1606).

Next, print processing is executed for one face of the recording paper (Step S1607). Due to the rotation of image data in Step S1604, the direction of the image formed on the recording paper differs from the direction of the transmitted image data by 90 degrees, 180 degrees, or 270 degrees. Then, the recording paper for which print processing for one face is finished is transported to the paper post-processing portion 5, and discharged from the discharge rollers 74 to the discharge tray 8 (Step S1608).

Afterwards, the control portion judges whether or not there is a next print request (Step S1609). That is, the control portion judges whether or not it is necessary to perform continuing simplex print processing. When the result of this judgment is that there is a next print request, the control portion proceeds to Step S1607, and the processing of Steps S1607 and S1608 is performed repeatedly until all print requests are finished. After being discharged to the stapling stage 72, the recording paper is discharged onto the discharge tray 8 from the discharge rollers 74. On the other hand, when the judgment in Step S1609 is that there is not a next print request, control of this processing P is finished.

Summary of Control of Paper Post-Processing Portion 5

In the above manner, in the compound machine 1, control of the paper post-processing portion 5, which is provided with a plurality of functions, is performed appropriately and efficiently according to print conditions selected when a print request is made.

As described above, when punch processing is included in the selected print conditions, the punch hole positions where punch holes are opened in the recording paper are determined based on the recording paper size, and along with moving the cores 64 of the hole-punching mechanism portion 61 of the punching unit 60 to the corresponding positions, the trailing edge and the side edges of the recording paper are detected after printing, and the cores 64 of the hole-punching mechanism portion 61 are moved with fine-tuning based on the results of that detection. Thus, it is possible to reduce discrepancies between the determined punch hole positions and the punch hole positions where holes are actually opened, so that punch holes can be precisely opened in the recording paper.

As described above, when staple processing is included in the selected print conditions, the position at which to bind the recording paper with staples and the movable width of the adjusting plate 73 of the stapling unit 70 are determined based on the printing paper size and the desired staple position, and the stapling mechanism portion 71 of the stapling unit 70 is moved to the corresponding position. Thus, it is possible to reduce discrepancies between the determined stapling position and the position where stapling is actually performed, so that staple processing can be appropriately performed.

As described above, when staple processing is included in the selected print conditions, the upper and lower discharge rollers are separated before the recording paper is transported to the stapling unit 70, and after staple processing by the stapling unit 70, the upper and lower discharge rollers are in pressure-contact. Thus, it is not necessary to separately provide a mechanism that discharges batches of recording paper to the discharge tray 8 after staple processing, such as a mechanism that pushes out batches of recording paper. Also, it is possible to perform shifter processing for batches of recording paper even after staple processing.

As described above, when duplex printing is included in the selected print conditions, after print processing for the front face of the recording paper is finished, the branching gate 53 is switched to the second position, which guides the recording paper to the switchback transport path 52, and after print processing for the back face of the recording paper is finished, the branching gate 53 is switched to the first position, which guides the recording paper to the stapling stage 72 where staple processing is performed. Due to this sort of rotating operation of the branching gate 53, it is possible to appropriately transport the recording paper in the paper post-processing portion 5.

The example embodiment presented herein may be embodied in other forms without departing from the gist or essential characteristics thereof. The embodiments disclosed in this application are to be considered in all respects as illustrative and not limiting. The scope of the embodiment is indicated by the appended claims rather than by the foregoing description, and all changes that come within the meaning and range of equivalency of the claims are intended to be embraced therein.

What is claimed is:

1. An image forming apparatus in which an original reading portion is disposed in an upper portion of the apparatus main body, a feed portion is disposed in a lower portion of the apparatus main body, and a printing portion is disposed between the original reading portion and the feed portion, wherein
a paper post-processing portion that can perform a plurality of types of paper post-processing for recording paper transported from the apparatus main body after printing by the printing portion is finished, and
a discharge portion to which recording paper is discharged after paper post-processing by the paper post-processing portion is finished,
are disposed in a space inside a "U" shape of the apparatus main body, the "U" shape being formed by the original reading portion, the printing portion, and the feed portion, wherein
the paper post-processing portion is provided with a hole-punching function and a stapling function, wherein
a punching unit provided with the hole-punching function and a stapling unit provided with the stapling function are provided in the paper post-processing portion, and wherein
a switchback transport path used when printing to both faces of the recording paper is formed in the stapling unit, the stapling unit comprising
a stapling stage where staple processing is performed and a discharge stage where recording paper is discharged to the stapling stage, and the discharge stage is provided in the switchback transport path.

2. The image forming apparatus according to claim 1, wherein, in the paper post-processing portion, the punching unit is disposed on the upstream side in the paper transport direction along the paper transport direction, and the stapling unit is disposed on the downstream side in the paper transport direction along the paper transport direction.

3. The image forming apparatus according to claim 1, wherein a hole-punching mechanism portion that opens punch-holes in the recording paper is provided in the upper portion of the punching unit, and a punch chip storage portion that recovers punch chips is provided in the lower portion of the punching unit.

4. The image forming apparatus according to claim 1, wherein a branching gate that switches the direction in which the recording paper is guided is provided in the stapling unit, and
the branching gate is provided such that it can rotate between a first position that guides the recording paper to the stapling stage where staple processing is performed and a second position that guides the recording paper to the switchback transport path.

5. The image forming apparatus according to claim 1, wherein the paper post-processing portion is further provided with a shifter function.

6. The image forming apparatus according to claim 5, wherein discharge rollers that discharge the recording paper to the discharge portion after paper post-processing are provided with the shifter function.

7. The image forming apparatus according to claim 6, wherein the discharge rollers are provided as a pair of upper and lower rollers on the furthest downstream side in the paper transport direction of the stapling stage where staple processing is performed, such that they can be brought into pressure-contact with or separated from each other.

8. The image forming apparatus according to claim 7, wherein the pair of upper and lower discharge rollers are both drive rollers.

9. The image forming apparatus according to claim 1, wherein the recording paper is transported from the feed portion with a so-called center reference.

* * * * *